United States Patent
Hirota et al.

(10) Patent No.: US 9,863,673 B2
(45) Date of Patent: Jan. 9, 2018

(54) ADSORPTION HEAT PUMP SYSTEM AND METHOD OF GENERATING COOLING POWER

(71) Applicant: KABUSHIKI KAISHA TOYOTA CHUO KENKYUSHO, Nagakute-shi, Aichi-ken (JP)

(72) Inventors: Yasuki Hirota, Seto (JP); Takashi Shimazu, Nagoya (JP); Takafumi Yamauchi, Seto (JP); Tomohisa Wakasugi, Toyota (JP); Ryuichi Iwata, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 270 days.

(21) Appl. No.: 13/972,289

(22) Filed: Aug. 21, 2013

(65) Prior Publication Data
US 2014/0053577 A1    Feb. 27, 2014

(30) Foreign Application Priority Data

Aug. 22, 2012  (JP) ................................ 2012-183232
Mar. 21, 2013  (JP) ................................ 2013-058830
Mar. 21, 2013  (JP) ................................ 2013-058919

(51) Int. Cl.
| | | |
|---|---|---|
| F25B 17/02 | (2006.01) | |
| F25B 30/04 | (2006.01) | |
| F25B 17/08 | (2006.01) | |
| F25B 49/04 | (2006.01) | |

(52) U.S. Cl.
CPC .............. *F25B 30/04* (2013.01); *F25B 17/08* (2013.01); *F25B 49/046* (2013.01); *Y02B 30/52* (2013.01)

(58) Field of Classification Search
CPC .......... F25B 30/04; F25B 49/046; F25B 17/08
See application file for complete search history.

(56) References Cited

U.S. PATENT DOCUMENTS

| | | | | |
|---|---|---|---|---|
| 4,479,364 A | * | 10/1984 | Maier-Laxhuber | F25B 17/08 62/141 |
| 4,765,395 A | * | 8/1988 | Paeye | F25B 17/083 165/104.12 |
| 5,347,830 A | * | 9/1994 | Yamada | B60H 1/3201 165/104.12 |

(Continued)

FOREIGN PATENT DOCUMENTS

| | | | |
|---|---|---|---|
| DE | 3146902 A1 | 8/1982 | |
| GB | 2088548 | * 4/1981 | ............... F24H 7/00 |

(Continued)

OTHER PUBLICATIONS

Nov. 4, 2014 Office Action issued in Japanese Application No. 2012-183232.

(Continued)

*Primary Examiner* — Frantz Jules
*Assistant Examiner* — Filip Zec
(74) *Attorney, Agent, or Firm* — Oliff PLC

(57) ABSTRACT

A heat pump including an evaporator and an adsorber is provided. The adsorber is regenerated by applying heat from a chemical thermal storage reactor, a heat accumulator or an external heat source, at a temperature higher than or equal to a temperature to regenerate the adsorber.

4 Claims, 22 Drawing Sheets

(56) References Cited

U.S. PATENT DOCUMENTS

| | | | | |
|---|---|---|---|---|
| 5,442,931 | A * | 8/1995 | Ryan | F25B 17/08 165/104.12 |
| 7,422,993 | B2 * | 9/2008 | Takewaki | B01D 53/28 502/61 |
| 2009/0282846 | A1 * | 11/2009 | Munz | F25B 17/08 62/106 |
| 2011/0138824 | A1 * | 6/2011 | Mittelbach | F25B 17/083 62/113 |
| 2011/0146939 | A1 * | 6/2011 | Bond | C02F 1/14 165/10 |
| 2011/0283736 | A1 * | 11/2011 | Manabe | F25B 30/04 62/476 |
| 2011/0314850 | A1 * | 12/2011 | Braunschweig | F25B 37/00 62/142 |
| 2012/0085111 | A1 * | 4/2012 | Chen | F25B 49/046 62/141 |
| 2012/0198881 | A1 * | 8/2012 | Burk | F16K 11/076 62/324.6 |
| 2013/0276475 | A1 * | 10/2013 | Aso | F25B 17/083 62/477 |

FOREIGN PATENT DOCUMENTS

| | | |
|---|---|---|
| JP | S61-141666 U | 9/1986 |
| JP | S62-62164 A | 3/1987 |
| JP | H10-89798 A | 4/1998 |
| JP | 2766027 B2 | 6/1998 |
| JP | A-11-014184 | 1/1999 |
| JP | H11-311117 A | 11/1999 |
| JP | 2000-241041 A | 9/2000 |
| JP | 2001-082771 A | 3/2001 |
| JP | 2003-075015 A | 3/2003 |
| JP | A-2003-511641 | 3/2003 |
| JP | A-2006-125713 | 5/2006 |
| JP | 2009-257686 A | 11/2009 |
| JP | A-2010-151386 | 7/2010 |

OTHER PUBLICATIONS

"Development of High Efficiency Kerosene Burning Appliances Using Adsorption Heat Pump," $24^{th}$ Technology Development Investigation Business Result Presentation [P5.1.2] (with partial translation).

http://www.union-reitouki.com/chiller/principle.html, Aug. 20, 2012. Adsorption Chiller of Union Industry; Principle of Adsorption Chiller. (with partial translation).

Sep. 21, 2015 Office Action issued in German Patent Application No. 10 2013 013835.3.

Oct. 4, 2016 Office Action issued in Japanese Patent Application No. 2013-058830.

* cited by examiner

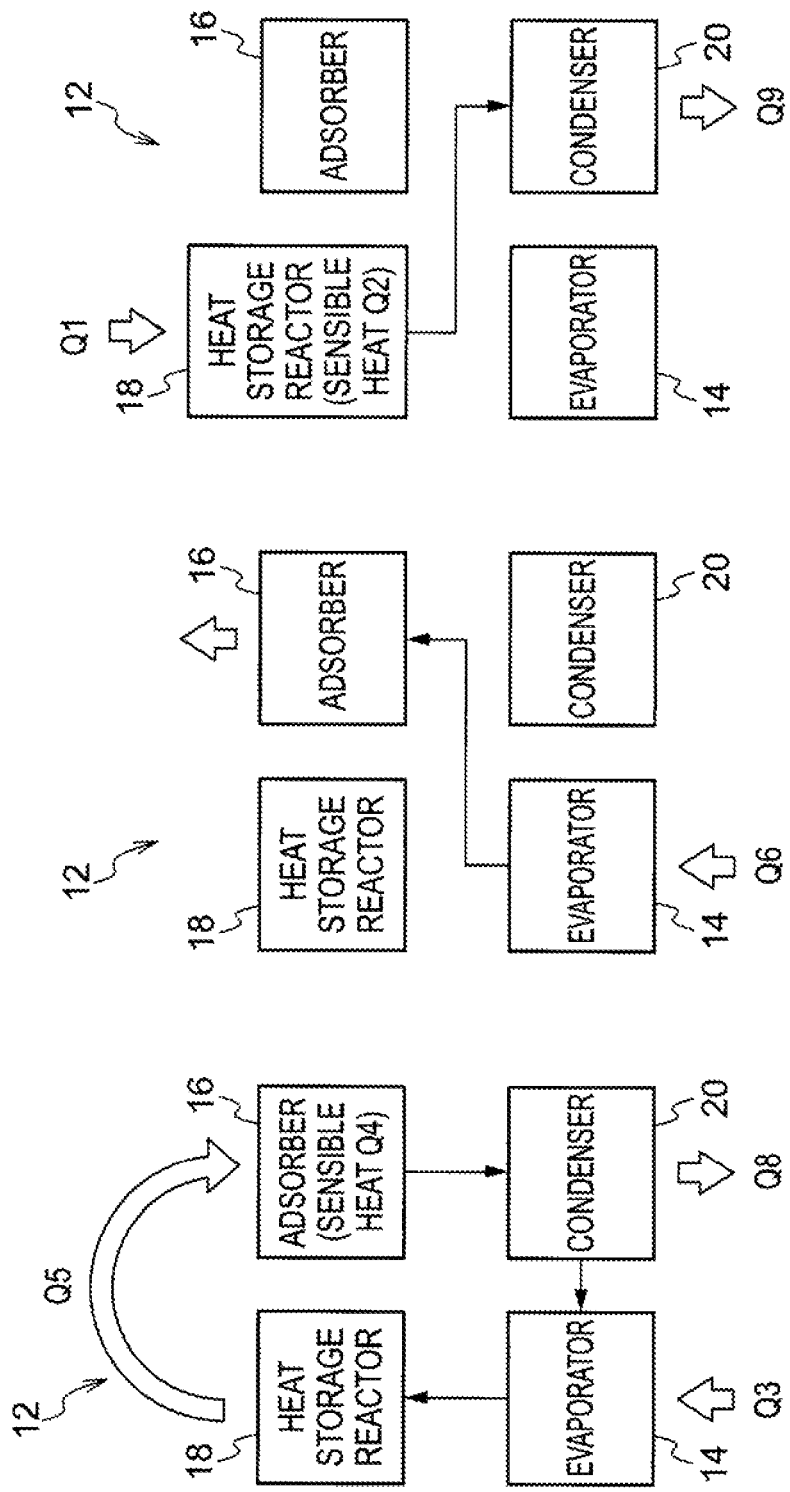

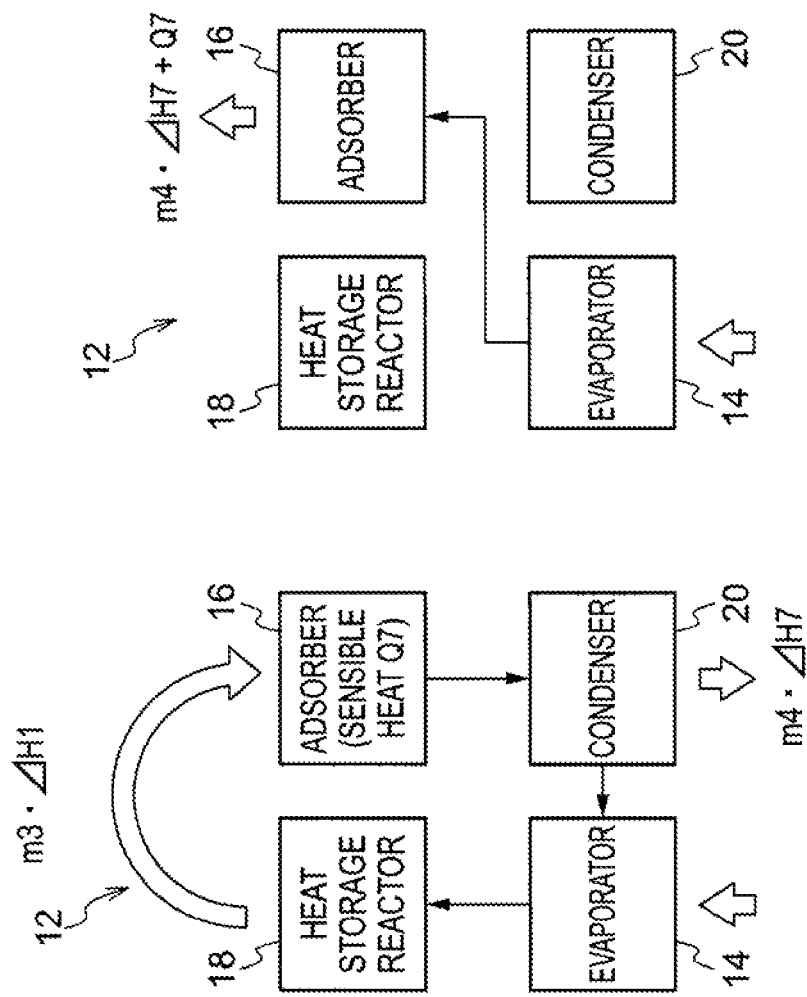

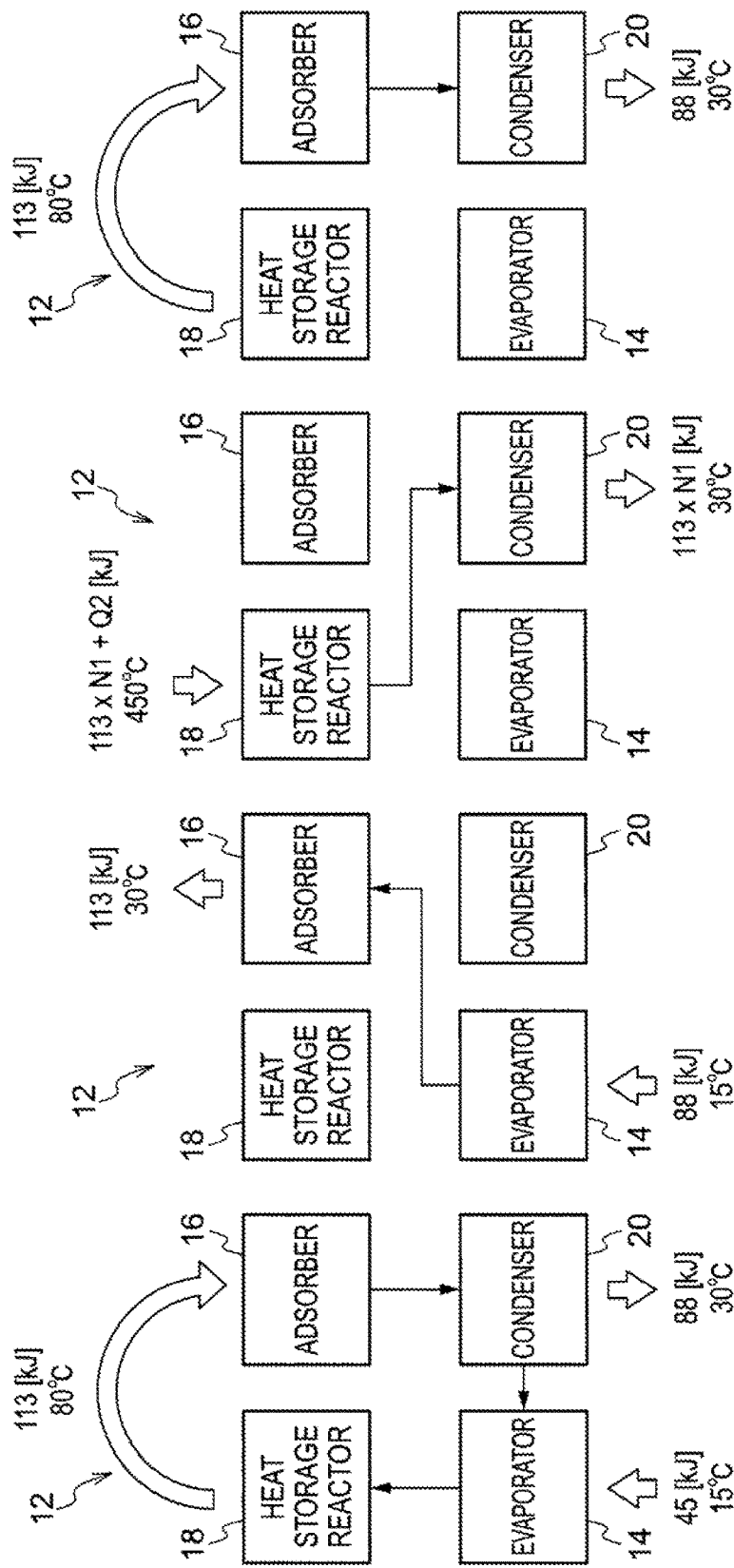

ADSORPTION HEAT PUMP SYSTEM AND METHOD OF GENERATING COOLING POWER

CROSS-REFERENCE TO RELATED APPLICATION

This application claims priority under 35 USC 119 from Japanese Patent Application No. 2012-183232 filed on Aug. 22, 2012, No. 2013-058830 filed on Mar. 21, 2013, and No. 2013-058919 filed on Mar. 21, 2013, the disclosures of which are incorporated by reference herein.

BACKGROUND OF THE INVENTION

Field of the Invention

The present invention relates to an adsorption heat pump system and a method of generating cooling power.

Description of the Related Art

Heat cycle systems using adsorption heat pumps have been hitherto used in a variety of fields, and application thereof has been made in apparatuses for air-conditioning and heating, hot water heaters, and the like.

Those adsorption heat pumps that have been suggested so far each include, in general, a pair of adsorbers, a condenser, and an evaporator (see, for example, Japanese Patent Application Laid-Open (JP-A) Nos. 2010-151386 and 2006-125713).

In an adsorption heat pump having such a configuration, if there is a large difference between the temperature upon adsorption and the temperature upon desorption in the adsorbers, the sensible heat loss (the amount of heat that cannot be utilized in actual energy exchange) becomes large. In an actual adsorption heat pump, it is desired to obtain cooling power more efficiently.

Furthermore, in the adsorption heat pump described in JP-A No. 2010-151386, the end timing of the desorption process and the end timing of the adsorption process in the adsorbers are respectively determined separately; however, it is desired to enable the generation of cooling power more continuously.

Furthermore, as an example of utilizing a heating mode that increases the coefficient of performance (COP), an adsorption heat pump type hot water heater has been suggested (for example, "24$^{th}$ Technology Development Investigation Business Result Presentation [P5.1.2] Development of high efficiency kerosene combustion apparatus using adsorption heat pump", [online], June 2010, Japan Petroleum Energy Center, [searched on Nov. 22, 2012], see the Internet <URL: http://www.pecj.or.jp/japanese/report/2010report/24data/p512.pdf>). In this system, usually, switching of the operation mode or a hot water supply operation is carried out by switching of the flow channel using a three-way valve. Specifically, an operation of adsorbing a fluid to one of the adsorbers and desorbing the fluid from the other adsorber (that is, regeneration of the adsorbers), and an operation of desorbing the fluid from the one adsorber and adsorbing the fluid to the other adsorber are carried out alternately.

In addition to this, adsorption chillers that operate as described above, and the like are also known (for example, "Adsorption chiller of Union Industry; Principle of adsorption chiller", [online], Union Industry Co., Ltd., [searched on Nov. 22, 2012], see the Internet <URL: http://www.union-reitouki.com/chiller/principle.html>).

In recent years, more attention has been paid to the preservation of the global environment, and in consideration of the fact that the movement toward energy saving has become more active, there is a demand for a further increase in the thermal efficiency even in those apparatuses that utilize adsorption heat pumps.

SUMMARY OF THE INVENTION

The present invention was made in view of the facts described above. That is, according to a first aspect of the invention, there is provided an adsorption heat pump system capable of efficient and continuous generation of cooling power. Also, according to a second aspect of the invention, there is provided a method of generating cooling power which is capable of generating cooling power efficiently and continuously.

On the other hand, in the case of performing a heat pump cycle for heating in a general adsorption heat pump that has been hitherto suggested, the carburetted energy can be defined as the sum of the heat of condensation ($Q^1$), the heat of adsorption ($Q^2$), and the sensible heat ($Q^3$) of the adsorber. However, under the current circumstances, the sensible heat at the adsorber that is represented by $Q^3$ has been discarded without being recovered. Meanwhile, in a system provided with plural adsorbers, the amount of heat for the fraction of sensible heat is not negligible, and is causative of an increase in the overall heat loss of the system.

However, when it is intended to recover the entirety of the heat energy occurring in a system (=$Q^1+Q^2+Q^3$), a structure for reducing the sensible heat loss that occurs in the adsorbers when the adsorption and desorption of the adsorbate are switched, is also required, and thus, the system as a whole becomes complicated. For example, in a system equipped with plural valves and flow channels, switching of flow channels is required in accordance with the switching of adsorption and desorption, and accordingly, the control of the valves also becomes complicated.

On the other hand, a system that uses fossil fuel with which heat energy is obtained by combustion thereof has a markedly large heat energy loss (sensible heat loss), and therefore, the COP value is generally low; in contrast, it is expected to obtain a relatively high COP value in a heat pump. However, in a system that utilizes heat through an adsorption and desorption processes using heat media, when a high temperature fluid (for example, 80° C.) and a low temperature fluid (for example, 30° C.) as heat media are switched, since the heat media remaining in the adsorbers are mixed with each other, a loss for the fraction of sensible heat in the heat media inevitably occurs. It is not easy to prevent such a heat loss in view of the configuration of the system.

Other embodiments of the invention were made in light of such a viewpoint. That is, according to a third aspect and a fourth aspect of the invention, there are provided adsorption heat pump systems having a small heat energy loss (sensible heat loss) and a high carburetion effect.

According to the first aspect of the invention, there is provided an adsorption heat pump system including an evaporator that evaporates a heat medium; and an adsorber that is connected with the evaporator, adsorbs the heat medium therein, and is also regenerated by receiving thermal energy at a temperature higher than or equal to the regeneration temperature for evaporating the heat medium.

This adsorption heat pump system includes an evaporator. Cooling power is generated as a result of the evaporation of the heat medium in this evaporator. Furthermore, this adsorption heat pump system includes an adsorber that is connected with the evaporator. Cooling power is generated in the evaporator, as the heat medium in the evaporator is adsorbed. The adsorber is regenerated at least partially by receiving thermal energy at a temperature higher than or equal to the regeneration temperature for evaporating the heat medium. The adsorber is capable of repeated adsorption of the heat medium in the evaporator through regeneration.

Further, when the generation of cooling power in the evaporator is carried out in two processes, efficient and continuous generation of cooling power is enabled.

According to the second aspect of the invention, there is provided a method of generating cooling power, the method including a first cooling power generation process of generating cooling power by evaporation of a heat medium resulting from an effect of pressure reduction by the chemical thermal storage reactor; a second cooling power generation process of generating cooling power by evaporation of a heat medium resulting from an effect of pressure reduction by the adsorber; and a regeneration process of regenerating the adsorber by applying thermal energy stored in the chemical thermal storage reactor to the adsorber to desorb the adsorbed heat medium, and thereby regenerating the adsorbent material.

In this method of generating cooling power, cooling power is generated in the first cooling power generation process, by the evaporation of a refrigerant resulting from the effect of pressure reduction by a heat storage material. Furthermore, in this method of generating cooling power, cooling power is generated in the second cooling power generation process, by the evaporation of a heat medium resulting from the effect of pressure reduction by an adsorbent material. In the regeneration process, the adsorbent material is subjected to the heat stored in the heat storage material, thereby the heat medium adsorbed to the adsorbent material is desorbed, and thus the adsorbent material is regenerated.

As such, when cooling power generation is carried out in two processes, namely, the first cooling power generation process and the second cooling power generation process, and at the same time, the adsorbent material is regenerated in the regeneration process, cooling power generation can be achieved efficiently and continuously. Particularly, in the regeneration process, since the heat of the heat storage material is utilized, the adsorbent material is regenerated in a stable manner.

The third aspect and the fourth aspect of the invention that will be described below were achieved based on the following findings. That is, it was found that in an adsorption heat pump, in order to increase the carburetion effect of heat energy, since the sensible heat loss caused by the fluid for heat exchange (so-called heat medium) cannot be neglected, when the transfer of sensible heat by a heat medium is replaced by a transfer by means of latent heat utilizing a material having a large latent heat of evaporation, such as ammonia or water vapor, switching of the heat media and the flow channels thereof becomes unnecessary, and the wastefulness of sensible heat that occurs when heat media at different temperatures are mixed, can also be diminished.

According to the third aspect of the invention, there is provided an adsorption heat pump system configured to include:

a first fluid;
a second fluid which is the same in type as the first fluid;
a first evaporator that evaporates the first fluid;
a second evaporator that evaporates the second fluid;
an adsorber that comprises a first fluid retaining unit which is capable of retaining and releasing the first fluid, and the second fluid retaining unit which is capable of retaining and releasing the second fluid, the first fluid retaining unit and the second fluid retaining unit being in a thermally connected state, and at least one of the first fluid retaining unit or the second fluid retaining unit comprising an adsorbent material that releases reaction heat when the adsorbent material retains a supplied fluid; and a condenser that is connected with the first fluid retaining unit and the second fluid retaining unit of the adsorber and that condenses the first fluid and the second fluid released from the first fluid retaining unit and the second fluid retaining unit.

In regard to the third aspect of the invention, the use amounts of the fluids for heat exchange (so-called heat media) are minimized by using sensible heat heating (for example, water vapor heating) and latent heat cooling, and the sensible heat loss that is likely to occur in the adsorber at the time of adsorption or desorption of an operating fluid (for example, ammonia or water vapor), which is an adsorbate in the adsorber, is reduced while at the same time, the heat energy used therein is gathered at one site (condenser) and recovered. Thereby, the sensible heat loss is prevented, and the COP can be effectively enhanced.

Specifically, in an adsorption heat pump system which attempts utilization of heat energy by supplying a first fluid from the first evaporator to the adsorber, temporarily retaining the supplied first fluid with an adsorbent material, and desorbing the retained first fluid, since the adsorber includes a first fluid retaining unit to which the first fluid is supplied, and in which the first fluid is retained and the retained fluid is desorbed; and a second fluid retaining unit to which the second fluid is supplied, and in which the first fluid is retained and the retained fluid is desorbed, with the first fluid retaining unit and the second fluid retaining unit being in a thermally connected state, heat exchange is carried out between the first fluid retaining unit and the second fluid retaining unit. Then, for example, as described below, the entirety of the heat utilized between the two fluid retaining units is recovered at the condenser. That is, when the second fluid which is a heated gas is sent to the second fluid retaining unit, the second fluid is retained at the second fluid retaining unit by being condensed therein and thereby undergoing phase change into a liquid phase, and at the same time, the heat of condensation is released. The first fluid retaining unit is heated by the heat of the second fluid and the heat of condensation thus released, and the first fluid that has been retained in the first fluid retaining unit is desorbed, while the desorbed first fluid is sent to the condenser.

At this time, at the second fluid retaining unit, the amount of the second fluid as a liquid increases, and the amount of the first fluid that is retained in the first fluid retaining unit gradually decreases. When the first fluid that is retained in the first fluid retaining unit decreases as such, subsequently the first fluid as a gas is supplied from the first evaporator.

When the first fluid as a gas is sent to the first fluid retaining unit, the first fluid is adsorbed to the adsorbent material and is retained in the first fluid retaining unit, and also releases the heat of adsorption. The second fluid retaining unit is heated by the heat of adsorption thus released, and the second fluid retained in the second fluid retaining unit is desorbed. The desorbed second fluid is sent to the condenser. At this time, in the first fluid retaining unit, the amount of adsorption of the first fluid to the adsorbent material increases, and the second fluid as a liquid at the second fluid retaining unit gradually decreases as a result of vaporization.

As the processes described above are repeated, the heat energy that has been utilized can be continuously recovered in the condenser.

Furthermore, in the adsorber, one or both of the first fluid retaining unit and the second fluid retaining unit have an adsorbent material that releases the reaction heat when the adsorbent material retains a supplied fluid. Thereby, retention by adsorption of a fluid by the adsorbent material is achieved in at least one of the fluid retaining units, and thus the heat of adsorption is obtained.

According to the fourth aspect of the invention, there is provided an adsorption heat pump system configured to include:

a first fluid;

a second fluid which is the same in type as the first fluid;

a first evaporator that evaporates the first fluid;

a second evaporator that evaporates the second fluid;

an adsorber that comprises a first fluid retaining unit and a second fluid retaining unit, and at least one of the first fluid retaining unit or the second fluid retaining unit comprising an adsorbent material that releases reaction heat when the adsorbent material retains a supplied fluid;

a chemical thermal storage reactor that comprises a first fluid retaining unit which is capable of generating reaction heat by reacting with the first fluid from the first evaporator, and releasing the reaction heat to adsorber through the latent heat of the second fluid generated by the second evaporator which is thermally connected with the first fluid retaining unit of the chemical thermal storage reactor; and a condenser that is connected with the first fluid retaining unit and the second fluid retaining unit of the adsorber and that condenses the first fluid and the second fluid released from the first fluid retaining unit and the second fluid retaining unit.

In regard to the fourth aspect of the invention, the use amounts of the fluids for heat exchange (so-called heat media) are minimized by using latent heat heating (for example, water vapor heating) and latent heat cooling, and the sensible heat loss that is likely to occur in the adsorber at the time of adsorption or desorption of an operating fluid (for example, ammonia or water vapor), which is an adsorbate in the adsorber, is reduced while at the same time, the heat energy used therein is gathered at one site (condenser) and recovered. Thereby, the sensible heat loss is prevented, and the COP can be effectively enhanced.

According to the fourth aspect of the invention, utilization of heat energy is achieved by supplying the first fluid or the second fluid from the evaporator or the chemical thermal storage reactor to the adsorber, and repeating retention and desorption of the supplied fluid. Specifically, in an adsorption heat pump system which attempts utilization of heat energy by temporarily retaining a fluid that is supplied from the evaporator or a chemical thermal storage reactor and generates the latent heat of evaporation, and desorbing the retained fluid, since the adsorber includes a first fluid retaining unit to which the first fluid is supplied, and in which the first fluid is retained and the retained fluid is desorbed; and a second fluid retaining unit to which the second fluid is supplied, and in which the second fluid is retained and the retained fluid is desorbed, with the first fluid retaining unit and the second fluid retaining unit being in a thermally connected state, heat exchange between the first fluid retaining unit and the second fluid retaining unit is carried out, for example, in the following manner, and the heat utilized between the two fluid retaining units is recovered at the condenser. That is, when the second fluid that has been heated at the chemical thermal storage reactor and vaporized (heated fluid) is sent to the second fluid retaining unit, the second fluid is retained in the second fluid retaining unit by, for example, being condensed and undergoing phase change to a liquid phase, and also releases heat (for example, heat of condensation). The first fluid retaining unit is heated by the heat of the second fluid and the heat of condensation, and the first fluid that is retained in the first fluid retaining unit is desorbed, while the desorbed first fluid is sent to the condenser. At this time, at the second fluid retaining unit, the amount of the second fluid increases, and the amount of the first fluid that is retained in the first fluid retaining unit gradually decreases. When the first fluid that is retained in the first fluid retaining unit decreases as such, subsequently the first fluid as a gas is supplied from the first evaporator. When the first fluid as a gas is sent to the first fluid retaining unit, the first fluid is retained (for example, retained by being adsorbed to an adsorbent material) at the first fluid retaining unit, and also releases heat (for example, heat of adsorption). The second fluid retaining unit is heated by the released heat (for example, heat of adsorption), and the second fluid that has been retained in the second fluid retaining unit is desorbed, while the desorbed second fluid is sent to the condenser. At this time, at the first fluid retaining unit, the retention amount of the first fluid (for example, the amount of adsorption to the adsorbent material) increases, the second fluid as a liquid in the second fluid retaining unit is vaporized, and the retention amount of the second fluid gradually decreases.

According to the fourth aspect of the invention, supply of the second fluid to the adsorber is carried out by the chemical thermal storage reactor. The chemical thermal storage reactor is in charge of the function of vaporization of the second fluid by the reaction heat of the chemical heat storage material, and the function of supply as a heater that sends the heated second fluid as a gas and thereby heats the adsorber. Specifically, when the second fluid that has been vaporized at the chemical thermal storage reactor as described above is sent to the second fluid retaining unit, the first fluid is supplied from the evaporator to the heat storage reaction unit of the chemical thermal storage reactor, and the reaction heat generated when the first fluid is immobilized using the chemical heat storage material of the heat storage reaction unit by means of, for example, the reactions (1), (2) and (3) described below (at the time of the reaction that proceeds toward the right-hand side in the reversible reactions (1) to (3) described below), is heat exchanged at the fluid vaporizing unit of the chemical thermal storage reactor and vaporizes the second fluid inside the fluid vaporizing unit, while the second fluid in a gas form is sent to the second fluid retaining unit of the adsorber. At this time, it is configured such that the first fluid (if the first fluid and the second fluid are identical fluids, the first fluid and the second fluid) that has been condensed in the condenser is supplied to the evaporator, and the condensed second fluid (if the first fluid and the second fluid are identical fluids, the first fluid and the second fluid) is supplied to the chemical thermal storage reactor. Meanwhile, when the amount of fluid that has been immobilized in the chemical heat storage material of the heat storage reaction unit reaches a predetermined threshold, the chemical heat storage material is regenerated by, for example, heating from an external source.

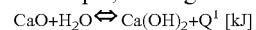 (1)

$$CaCl_2 \cdot 2NH_3 + 6NH_3 \Leftrightarrow CaCl_2 \cdot 8NH_3 + Q^2 \text{ [kJ]} \quad (2)$$

$$MgCl_2 \cdot 2NH_3 + 4NH_3 \Leftrightarrow MgCl_2 \cdot 6NH_3 + Q^3 \text{ [kJ]} \quad (3)$$

As retention and desorption of the fluids at the adsorber are repeated as described above, recovery of the utilized heat energy can be continuously carried out at the condenser.

BRIEF DESCRIPTION OF THE DRAWINGS

Exemplary embodiments of the present invention will be described in detail based on the following figures, wherein:

FIGS. 2A to 2C are explanatory diagrams illustrating the state in the case of generating cooling power in the adsorption heat pump system of Exemplary Embodiment 1 of the invention;

FIGS. 3A to 3B are explanatory diagrams illustrating the state in the case of storing and recovering heat in the adsorption heat pump system of Exemplary Embodiment 1 of the invention;

FIGS. 7A to 7D are explanatory diagrams illustrating the state in the case of generating hot energy by carbureting with the adsorption heat pump system in the Examples of the invention;

DETAILED DESCRIPTION OF THE INVENTION

Hereinafter, exemplary embodiments of the adsorption heat pump system of the invention (hereinafter, simply referred to as an "adsorption heat pump" or "heat pump") will be specifically described with reference to the drawings. However, the invention is not intended to be limited to the exemplary embodiments described below.

Exemplary Embodiment 1

Figure 1:
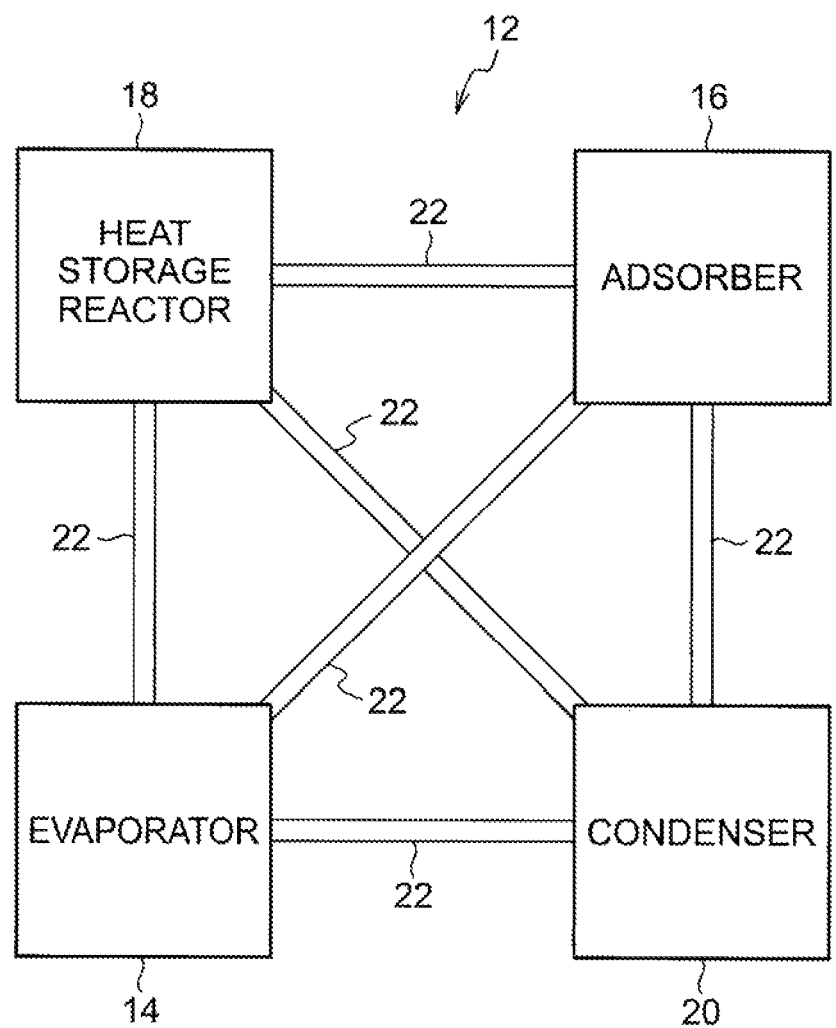
FIG. 1 is a schematic diagram illustrating the configuration of the adsorption heat pump system of Exemplary Embodiment 1 of the invention.

FIG. 1 illustrates an adsorption heat pump system 12 of Exemplary Embodiment 1 of the invention.

A heat pump 12 includes an evaporator 14, an adsorber 16, a chemical thermal storage reactor 18, and a condenser 20. These are connected with each other through piping 22. The piping is provided with valves that are not illustrated in the diagram, and transfer of a heat medium is enabled by opening the valves. In the following description, when it is said that two members are simply "connected", this means that transfer of a heat medium is enabled by opening valves in the piping between these two members.

The evaporator 14 is capable of carrying out the operation of evaporating a heat medium and absorbing energy (heat quantity) from the outside by the heat of vaporization at the time of the evaporation (cooling power generation).

The adsorber 16 accommodates an adsorbent material. The adsorber is capable of carrying out the operation of inducing the heat of adsorption by adsorbing a medium by means of the adsorbent material, and releasing this heat of adsorption to the outside (heat energy generation). Furthermore, the adsorber is capable of absorbing the operated energy from the outside (by absorbing heat), and desorbing the adsorbed medium. At this time, the adsorber 16 is regenerated and is brought to a state capable of adsorbing a heat medium with an adsorbent material again.

The chemical thermal storage reactor 18 accommodates a heat storage material. In the present exemplary embodiment, since water is used as a heat medium, a chemical heat storage material which undergoes a chemical reaction with a heat medium by means of energy that has been applied from the outside and induces the reaction heat (a portion of the energy from the outside becomes the sensible heat) is used as the heat storage material. Particularly, in the invention, the heat storage material is defined in the relationship with the heat medium so that the reaction heat occurs in an amount more than or equal to that of the latent heat of evaporation of the heat medium.

Further, the chemical thermal storage reactor 18 is considered to be capable of storing the reaction heat and to be capable of releasing heat to the adsorber 16 at a temperature higher than or equal to a temperature to regenerate the adsorber 16.

The condenser 20 is capable of carrying out the operation of condensing the heat medium sent from the chemical thermal storage reactor 18 or the adsorber 16, and releasing the heat of condensation to the outside (heat energy generation). Furthermore, the condenser 20 is also capable of sending the heat medium after condensation to the evaporator 14.

In addition, the condenser 20 may be omitted, but in this case, the heat medium may be released to the outside of the heat pump 12 without condensing the heat medium.

Next, in regard to the heat pump 12 of the present exemplary embodiment, the process of generating cooling power (cooling power generation mode) and the process of generating heat (heat energy generation mode) will be described. First, a generalized embodiment of the cooling power generation mode will be described.

[Cooling Power Generation Mode]

<Cooling Power Generation Operation 1>

In the cooling power generation operation 1, first, as illustrated in FIG. 2A, the chemical thermal storage reactor 18 and the evaporator 14 are connected, and the adsorber 16 and the condenser 20 are connected. As a result of the action of pressure reduction in the heat storage material of the chemical thermal storage reactor 18, the heat medium evaporates in the evaporator 14, and cooling power Q3 is generated. In the chemical thermal storage reactor 18, the heat medium and the heat storage material react with each other, and the reaction heat Q5 is generated.

The adsorber 16 is subjected to this reaction heat Q5, and thereby the heat medium adsorbed to the adsorbent material is desorbed (regeneration of a part or the entirety of the adsorbent material is enabled). In the present exemplary embodiment, since the condenser 20 is available, the desorbed heat medium is condensed by the condenser 20. At this time, the heat Q8 generated in the condenser 20 may be used. However, the heat medium may be released to the outside of the heat pump 12 without being condensed by the condenser 20, and in this case, the condenser 20 is unnecessary. The condensed heat medium is sent to the evaporator 14. The operation described above is the cooling power generation operation 1.

<Cooling Power Generation Operation 2>

When the adsorber 16 is completely regenerated by the cooling power generation operation 1 described above, as illustrated in FIG. 2B, the adsorber 16 and the evaporator 14 are connected. The adsorber 16 adsorbs the heat medium, the heat medium evaporates in the evaporator 14 by an operation of pressure reduction, and thus cooling power Q6 is generated. The operation described above is the cooling power generation operation 2.

As the cooling power generation operation 1 and the cooling power generation operation 2 are alternately repeated in this manner, cooling power Q3 and cooling power Q6 can be alternately generated in the heat pump 12. Therefore, when compared with a heat pump having a configuration that does not include the chemical thermal storage reactor 18, cooling power can be generated efficiently and continuously.

In addition, regeneration of the chemical thermal storage reactor 18 (heat storage material) may also be carried out at desired timings with regard to the repetition of the cooling power generation operation 1 and the cooling power generation operation 2. For example, after the cooling power generation operation 1 and the cooling power generation operation 2 are repeated several times (in a state of having completed the cooling power generation operation 2), as illustrated in FIG. 2C, the chemical thermal storage reactor 18 and the condenser 20 are connected. Then, energy for regeneration Q1 is applied to the chemical thermal storage reactor 18, and thereby the heat storage material can be regenerated. At this time, if a heat source is available in the outside of this heat pump 12, the heat supplied from the heat source may be utilized.

Furthermore, in the chemical thermal storage reactor 18, not only the reaction heat occurs, but also the sensible heat Q2 occurs. As illustrated in FIG. 2C, the heat medium whose temperature has been raised is transferred to the adsorber 16 and is condensed at the condenser 20, and thereby heat Q9 can be generated.

Next, the coefficient of performance (COP) of the heat pump 12 will be explained.

When the reaction heat per mole of the heat medium in the chemical thermal storage reactor 18 is designated as $\Delta H1$ [kJ/mol], the total amount of reaction is designated as m1 [mol], and the sensible heat is designated as Q2 [kJ], the energy Q1 applied to the chemical thermal storage reactor 18 is defined as follows:

$$Q = m1 \cdot \Delta H1 + Q2 \text{ [kJ]}$$

Furthermore, when the latent heat of evaporation of the heat medium is designated as $\Delta H2$ [kJ], the amount of cooling power generation Q3 [kJ] in the evaporator 14 is defined as follows:

$$Q3 = m1 \cdot \Delta H2 \text{ [kJ]}$$

When the amount of the heat medium that is operated to perform one round of the cooling power generation operation 1 is designated as m2 [mol], the heat of adsorption and desorption is designated as $\Delta H3$ [kJ/mol], and the sensible heat at the adsorber 16 is designated as Q4 [kJ], the energy of heat Q5 [kJ/time] that is applied from the chemical thermal storage reactor 18 for the regeneration of the adsorber 16 is defined as follows:

$$Q5 = m2 \cdot \Delta H3 + Q4 \text{ [kJ]}$$

In fact, since the total energy of the chemical thermal storage reactor 18 is applied to the adsorber 16 dividedly in several times, when this number is designated as N, the adsorber 16 is subjected to energy in an amount of $$Q6 = N \cdot m2 \cdot \Delta H2 \text{ [kJ]}$$

In the cooling power generation operation 2, this energy is the cooling power generated at the evaporator 14.

Therefore, the total amount of cooling power generation Q7 in the overall processes described above is defined as follows:

$$Q7 = Q3 + Q6 = m1 \cdot \Delta H2 + N \cdot m2 \cdot \Delta H2 \text{ [kJ]}$$

Since the energy applied from an external source to the heat pump 12 is Q1 [kJ], the coefficient of performance COP is defined as follows:

$$\begin{aligned} COP &= Q7/Q1 \\ &= (Q3 + Q6)/Q1 \\ &= (m1 \cdot \Delta H2 + N \cdot m2 \cdot \Delta H2)/(m1 \cdot \Delta H1 + Q2) \end{aligned}$$

The reaction heat generated in the chemical thermal storage reactor 18 is $m1 \cdot \Delta H1$ [kJ], and this is substantially equal to N times of the energy of heat Q5 that is applied from the chemical thermal storage reactor 18 for the regeneration of the adsorber 16. That is, $$m1 \cdot \Delta H1 = N \cdot (m2 \cdot \Delta H3 + Q4) \text{ [kJ]}$$

From now on, $$m2 = ((m \cdot \Delta H1)/N - Q4/\Delta H3$$

Accordingly, the coefficient of performance COP is defined as follows:

$$COP = ((m1 + ((m1 \cdot \Delta H1)/N - Q4/(\Delta H3 \cdot N)) \cdot \Delta H2)/$$

$$(m1 \cdot \Delta H1 + Q2)$$

$$((\Delta H3 \cdot m1 + (m1 \cdot \Delta H1) - N \cdot Q4) \cdot (\Delta H2/\Delta H3))/$$

$$(m1 \cdot \Delta H1 + Q2)$$

In general, since the relationship of heat of adsorption z latent heat of evaporation is established with regard to the heat medium, when it is defined such that $\Delta H2 = \Delta H3$, the COP is defined as follows:

$$COP = ((m1 \cdot \Delta H3 + \Delta H1) - N \cdot Q4)/(m1 \cdot \Delta H1 + Q2)$$

As can be seen from this equation, in order to increase the COP, it is desirable to satisfy the condition that the sensible heat Q2 for the chemical thermal storage reactor 18 is sufficiently smaller than the reaction heat $m1 \cdot \Delta H1$ (that is, $Q2 \ll m1 \cdot \Delta H1$), and the sensible heat in N times of processes in the adsorber 16, that is, $N \cdot Q4$, is sufficiently smaller than the heat of adsorption $m1 \cdot \Delta H2$ at the adsorber 16 (that is, $N \cdot Q4 \ll m1 \cdot \Delta H2 = m1 \cdot \Delta H13$). In this case, the overall sensible heat loss with regard to the heat pump 12 is decreased. Particularly, as N approaches 1, the COP increases and becomes close to 1. Indeed, when it is considered that Q2 and Q4 are sensible heat values, since Q2 and Q4 are smaller as compared with the reaction heat at the chemical thermal storage reactor 18 or the adsorber 16, a heat pump 12 capable of efficient cooling power generation is obtained.

Since the heat pump 12 of the present exemplary embodiment includes the chemical thermal storage reactor 18, the heat pump 12 also operates as a heat storage system. In the following description, the coefficient of performance (COP) in the case where the heat pump 12 is regarded as a heat storage system will be explained.

<Heat Storage and Recovery Operation 1>

First, as illustrated in FIG. 3A, the case in which the evaporator 14 and the chemical thermal storage reactor 18 are connected, and the adsorber 16 and the condenser 20 are connected, will be considered. When it is presumed that a heat medium of m3 [mol] is transferred from the evaporator 14 to the chemical thermal storage reactor 18, an amount of heat of $m3 * \Delta H1$ [kJ] is generated in the chemical thermal storage reactor 18. This amount of heat is fed to the adsorber 16. When the amount of transfer of the heat medium is designated as m4 [mol], and the sensible heat of the adsorber 16 is designated as Q7 [kJ], the following relationship is established:

$$m3 \cdot \Delta H1 = m4 \cdot \Delta H3 + Q7$$

The heat medium desorbed at the adsorber 16 is condensed at the condenser 20. Since the latent heat of evaporation of the heat medium is $\Delta H2$, heat in an amount of $m2 \cdot \Delta H2$ at a temperature higher than the external air temperature can be recovered.

<Heat Storage and Recovery Operation 2>

Next, as illustrated in FIG. 3B, the adsorber 16 and the evaporator 14 are connected. Then, the heat medium is evaporated from the evaporator 14 and is adsorbed at the adsorber 16. When the amount of transfer of the heat medium at this time is designated as m4 [mol], the sensible heat Q7 at the adsorber 16 can also be recovered. That is, heat in an amount of $m4 \cdot \Delta H2 + Q7$ can be recovered.

When the amounts of heat obtained in the heat storage and recovery operation 1 and the heat storage and recovery operation 2 are summed, heat in an amount of $2(m4 \cdot \Delta H2) + Q7$ can be recovered. Since the amount of heat energy generation at the heat pump 12 was $m3 \cdot \Delta H1$, the coefficient of performance COP is defined as follows:

$$COP = (2(m4 \cdot \Delta H2) + Q7)/(m3 \cdot \Delta H1)$$

$$= (2(m4 \cdot \Delta H2) + Q7)/(m4 \cdot \Delta H3 + Q7)$$

Herein, when it is assumed that $\Delta H2 = \Delta H3$, the COP is defined as follows:

$$COP = (2(m4 \cdot \Delta H3) + Q7)/(m4 \cdot \Delta H3 + Q7)$$

$$= 1 + (m4 \cdot \Delta H3)/(m4 \cdot \Delta H3 + Q7)$$

Thus, it is understood that a heat pump 12 which operates as a heat storage system having a COP value of 1 or greater, is constructed.

Figure 4B:
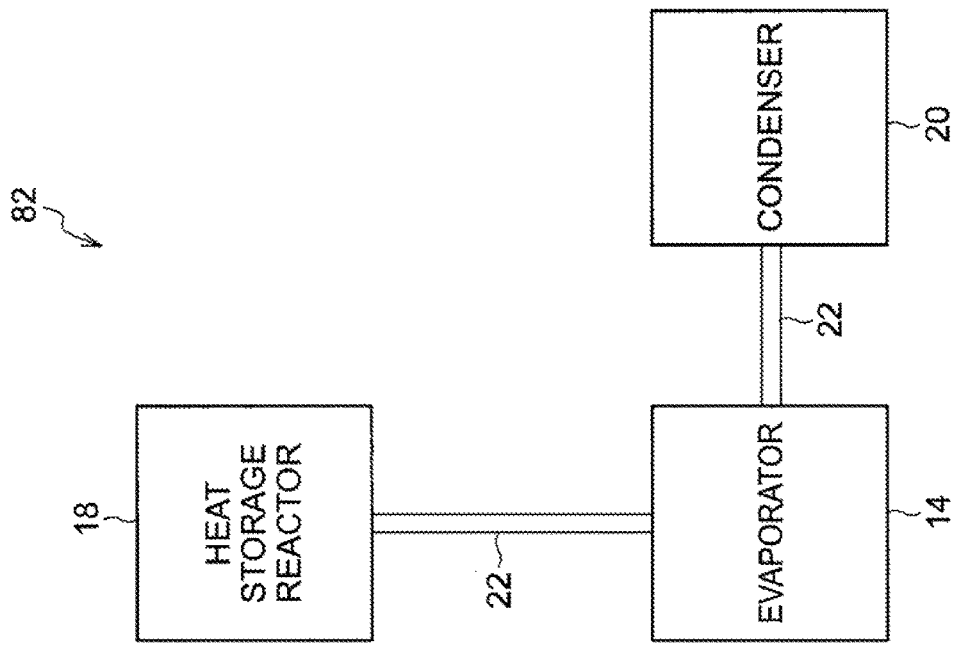
FIG. 4B is a schematic diagram illustrating the configuration of the heat storage system of Comparative Example 2.
Figure 4A:
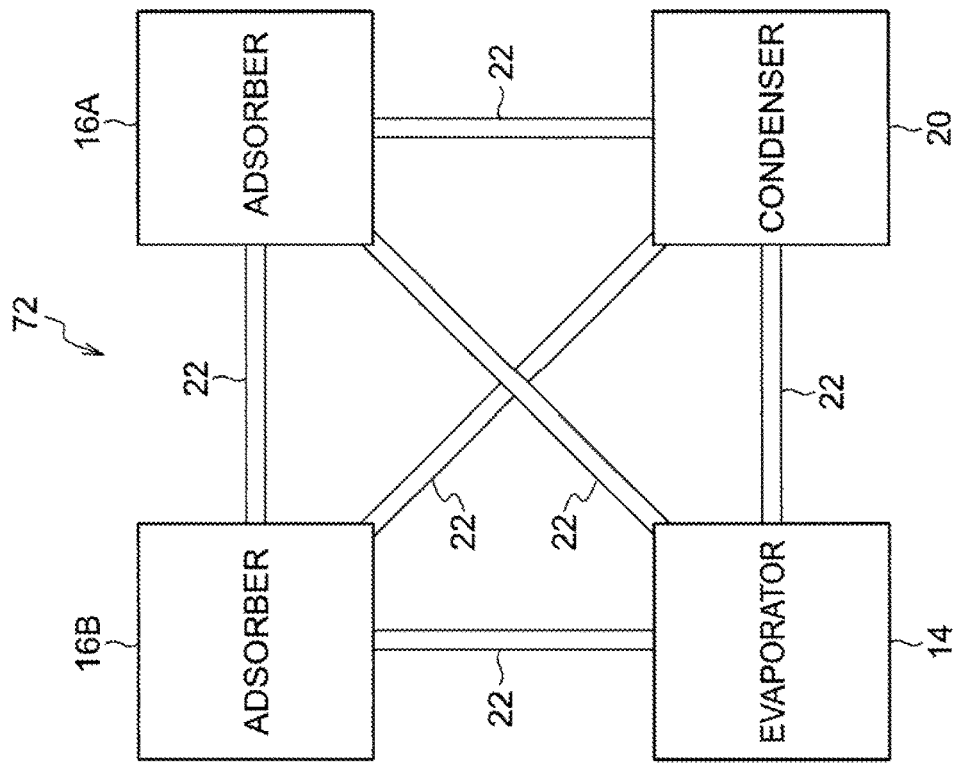
FIG. 4A is a schematic diagram illustrating the configuration of the adsorption heat pump system of Comparative Example 1.

Here, FIG. 4A illustrates, as Comparative Example 1, a heat pump 72 which does not have a chemical thermal storage reactor 18 but has two adsorbers 16A and 16B. Furthermore, FIG. 4B illustrates, as Comparative Example 2, a heat storage system 82 configured to include an evaporator 14, a chemical thermal storage reactor 18 and a condenser 20. Meanwhile, in regard to these heat pump 72 and heat storage system 82, members that provide the same action as that in the exemplary embodiment described above will be conveniently assigned with the same reference symbol.

In the heat pump 72 of Comparative Example 1, the temperature fluctuation (so-called temperature swing) at the time of repeating adsorption and desorption in the adsorbers 16A and 16B is large, and this becomes the sensible heat loss. Therefore, it is difficult to increase the coefficient of performance COP. Furthermore, when it is attempted to obtain a sufficient amount of cooling power or heat, the volumes of the adsorbers 16 also become large.

In the heat storage system 82 of Comparative Example 2, it is possible to accumulate (store) heat in the chemical thermal storage reactor 18; however, since the reaction heat at the evaporator 14 (latent heat of evaporation) and the reaction heat at the time of supplying heat to the chemical thermal storage reactor 18 differ from each other, the amount of extraction of cooling power is relatively smaller as compared with the amount of extraction of heat.

On the contrary, as can be seen when FIG. 1 is compared with FIG. 4A, the heat pump 12 of the present exemplary embodiment is configured such that one of the adsorbers 16 of Exemplary Embodiment 1 (in the example illustrated in the diagram, adsorber 16B) is replaced with a chemical thermal storage reactor 18. Since the chemical thermal storage reactor 18 is such that the temperature of the temperature swing is higher than or equal to a temperature to regenerate the adsorber 16, the sensible heat loss is decreased by the recovery of sensible heat.

Furthermore, in the heat pump 12 of the exemplary embodiment described above, since the reaction heat generated at the chemical thermal storage reactor 18 can be utilized in the regeneration at the adsorber 16, this can contribute to an enhancement of the coefficient of performance COP. In addition, since heat can be supplied from the chemical thermal storage reactor 18 to the adsorber 16 without waiting for a heat supply from the outside to the adsorber 16, cooling power or heat can be generated early, and thus startability is enhanced.

Furthermore, when compared with the heat storage system 82 of Comparative Example 2 illustrated in FIG. 4B, in the heat pump system 12 of the present exemplary embodiment, cooling power can be generated using the heat accumulated in the chemical thermal storage reactor 18, and therefore, storage and generation of a substantially larger amount of cooling power can be achieved.

Meanwhile, in order to provide both the effect of an enhancement of the coefficient of performance and an enhancement of startability in the heat pump 72 of Comparative Example 1, and the effect of storage and generation of a large amount of cooling power in the heat storage system 82 of Comparative Example 2, it can also be considered to simply combine the configuration of the heat pump 72 and the configuration of the heat storage system 82. However, such a simple combination results in a configuration which includes two evaporators 14, two adsorbers 16 and two condensers 20.

On the contrary, in the heat pump 12 of the present exemplary embodiment, the number of evaporators 14 or condensers 20 may be smaller (including one each) as compared with such a simple combination. Furthermore, piping for connecting these or valves are also unnecessary. Thereby, simplification of the structure can be attempted in the heat pump 12 of the present exemplary embodiment.

The exemplary embodiment described above illustrates a configuration including only one chemical thermal storage reactor 18, but a configuration including plural chemical thermal storage reactors 18 is also acceptable.

Exemplary Embodiment 2

Figure 5:
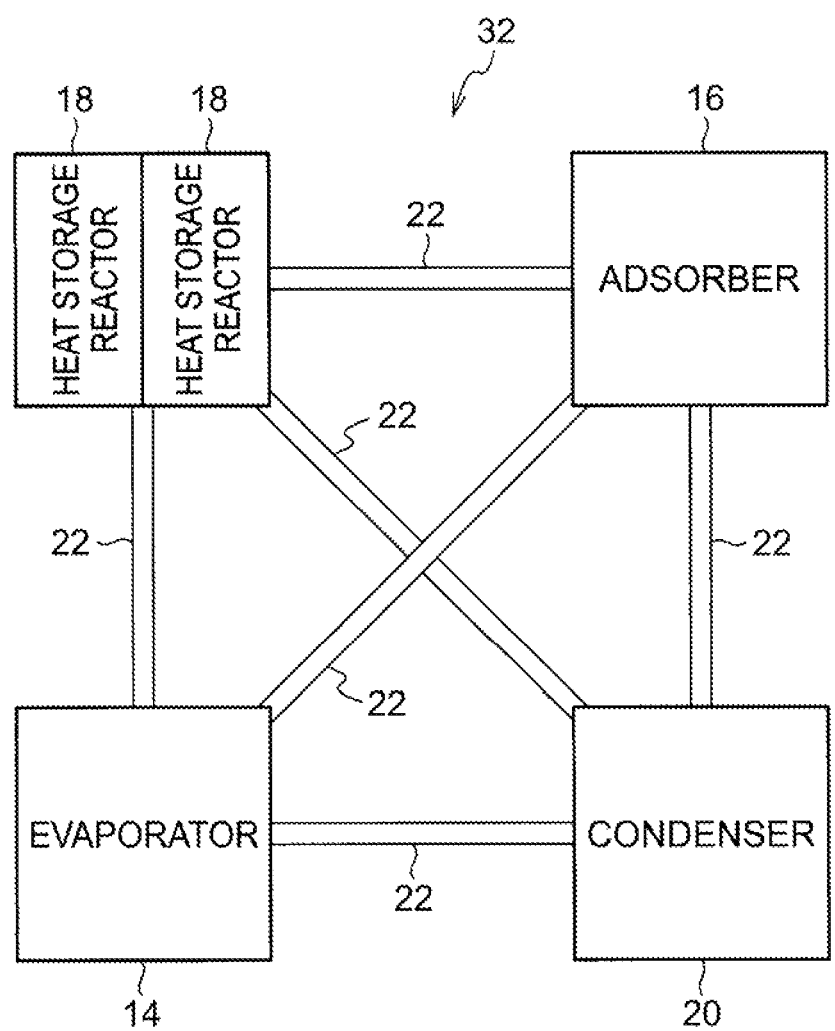
FIG. 5 is a schematic diagram illustrating the configuration of the adsorption heat pump system of Exemplary Embodiment 2 of the invention.

FIG. 5 illustrates a heat pump 32 of Exemplary Embodiment 2 which includes two chemical thermal storage reactors 18A and 18B. Meanwhile, in FIG. 5, the two chemical thermal storage reactors 18A and 18B are arranged side by side, but these chemical thermal storage reactors 18A and 18B can also be connected evenly (in parallel) to the evaporator 14, adsorber 16 and condenser 20 and operated each independently.

In the heat pump 32 of Exemplary Embodiment 2, regeneration of two chemical thermal storage reactors 18 can be alternately carried out. In this configuration, regeneration of the chemical thermal storage reactor 18 can be carried out by receiving thermal energy from an external heat source while the adsorber 16 is carrying out the adsorption of the heat medium. The external heat source may be an electric heater, or may be the waste heat obtainable from an engine or a motor. In regard to the heat pump 72, when the vehicle needs air-conditioning or heating, cooling power or heat may be generated by carrying out the respective operations illustrated in FIG. 3 and FIG. 4 using the chemical thermal storage reactor 18 and adsorber 16 that have been regenerated, and the condenser 20.

As such, in the present exemplary embodiment, regeneration of the chemical thermal storage reactor 18 that has received heat supplied from an external heat source, and driving of the heat pump 12 (generation of cooling power or heat) can be carried out simultaneously by including plural chemical thermal storage reactors 18.

Meanwhile, in the invention, the amount of stored heat in the chemical thermal storage reactor 18 may be greater than or equal to the heat capacity of the adsorber 16 (sum of the amount of heat required for regeneration and the sensible heat). Particularly, when the amount of stored heat is twice or more of the heat capacity of the adsorber 16, it is preferable because the degree of freedom in the regeneration timing for the adsorber 16 is increased.

In regard to the various exemplary embodiments described above, for example, water or ammonia can be used as the heat medium. Regarding the adsorbent material for the adsorber 16, any material capable of adsorption and desorption of the heat medium may be used, and for example, silica gel can be used in the present exemplary embodiment.

Regarding the heat storage material for the chemical thermal storage reactor 18, in addition to a chemical heat storage material that undergoes a chemical reaction with a heat medium, a physical adsorbent material (heat storage material) that physically adsorbs a heat medium by means of pores or the like may also be used.

The chemical heat storage material in the case where the heat medium is water is more preferably an oxide or hydroxide of an alkali metal or an alkaline earth metal, or a composite thereof, from the viewpoint of further increasing the heat storage density in the chemical thermal storage reactor 18, and examples thereof include inorganic hydroxides of alkaline earth metals, such as calcium hydroxide ($Ca(OH)_2$), magnesium hydroxide ($Mg(Oi)_2$), and barium hydroxide ($Ba(OH)_2$) or a hydrate thereof ($Ba(OH)_2.H_2O$); inorganic hydroxides of alkali metals, such as lithium hydroxide monohydrate ($LiOH.H_2O$); and inorganic oxides such as aluminum oxide trihydrate ($Al_2O_3.3H_2O$). Among them, a hydration reactive heat storage material that absorbs heat as a result of a dehydration reaction and releases heat as a result of a hydration reaction is preferred, and particularly, calcium hydroxide ($Ca(OH)_2$) is preferred. Furthermore, regarding the chemical heat storage material, commercially available products that are sold in the market may also be used.

Calcium hydroxide ($Ca(OH)_2$) that is used as a chemical heat storage material is configured to store heat (heat absorption) as a result of dehydration and release heat (heat energy generation) as a result of hydration (restoration to calcium hydroxide). That is, $Ca(OH)_2$ can reversibly repeat heat storage and heat release by the reaction described below:

$$Ca(OH)_2 \Leftrightarrow CaO + H_2O$$

The chemical heat storage material in the case where the heat medium is ammonia is preferably a metal chloride from the viewpoint of further increasing the heat storage density in the chemical thermal storage reactor 18, and more preferred examples thereof include chlorides of alkali metals, chlorides of alkaline earth metals, chlorides of transition metals, and composites thereof. Particularly preferred examples include lithium chloride (LiCl), magnesium chloride ($MgCl_2$), calcium chloride ($CaCl_2$), strontium chloride ($SrCl_2$), barium chloride ($BaCl_2$), manganese(II) chloride ($MnCl_2$), cobalt(II) chloride ($CoCl_2$), and nickel(II) chloride ($NiCl_2$).

The various chemical heat storage materials described above may be used singly, or may be used in combination of two or more kinds.

Examples of the physical adsorbent material include activated carbon, as well as mesoporous silica, zeolite, silica gel, and clay mineral. Furthermore, as the activated carbon, an activated carbon having a specific surface area according to the BET method of from 800 $m^2/g$ to 2500 $m^2/g$ (more preferably, from 1800 $m^2/g$ to 2500 $m^2/g$) is preferred. The clay mineral may be an unbridged clay mineral, or may be a bridged clay mineral (bridged clay mineral). Examples of the clay mineral include the sepiolite described above.

In the invention, the kind of the physical adsorbent material (preferably, a porous body) can be appropriately selected in accordance with the pressure or temperature of the heat medium. From the viewpoint of further enhancing the reactivity of the immobilization by physical adsorption and desorption of the heat medium, the physical adsorbent material is preferably configured to include at least activated carbon.

When a physical adsorbent material is used, a heat storage material that absorbs or releases heat depending on the transfer of the heat medium is constructed. In this case, from the viewpoints of further enhancing the reactivity of the immobilization and desorption of the heat medium, the content ratio of the physical adsorbent material in the heat storage material is preferably 80% by volume or greater, and more preferably 90% by volume or greater.

When a heat storage material using a physical adsorbent material is utilized as a molded product, the heat storage material preferably contains a binder in addition to the physical adsorbent material. As the heat storage material contains a binder, the shape of the molded product can be more easily maintained, and therefore, the reactivity of the immobilization by physical adsorption and desorption of the heat medium is further enhanced.

Furthermore, the heat storage material may contain, if necessary, other components in addition to the physical adsorbent material and the binder. Examples of the other components include thermally conductive inorganic materials such as carbon fibers and metal fibers.

The binder is preferably a water-soluble binder. Examples of the water-soluble binder include polyvinyl alcohol and trimethyl cellulose.

When a heat storage material is constructed using a physical adsorbent material and a binder, from the viewpoint of more effectively maintaining the shape of the molded product, the content ratio of the binder in the heat storage material is preferably 5% by volume or greater, and more preferably 10% by volume or greater.

On the contrary, regarding the adsorbent material for the adsorber 16, when the heat medium is water, a zeolite can be used, and when the heat medium is ammonia, activated carbon can be used. In view of the relationship between the adsorbent material used in the adsorber 16 and the temperature of desorption reaction, a material which is preferable as a physical adsorbent material for the chemical thermal storage reactor 18 can be selected. For example, with a general zeolite (Y type), it is possible to achieve a temperature higher than 60° C. for the heat of adsorption reaction. Therefore, regarding the adsorbent material for the adsorber 16, a material having a desorption temperature of 60° C. or lower may be used. An example of such an adsorbent material may be ALPO (trade name: AQSOA-Z01 of Mitsubishi Chemical Corp.).

Apart from the heat medium (water or ammonia) used as the adsorbent material 16, a reaction material which generates heat by a chemical reaction for a chemical heat storage material, or an adsorbate material which stores heat by being physically adsorbed, may also be used. If such a reaction material or adsorbate material is identical with the heat medium of the adsorbent material 16, the configuration of the heat pump 112 as a whole can be simplified. Of course, the reaction material or the adsorbate material may be a material different from the heat medium of the adsorbent material 16.

Furthermore, the invention can also have a configuration of Exemplary Embodiment 3 and Exemplary Embodiment 4 described below. Meanwhile, in the following description, the constituent elements, members and the like that are identical with the corresponding elements, members and the like of Exemplary Embodiment 1 and Exemplary Embodiment 2 will be assigned with the same reference symbol, and further detailed explanation will not be repeated.

Exemplary Embodiment 3

Figure 8:
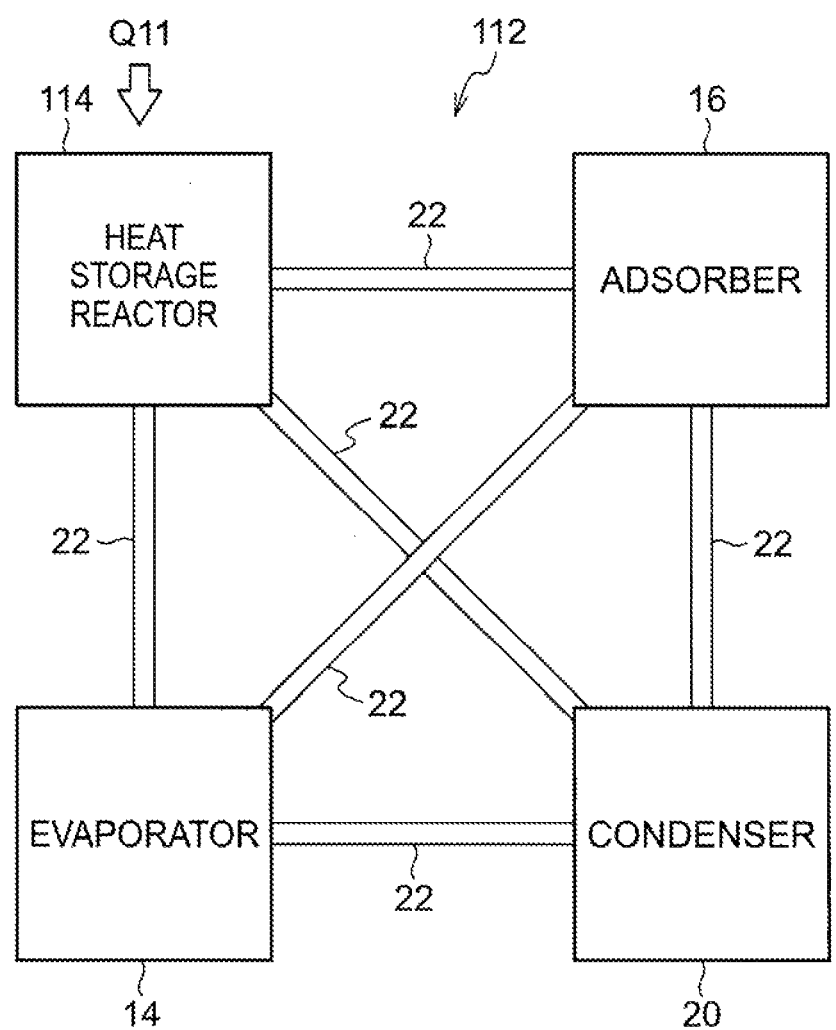
FIG. 8 is a schematic diagram illustrating the configuration of the adsorption heat pump system of Exemplary Embodiment 3 of the invention.

FIG. 8 illustrates a heat pump 112 of Exemplary Embodiment 3 of the invention. In this heat pump 112, a heat accumulator 114 is provided instead of the chemical thermal storage reactor 18 of Exemplary Embodiment 1 (see FIG. 1). The heat accumulator 114 is capable of receiving an amount of heat Q11 from the outside and storing this heat within the heat accumulator.

Furthermore, in Exemplary Embodiment 3, the heat accumulator 114 and the adsorber 16 are connected by piping 22, and the heat accumulator 114 can release heat in an amount greater than the latent heat of evaporation of the adsorber 16 (adsorbent material), to the adsorber 16 at a temperature higher than or equal to a temperature to regenerate the adsorber 16 (adsorbent material). Meanwhile, in Exemplary Embodiment 3, it is not necessary that the heat accumulator 114 and the evaporator 14 be connected by piping.

In addition to the matters described above, the heat pump 112 of Exemplary Embodiment 3 has the same configuration as that of the heat pump 12 of Exemplary Embodiment 1. Therefore, also in Exemplary Embodiment 3, the cooling power generation operation 1 can be carried in the same manner as in Exemplary Embodiment 1, and cooling power can be generated by evaporation of the heat medium at the evaporator 14. Meanwhile, the heat medium thus evaporated may be condensed using, for example, the condenser 20, or may be released to the outside as a gas.

In Exemplary Embodiment 3, when regeneration of the adsorber 16 (adsorbent material) is carried out, the heat stored in the heat accumulator 114 may be applied to the adsorber 16. Also, the adsorber 16 can be regenerated as such, and cooling power can be generated by the cooling power generation operation 2.

In Exemplary Embodiment 3, regarding the heat storage material used in the heat accumulator 114, the chemical heat storage material or physical adsorbent material described above can be applied. In this case, apart from the heat medium (water or ammonia) that is used as the adsorbent material 16, a reaction material that generates heat in a chemical reaction for a chemical heat storage material, or an adsorbate material that stores heat by being physically adsorbed, may also be used. If such a reaction material or adsorbate material is identical with the heat medium of the adsorbent material 16, the configuration of the heat pump 112 as a whole can be simplified. Of course, the reaction material or the adsorbate material may be a material different from the heat medium of the adsorbent material 16.

Meanwhile, in regard to the heat pump 112 of Exemplary Embodiment 3, two (plural) heat accumulators 114 may be provided as in the case of the heat pump 32 of Exemplary Embodiment 2.

Exemplary Embodiment 4

Figure 9:
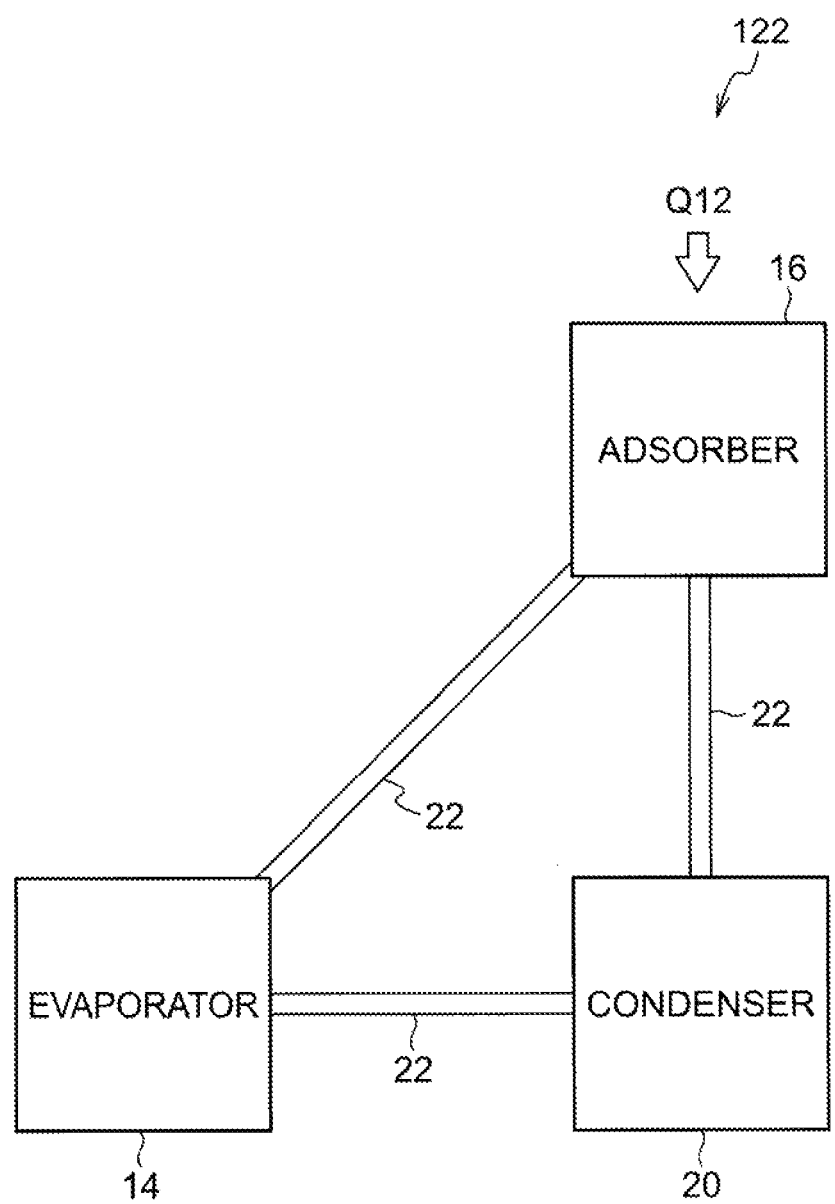
FIG. 9 is a schematic diagram illustrating the configuration of the adsorption heat pump system of Exemplary Embodiment 4 of the invention.

FIG. 9 illustrates a heat pump 122 of Exemplary Embodiment 4 of the invention. In this heat pump 122, the chemical thermal storage reactor 18 of Exemplary Embodiment 1 is not provided with the heat accumulator 114 of Exemplary Embodiment 3. Also, the adsorber 18 is configured to be capable of receiving an amount of heat Q2 at a temperature higher than or equal to a temperature to regenerate the adsorber 16 (adsorbent material) from an external source, and regenerating the adsorbent material by means of this heat.

Other than the matters described above, the heat pump 122 of Exemplary Embodiment 4 has the same configuration as the heat pump 12 of Exemplary Embodiment 1 or the heat pump 112 of Exemplary Embodiment 3. Therefore, also in Exemplary Embodiment 4, similarly to Exemplary Embodiment 1, the cooling power generation operation 1 is carried out, and cooling power can be generated by evaporation of the heat medium in the evaporator 14. The evaporated heat medium can be condensed using a condenser 20, or can be released to the outside.

In Exemplary Embodiment 4, when regeneration of the adsorber 16 (adsorbent material) is carried out, the heat from an external heat source may be applied to the adsorber 16. The adsorber 16 is regenerated as such, and thus cooling power can be generated by the cooling power generation operation 2.

In Exemplary Embodiment 3 and Exemplary Embodiment 4, regarding the adsorbent material used in the adsorber 16, a material of the same kind as the chemical heat storage material or physical heat storage material used in the chemical thermal storage reactor 18 can be applied. Particularly, from the viewpoint of suppressing freezing of the heat medium when the environment temperature is lowered, there may be occasions in which ammonia is be used as the heat medium. In this case, a metal chloride is preferred as the adsorbent material of the adsorber 16, and for example, a chloride of an alkali metal, a chloride of an alkaline earth metal, a chloride of a transition metal, or a composite thereof is more preferred.

Examples of the external heat source according to Exemplary Embodiment 3 and Exemplary Embodiment 4 include those members that acquire high temperature in the engine and its periphery of an automobile.

Exemplary Embodiment 5

Exemplary Embodiment 5 of the adsorption heat pump of the invention will be described with reference to FIG. 10 to FIG. 13. In the present exemplary embodiment, an adsorption heat pump which uses silica gel as the adsorbent material of the adsorber and steam (water) as the two fluids (heat medium and operating fluid) supplied to the adsorber will be described in detail as an example.

Figure 10:
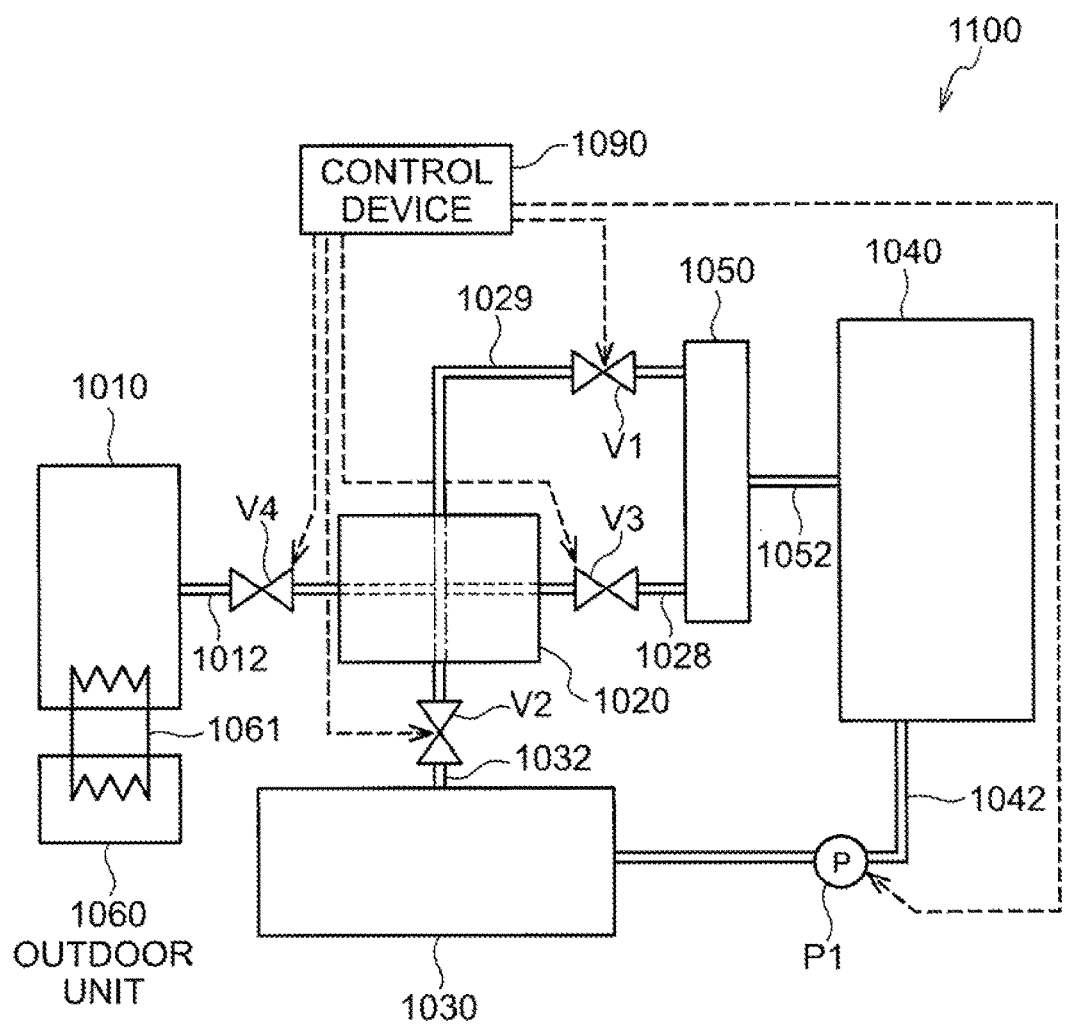
FIG. 10 is a schematic diagram illustrating a configuration example of the adsorption heat pump system of Exemplary Embodiment 1 of the invention.

The heat pump 1100 of the present exemplary embodiment includes, as illustrated in FIG. 10, a first evaporator 1010, an adsorber 1020 having an adsorbent material, a second evaporator 1030 that functions as a heater for heating the adsorber, and a condenser 1040 that condenses a fluid (steam) discharged from the adsorber 1020.

Steam means to include water that is in a gas state, and this water in the form of fine water droplets formed as a result of condensation in air.

The heat pump 1100 of the present exemplary embodiment has two features described below:
(1) the heat medium and the operating fluid are identical fluids (steam); and
(2) transfer of the heat of condensation and transfer of the heat of evaporation are utilized in the heating and cooling of the adsorber 1020.

The first evaporator 1010 is connected with the adsorber 1020 such that the first evaporator 1010 can vaporize water and supply the steam produced by the vaporization, which is a first fluid. Specifically, the first evaporator 1010 is connected with one end of a flow piping 1012 having a valve V4, which is a flow rate regulating valve, and the first evaporator 1010 is in communication with the adsorber 1020 through the flow piping 1012.

It is preferable that the evaporator have a structure in which when the amount of adsorption of steam in the adsorbent material at the first fluid retaining unit provided in the adsorber is decreased as will be described below, vaporization of water in the evaporator is accelerated, and water in the form of steam is supplied to the flow piping 1012. Furthermore, an evaporator having a function by which water can be heated by heat supplied from an external source and can be discharged as steam to the flow piping 1012, is suitable.

Since the first evaporator 1010 takes away the heat of vaporization as a result of the vaporization of water as described above, in the first evaporator 1010, cooling power corresponding to the heat of vaporization of the steam supplied to the adsorber 1020 is generated. Accordingly, effective utilization of cooling power is made possible by thermally connecting a cooling power utilizing apparatus 1060 such as an air conditioner outdoor unit, which is an example of the demand for cooling power energy, for example, through a heat exchange pipe 1061.

The heat exchange pipe described above is configured to include an endless piping and a fluid for heat exchange that is circulated in this piping. As the fluid for heat exchange (for example, water, or a mixed solvent of water and a water-soluble solvent) is circulated to flow through the piping by a circulation pump (not illustrated in the diagram) installed in the piping, cooling power can be supplied to a cooling power utilizing apparatus 50.

The adsorber 1020 includes a fluid retaining chamber 1022 which is a first fluid retaining unit to which steam (first fluid) is supplied from the first evaporator 1010, and in which steam is retained by being adsorbed and the adsorbed steam is released by being desorbed; and a fluid retaining chamber 1024 which is a second fluid retaining unit to which steam (second fluid) is supplied from a second evaporator 1030 as will be described below, and in which steam is retained by being condensed and the condensed steam is released by being desorbed.

Figure 11:
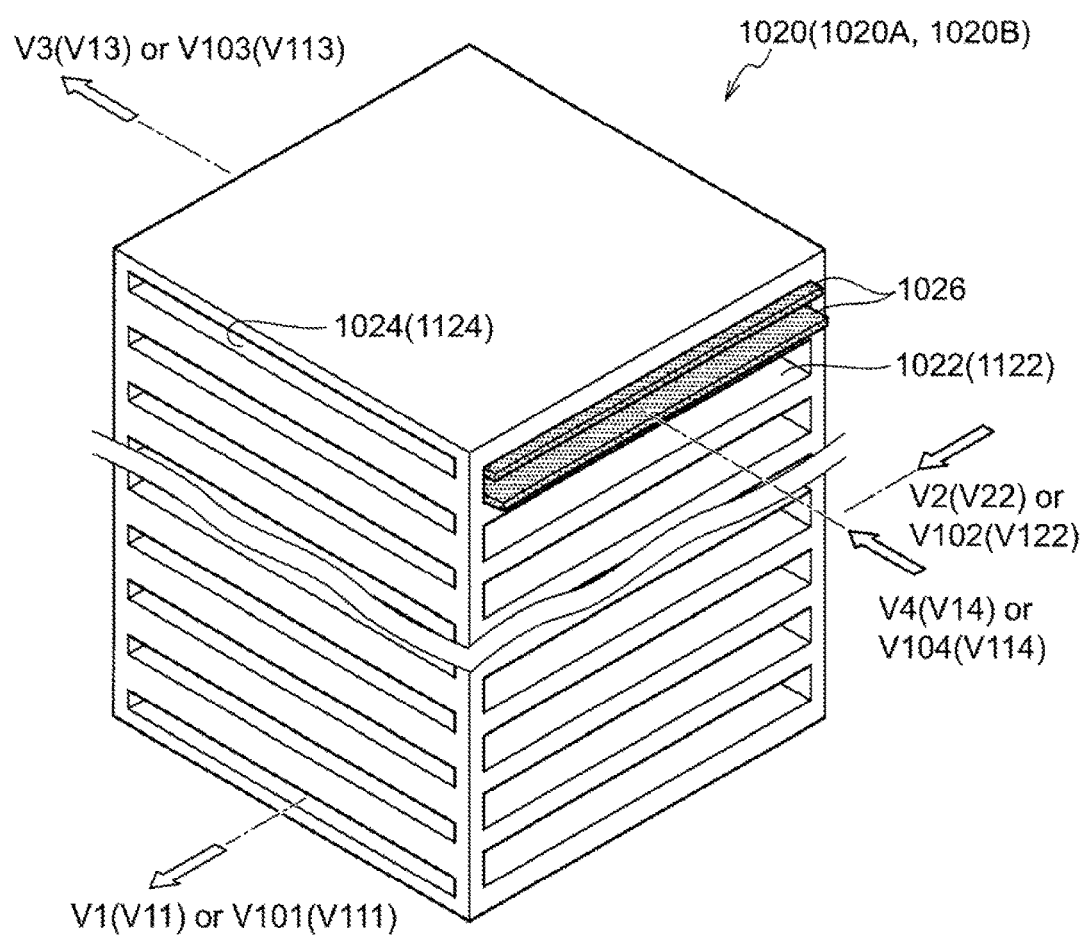
FIG. 11 is a perspective view diagram illustrating a specific configuration example of an adsorber.

The adsorber 1020 is provided with plural fluid retaining chambers 1022 and plural fluid retaining chambers 1024. The respective fluid retaining chambers 1022 and fluid retaining chambers 1024 are alternately disposed in the casing of the adsorber 1020 as illustrated in FIG. 11, and adjoining chambers are thermally connected with one another. That is, it is arranged such that when heat release or heat absorption occurs in the fluid retaining chambers 1022 and thereby a temperature change occurs, heat exchange occurs between the fluid retaining chambers 1022 and the fluid retaining chambers 1024, and the fluid retaining chambers 1024 are heated or cooled.

The fluid retaining chambers 1022 are connected with the other end of the flow piping 1012, and steam is supplied thereto from the first evaporator 1010. In these fluid retaining chambers 1022, as illustrated in FIG. 1, a plate-shaped adsorbent material 1026 is provided on the top surface and the bottom surface of each chamber so that supplied steam can be retained therein by being adsorbed.

Figure 12:
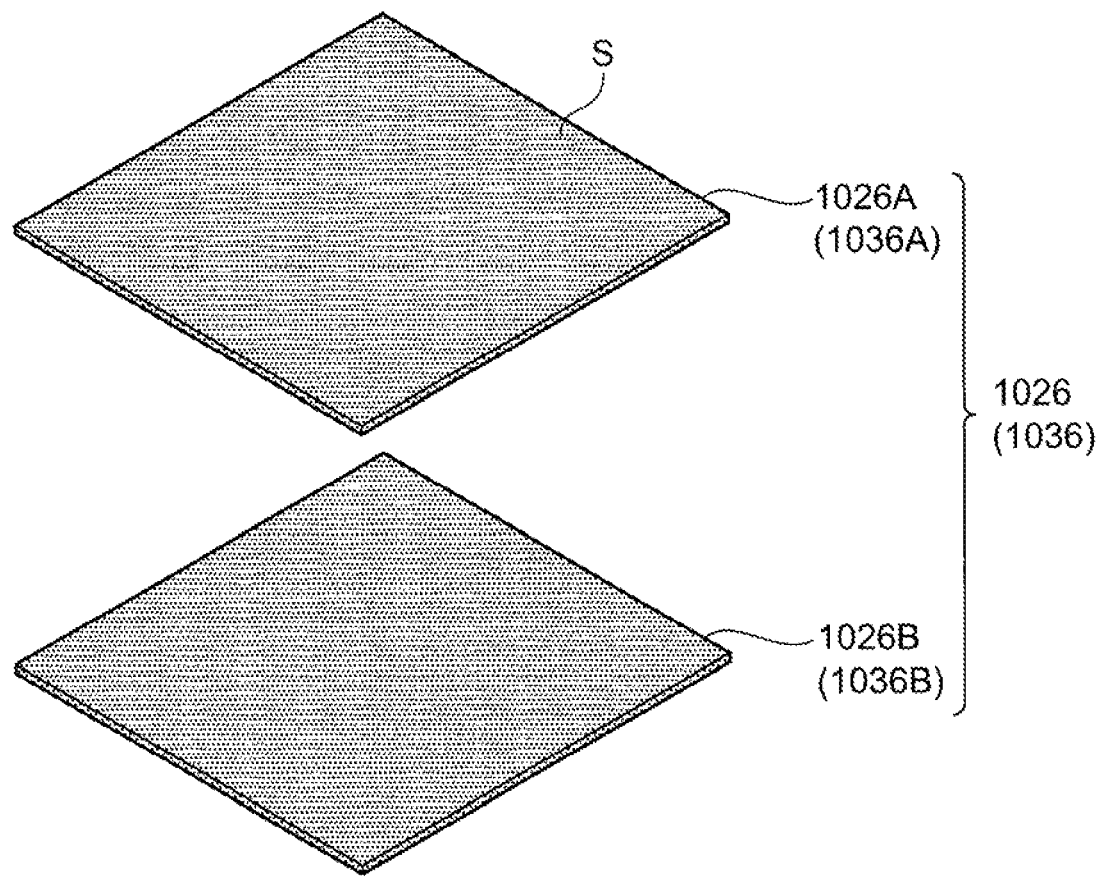
FIG. 12 is a perspective view diagram illustrating a specific embodiment of an adsorbent material (or a chemical heat storage material) mounted in an adsorber (or a chemical thermal storage reactor)

The adsorbent material 1026 is a plate-shaped molded product produced using silica gel (physical adsorbent material). As illustrated in FIG. 12, the adsorbent material 1026 is composed of silica gel plates 1026A and 1026B. The surfaces S of the silica gel plates 1026A and 1026B that face the fluid retaining fluid chambers 1024, that is, the surfaces that are in contact with the top surface and the bottom surface of each chamber, are heat transferable surfaces, and the fluid retaining chambers can achieve heat exchange with adjoining chambers through these surfaces.

For example, when steam is condensed in the fluid retaining chamber 1024 and the heat of condensation is generated, heat exchange occurs at the heat transferable surfaces S of the silica gel plates 1026A and 1026B. Then, when the silica gel plates 1026A and 1026B (adsorbent materials) are heated, the steam that has been adsorbed to the silica gel is desorbed, and steam in an amount equivalent to the amount of heat supplied at the time of heating can be supplied to the condenser 1040.

Since an adsorbent material is used, the amount of heat required for the adsorption (immobilization) and desorption of steam can be suppressed to a low level, and adsorption and desorption of steam can be easily carried out even with a small amount of energy. In the present exemplary embodiment, steam is used as the first fluid, but in addition to steam, any material having a large latent heat of evaporation, such as ammonia, can be suitably used. For example, in the case of using ammonia, the amount of heat required for the adsorption and desorption of 1 mol of ammonia can be suppressed to 20 kJ/mol to 30 kJ/mol. Meanwhile, as a comparative value, the amount of heat required when a chemical heat storage material (for example, $MgCl_2$ or $CaCl_2$) is used is 40 kJ/mol to 60 kJ/mol.

Regarding the adsorbent material, a porous body can be used as in the case of the silica gel used in the present exemplary embodiment. Regarding the porous body, from the viewpoint of further enhancing the reactivity of the immobilization by adsorption (preferably, physical adsorption) and desorption of the fluid such as steam, a porous body having pores with a pore size of 10 nm or less is preferred. The lower limit of the pore size is preferably 0.5 nm from the viewpoint of production suitability or the like. Regarding the porous body, from the same point of view as described above, a porous body which is an aggregate of primary particles obtained by aggregation of primary particles having an average primary particle size of 50 µm or less is preferred. The lower limit of the average primary particle size is preferably 1 µm from the viewpoint of production suitability or the like.

Examples of the adsorbent material include, in addition to the silica gel used in the present exemplary embodiment, activated carbon, mesoporous silica, zeolite, and clay mineral. The clay mineral may be an unbridged clay mineral or may be a bridged clay mineral (bridged clay mineral). Examples of the clay mineral include sepiolite, smectite clays (saponite, montmorillonite, hectorite, and the like), 4-silicon mica, mica, and vermiculite, and among these, sepiolite is preferred.

Regarding the silica gel, a silica gel having a specific surface area according to the BET method of from 100 $m^2/g$ to 1500 $m^2/g$ (more preferably, from 300 $m^2/g$ to 1000 $m^2/g$) is preferred.

Regarding the activated carbon, an activated carbon having a specific surface area according to the BET method of from 800 $m^2/g$ to 4000 $m^2/g$ (more preferably from 1000 $m^2/g$ to 2000 $m^2/g$) is preferred.

Regarding the mesoporous silica, a mesoporous silica having a specific surface area according to the BET method of from 500 $m^2/g$ to 1500 $m^2/g$ (more preferably, from 700 $m^2/g$ to 1300 $m^2/g$) is preferred.

Regarding the zeolite, a zeolite having a specific surface area according to the BET method of from 50 $m^2/g$ to 1000 $m^2/g$ (more preferably, from 100 $m^2/g$ to 1000 $m^2/g$) is preferred.

In the invention, the kind of the adsorbent material (preferably, the porous body) can be appropriately selected in accordance with the pressure or temperature of the heat medium. From the viewpoint of further enhancing the reactivity of the immobilization by adsorption and desorption of water, an embodiment including at least silica gel is preferred. Furthermore, from the viewpoint of further enhancing the reactivity of the immobilization by adsorption and desorption of ammonia, an embodiment including at least activated carbon is preferred. The same also applies to Exemplary Embodiment 6 to Exemplary Embodiment 8 that will be described below.

In the case of the configuration of absorbing and releasing heat by transfer of the first fluid using an adsorbent material (preferably, a physical adsorbent material), the content ratio of the adsorbent material in the total amount of the adsorbent material is preferably 80% by volume or greater, and more preferably 90% by volume or greater, from the viewpoint of maintaining the reactivity of immobilization and desorption of the fluid at a higher level. The same also applies to Exemplary Embodiment 6 to Exemplary Embodiment 8 that will be described below.

When the adsorbent material is utilized in the form of a molded product, the adsorbent material may also contain a binder together with the adsorbent material. As a binder is contained, shaping of the molded product can be more easily maintained, and the reactivity of the immobilization by adsorption and desorption of the heat medium is further enhanced. The binder is preferably a water-soluble binder. Examples of the water-soluble binder include polyvinyl alcohol and trimethyl cellulose.

Furthermore, in addition to the adsorbent material and the binder, if necessary, other components may also be incorporated. Examples of the other components include thermally conductive inorganic materials such as carbon fibers and metal fibers.

When molding is carried out using an adsorbent material and a binder, the content ratio of the binder is preferably 5% by volume or greater, and more preferably 10% by volume or greater, from the viewpoint of maintaining the shape of the molded product more effectively. There are no particular limitations on the molding method, and for example, a method of molding an adsorbent material (and other components such as a binder according to necessity) by a known molding technique such as pressurized molding and extrusion molding. The pressure at the time of molding can be set to, for example, 20 MPa to 100 MPa, and a pressure of 20 MPa to 40 MPa is preferred.

The same also applies to Exemplary Embodiment 6 to Exemplary Embodiment 8 that will be described below.

In the fluid retaining chambers 1024, one end of a flow piping 1032 is connected thereto, and heat is supplied thereto together with steam from the second evaporator 1030 that will be described below. When heat is supplied, heat exchange occurs between the fluid retaining chambers 1024 and the fluid retaining chambers 1022, and in the fluid retaining chambers 1024, steam is condensed and water is produced. The heat of condensation at this time is also subject to the heat exchange between the fluid retaining chambers 1024 and the fluid retaining chambers 1022. Thereby, in the fluid retaining chambers 1022, the adsorbent material is heated, and the steam adsorbed to the adsorbent material is desorbed.

The top surfaces and the bottom surfaces of the fluid retaining chambers 1024, where heat exchange is carried out between the fluid retaining chambers 1024 and the fluid retaining chambers 1022, are provided with grooves or wicks (furrows). The surfaces having a groove structure or a wick structure are provided with concave furrows, and a liquid (water in the present exemplary embodiment) is retained in these furrows by means of the surface tension of water, so that a liquid film can be formed. Water can be made to exist uniformly on the surface where heat exchange occurs, and the distribution of vaporization can be made uniform within the surfaces where heat exchange occurs.

A groove structure refers to a structure in which furrow-shaped or pit-shaped dents are formed, which structure is formed on the inner walls of a heat exchanger. Furthermore, a wick structure refers to a structure formed into a mesh shape or the like that exhibits the capillary phenomenon, which structure is also formed on the inner walls. Such furrows are formed by performing pressing, cutting or the like onto a wall surface.

In the present exemplary embodiment, a configuration in which only a furrow structure is provided in the fluid retaining chambers 1024 and an adsorbent material is not provided, is adopted. However, a structure in which a porous layer is provided on the top surfaces or the bottom surfaces of the fluid retaining chambers 1024 that face the fluid retaining chambers 1022, may also be employed.

Regarding the porous layer, in addition to the use of the porous body described above, a porous structure may be provided by using a material that is capable of forming a porous structure. As the material that is capable of forming a porous structure, silica gel, zeolite, silica, activated carbon, clay mineral and the like can be used. An adsorbent material may also be disposed as a porous layer, and the same material as the adsorbent materials that can be used for the fluid retaining chambers 1022 can be used. The details on silica gel, zeolite, silica, activated carbon, and clay mineral are as described above.

The second evaporator 1030 is connected with the adsorber 1020 such that the second evaporator 1030 can vaporize water and supply the steam produced by vaporization, which is a second fluid. The second evaporator 1030 functions as a heater for heating at least the adsorbent material of the adsorber 1020, and since steam itself coagulates, the heat of coagulation is also obtained. Specifically, the second evaporator 1030 is connected with the other end of the flow piping 1032 having a valve V2, which is a flow rate regulating valve, and the second evaporator 1030 and the adsorber 1020 are in communication with each other through the flow piping 1032.

Regarding the second evaporator 1030, an evaporator having a function by which water can be heated by heat from an external source and can be discharged as steam to the flow piping 1032, is suitable.

The condenser 1040 is connected with the adsorber 1020 such that steam can be supplied from the adsorber 1020, and the condenser condenses the steam supplied from the adsorber 1020. Specifically, the condenser 1040 is connected respectively with one end of a flow piping 1028 having a valve V3, which is a flow rate regulating valve, and one end of a flow piping 1029 having a valve V1, which is a flow rate regulating valve. The condenser 1040 is in communication with the fluid retaining chamber 1022 of the adsorber 1020 through the flow piping 1028, and is in communication with the fluid retaining chamber 1024 of the adsorber 1020 through the flow piping 1029.

Furthermore, the ends of the flow piping 1028 and the flow piping 1029 are respectively connected with a fluid collecting chamber 1050. The steam discharged from the fluid retaining chambers 1022 and 1024 through the respective flow pipings is to be collected at one site in the fluid collecting chamber 1050.

The fluid collecting chamber 1050 is connected with the condenser 1040 by means of a flow piping 1052. The steam collected at the fluid collecting chamber 1050 is sent to the condenser 1040 through the flow piping 1052. Here, the overall heat energy of the system can be collected by coagulating the steam.

Furthermore, the condenser 1040 is in communication with the second evaporator 1030 through a return piping 1042 having a pump P1. Water that has been liquefied by condensation of steam at the condenser 1040 is returned to the second evaporator 1030 through the return piping 1042 by driving the pump P1.

Next, an operation example of the adsorption heat pump of the present exemplary embodiment will be explained.

When steam heated by the second evaporator (heater) 30 is sent to the fluid retaining chamber 24 of the adsorber 1020 through the flow piping 1032, heat exchange of the heat of steam occurs, and thereby the adsorbent material 1026 of the fluid retaining chamber 1022 is heated. At the same time, steam is retained in the fluid retaining chamber 1024 by being condensed and undergoing phase change to a liquid form, and the heat of condensation is further released. At this time, the adsorbent material 1026 of the fluid retaining chamber 1022 is heated also by the heat of condensation thus released, by heat transfer through heat exchange. Thereby, the steam adsorbed to the adsorbent material 1026 of the fluid retaining chamber 1022 is desorbed, and the desorbed steam is first collected at the fluid collecting chamber 1050 through the flow piping 1028 and then sent to the condenser 1040 through the flow piping 1052.

At this time, in the fluid retaining chamber 1024, water generated by condensation increases, while in the fluid retaining chamber 1022, the steam adsorbed to the adsorbent material 1026 gradually decreases.

As the amount of steam adsorbed at the fluid retaining chamber 1022 decreases as such, the adsorbent material 1026 is in a state of being capable of easily adsorbing steam.

Therefore, water at the first evaporator 1010 is easily vaporized, and steam thus produced is supplied to the fluid retaining chamber 1022. When steam is sent to the fluid retaining chamber 1022, steam is retained by being adsorbed to the adsorbent material of the fluid retaining chamber 1022, and also releases the heat of adsorption. The heat of adsorption thus released is subjected to heat exchange between the fluid retaining chamber 1022 and the fluid retaining chamber 1024, and thereby the fluid retaining chamber 1024 is heated. Then, water collected at the fluid retaining chamber 1024 by condensation is vaporized, and is desorbed as steam. At this time, the steam (second fluid) thus desorbed is first collected at the fluid collecting chamber 1050 through the flow piping 1029, and then is sent to the condenser 1040 through the flow piping 1052.

At this time, in the fluid retaining chamber 1022, the amount of adsorption of steam in the adsorbent material 1026 increases, while in the fluid retaining chamber 1024, collected water is vaporized and is gradually decreased.

As described above, when adsorption and desorption of steam at the fluid retaining chambers 1022 and 1024 of the adsorber 1020 are repeated, heat energy that has been utilized can be continuously recovered in the condenser.

A control device 1090 is a control unit that is in charge of the overall control of the adsorption heat pump, and is configured to be electrically connected with valves V1 to V4, pump P1, external heat sources and the like, so that the control device can control heat utilization by controlling the valves and pump, the heat sources, and the heat exchange.

Figure 13:
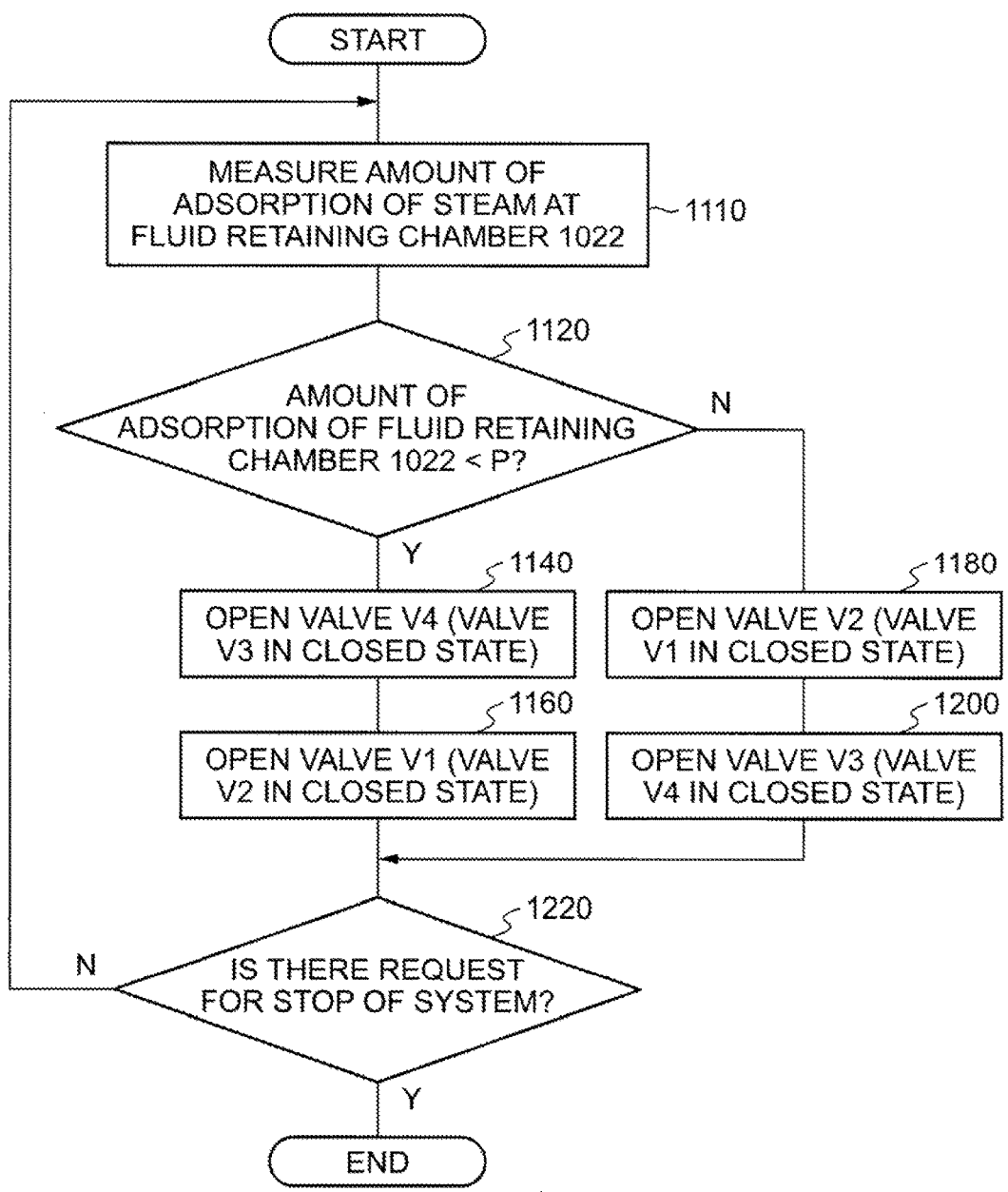
FIG. 13 is a flow diagram illustrating the heat pump cycle for heating control routine of Exemplary Embodiment 1 of the invention.

Next, the control routine by means of a control device 1090 which is a flow control unit for controlling the adsorption heat pump of the present exemplary embodiment will be explained with reference to FIG. 13, primarily on the basis of a heat pump cycle for heating control routine by which a heat pump cycle for heating is continued by alternately supplying steam to the two fluid retaining chambers of the adsorber 1020, and thereby recovering heat energy.

When the electric power supply of the control device 1090 is turned on by turning on the startup switch of the adsorption heat pump of the present exemplary embodiment, the system is started, and the heat pump cycle for heating control routine is implemented. Meanwhile, the startup of the system may be carried out automatically, and may also be carried out manually When the present routine is carried out, first, in order to determine the amount of adsorption of the adsorbate (steam) to the adsorbent material 1026 at the fluid retaining chamber 1022, the amount of adsorption is measured in Step 1100. Then, in the next Step 1120, it is determined whether the amount of adsorption is less than a predetermined threshold value P.

In Step 1120, if it is determined that the amount of adsorption of steam is less than the threshold value P, the system is in a state that the adsorbent material 1026 can continuously adsorb the steam from the first evaporator 1010. Therefore, in Step 1140, the valve V4 is opened, and adsorption of steam by the adsorbent material 1026 is initiated. At this time, the heat of adsorption occurs as a result of the adsorption of steam, and the fluid retaining chamber 1024 that is capable of heat exchange is heated. Furthermore, the valve V3 installed in the flow piping 1028 is closed. In the fluid retaining chamber 1024 that has been heated by heat exchange of the heat of adsorption from the fluid retaining chamber 1022, water is vaporized and is desorbed as steam. Therefore, in the next Step 1160, the valve V1 provided in the flow piping 1029 is opened, and steam is sent to the fluid collecting chamber 1050 through the flow piping 1029. At this time, the valve V2 installed in the flow piping 1029 is in a closed state.

Next, in Step 1120, when it is determined that the amount of adsorption of steam is more than or equal to the threshold value P, the adsorbent material 1026 is already in a state that steam from the first evaporator 1010 can be no more adsorbed. Therefore, in Step 1180, the valve V2 is opened so as to desorb steam from the adsorbent material 1026, and heated steam is supplied from the second evaporator 1030. When heated steam is sent to the fluid retaining chamber 1024 of the adsorber 1020 through the flow piping 1032, steam is condensed in the fluid retaining chamber 1024 and is retained by being subjected to phase change to water, while releasing the heat of condensation at the same time. At this time, the heat of the steam supplied to the fluid retaining chamber 1024 is subjected to heat exchange between the fluid retaining chamber 1024 and the fluid retaining chamber 1022, and the heat of condensation released is also subjected to heat exchange between the fluid retaining chamber 1024 and the fluid retaining chamber 1022. Thereby, the adsorbent material 1026 of the fluid retaining chamber 1022 is heated. In this manner, the steam adsorbed to the adsorbent material 1026 of the fluid retaining chamber 1022 is desorbed again. Therefore, in the next Step 1200, the valve V3 installed in the flow piping 1028 is opened, and steam is sent to the fluid collecting chamber 1050 through the flow piping 1028. At this time, the valve V4 installed in the flow piping 1012 is in a closed state.

Subsequently, in Step 1220, the presence or absence of the request for a stop of the system is determined, and if it is determined that there is no request for a stop of the system, the process is returned to Step 1100 again in order to continue the heat pump cycle for heating, and the steps such as described above are repeated.

Furthermore, in Step 1220, if it is determined that there is a request for a stop of the system, this routine is terminated so as to stop the system.

In Exemplary Embodiment 5, an example of using steam as the first fluid and the second fluid has been described; however, the fluids are not limited to steam, and the same effect is provided even in the case of using a fluid having a relatively large latent heat of evaporation, such as ammonia, in addition to steam.

Exemplary Embodiment 6

Exemplary Embodiment 6 of the adsorption heat pump of the invention will be described with reference to FIG. 14 and FIG. 15. The present exemplary embodiment has the configuration of a system in which two units of the adsorber 1020 of Exemplary Embodiment 5 described above are disposed, and the two adsorbers alternately operate adsorption heat pumps A and B which share a first evaporator, a second evaporator, and a condenser.

Meanwhile, constituent elements that are the same as those used in Exemplary Embodiment 5 will be assigned with the same reference symbol, and detailed descriptions thereof will not be repeated here.

Figure 14:
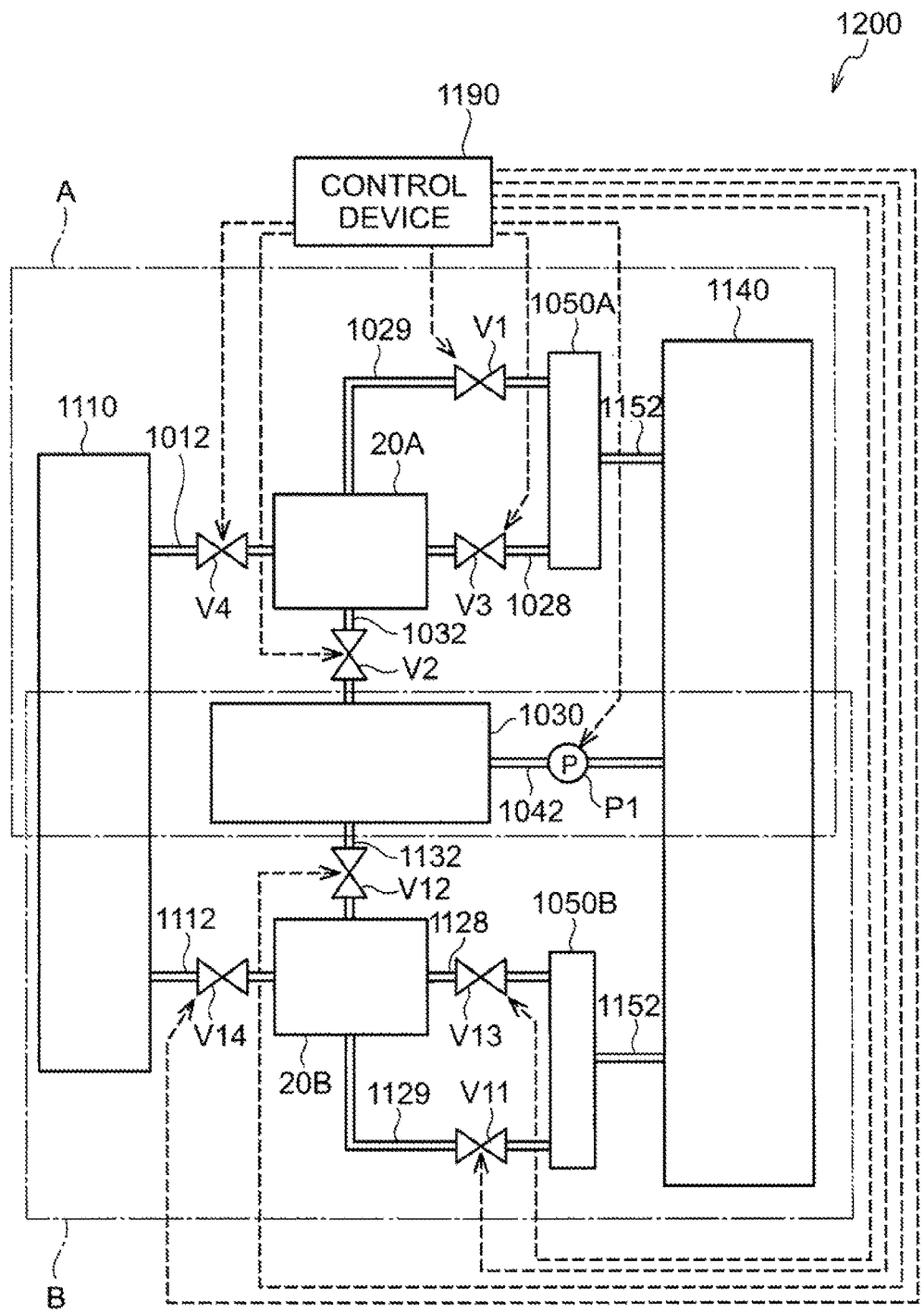
FIG. 14 is a schematic diagram illustrating a configuration example of the adsorption heat pump system of Exemplary Embodiment 2 of the invention.
Figure 15:
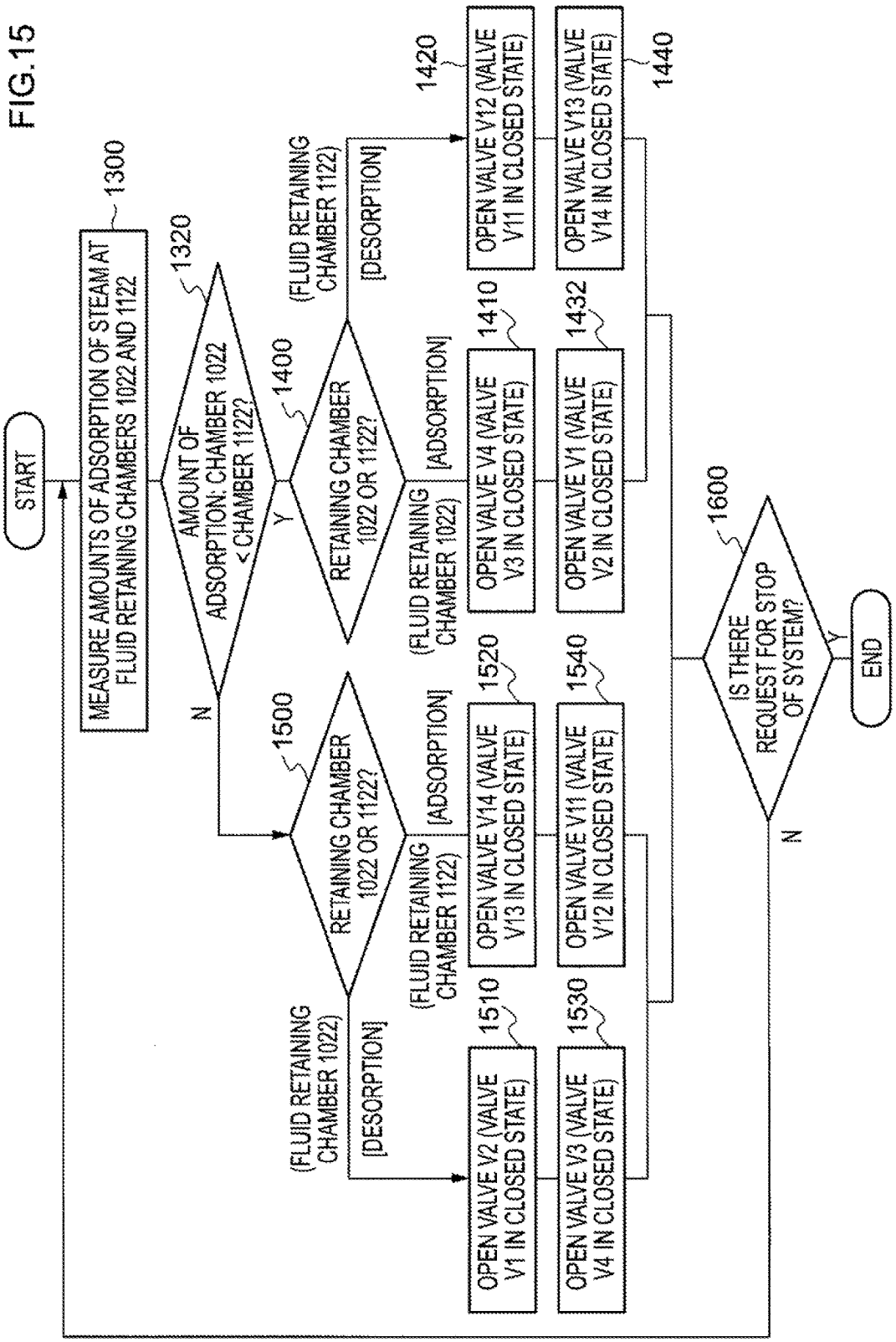
FIG. 15 is a flow diagram illustrating the heat pump cycle for heating control routine of Exemplary Embodiment 2 of the invention.

The adsorption heat pump 1200 of the present exemplary embodiment is configured to operate such that adsorption heat pumps that are configured to be the same as those used in Exemplary Embodiment 5 share a single second evaporator (heater) 1030, a single first evaporator 1110, and a single condenser 1140 as illustrated in FIG. 14. Regarding the first evaporator 1110 and the condenser 1140, an evaporator and a condenser that are configured to be the same as the first evaporator 1010 and the condenser 1040 of Exemplary Embodiment 5 can be used; however, it is preferable that the condenser from which the steam coming from two adsorbers is discharged be configured to have a capability that is at least twice the capability of the first evaporator that supplies steam alternately to the two adsorbers.

The first evaporator 1110 is configured to be the same as the first evaporator 1010 of Exemplary Embodiment 5, and is connected respectively to the adsorbers 1020A and 1020B such that water is vaporized, and steam produced by the vaporization, which is the first fluid, can be supplied to the adsorbers. Specifically, the first evaporator 1110 is connected respectively with one end of a flow piping 1012 equipped with a valve V14, which is a flow rate regulating valve, and one end of a flow piping 1112 equipped with a valve V14. Further, the first evaporator 1110 is in communication with the adsorber 1020A through the flow piping 1012, and is in communication with the adsorber 1020B through the flow piping 1112.

The adsorber 1020A is configured to be the same as the adsorber 1020 of Exemplary Embodiment 5, and includes a fluid retaining chamber 1022 and a fluid retaining chamber 1024. Furthermore, the adsorber 1020B is also configured to be basically the same as the adsorber 1020 of Exemplary Embodiment 5. Specifically, the adsorber 1020B includes a fluid retaining chamber 1122 which is a first fluid retaining unit to which steam (first fluid) is supplied from the first evaporator 1110, and in which steam is retained by being adsorbed, and the adsorbed steam is released by being desorbed; and a fluid retaining chamber 1124 which is a second fluid retaining unit to which steam (second fluid) is supplied from the second evaporator 1030, and in which steam is retained by being condensed, and the condensed steam is released by being desorbed.

The details of the adsorber 1020A are as described with regard to the adsorber 1020 in Exemplary Embodiment 5.

The adsorber 1020B is provided with plural fluid retaining units 1122 and plural fluid retaining units 1124, and the respective fluid retaining units 1122 and fluid retaining units 1124 are alternately disposed in the casing of the adsorber 1020B as illustrated in FIG. 1, and adjoining chambers are thermally connected with one another. That is, it is arranged such that when heat release or heat absorption occurs in the fluid retaining units 1122 and thereby a temperature change occurs, heat exchange occurs between the fluid retaining units 1122 and the fluid retaining units 1124, and the fluid retaining units 1124 are heated or cooled.

In the fluid retaining chambers 1122, the other end of the flow piping 1112 is connected thereto, and steam is supplied from the first evaporator 1110. In these fluid retaining chambers 1122, as illustrated in FIG. 11, a plate-shaped adsorbent material 1026 is provided on the top surface and the bottom surface of each chamber so that supplied steam can be retained therein by being adsorbed.

In the fluid retaining chambers 1124, one end of the flow piping 1132 is connected thereto, and heat is supplied together with steam from the second evaporator 1030 which is a heater. The fluid retaining chambers 1124 are connected with the second evaporator 1030 by the flow piping 1132 having a valve V12, which is a flow rate regulating valve. When heat is supplied from the evaporator 30, heat exchange occurs between the fluid retaining chambers 1124 and the fluid retaining chambers 1122, and in the fluid retaining chambers 1124, steam is condensed so that water is produced. At this time, in the fluid retaining chambers 1122, the steam that is adsorbed to the adsorbent material is desorbed.

The condenser 1140 is connected respectively with the adsorbers 1020A and 1020B such that steam can be supplied from both the adsorbers 1020A and 1020B, and condenses steam supplied from the adsorbers 1020A and 1020B. Here, the relationship of connection between the condenser 1140 and the adsorber 1020B is as follows. That is, the adsorber 1020B is connected respectively with one end of the flow piping 1128 having a valve V13, which is a flow rate regulating valve, and one end of the flow piping 1129 having a valve V11, which is a flow rate regulating valve. The condenser 1140 is in communication with the fluid retaining chambers 1122 of the adsorber 1020B through the flow piping 1128, and is in communication with the fluid retaining chambers 1124 of the adsorber 1020B through the flow piping 1129.

Meanwhile, the relationship of connection between the condenser 1140 and the adsorber 1020A is as described in Exemplary Embodiment 5.

Furthermore, in, the adsorption heat pump A, the other ends of the flow piping 1028 and the flow piping 1029 are respectively connected with the fluid collecting chamber 1050A, and in the fluid collecting chamber 1050A, steam discharged from the fluid retaining chambers 1022 and 1024 on the side of the adsorption heat pump A through the respective flow pipings is collected. Furthermore, in the adsorption heat pump B, the other ends of the flow piping 1128 and the flow piping 1129 are respectively connected with the fluid collecting chamber 1050B, and in the fluid collecting chamber 1050B, steam discharged from the fluid retaining chambers 1122 and 1124 on the side of the adsorption heat pump B through the respective flow pipings is collected.

The fluid collecting chambers 1050A and 1050B are connected with the condenser 1140 through the flow pipings 1052 and 1152, respectively, and steam collected at the fluid collecting chambers 1050A and 1050B is sent to the condenser 1140 through the flow pipings 1052 and 1152. Here, the overall heat energy of the system can be recovered by coagulating the steam.

Next, an operation example of the adsorption heat pump of the present exemplary embodiment will be explained.

The operation of the adsorption heat pumps A and B is all as described in the "operation example of the adsorption heat pump" in Exemplary Embodiment 5. In the present exemplary embodiment, since two units of the adsorption heat pump are employed, an operation is enabled in which when adsorption of steam with the adsorbent material of one of the adsorption heat pumps (for example, adsorption heat pump A) is carried out, desorption of steam with the adsorbent material of the other adsorption heat pump (for example, adsorption heat pump B) is carried out, and on the contrary, when desorption of steam with the adsorbent material of the one adsorption heat pump (adsorption heat pump A) is carried out, adsorption of steam with the adsorbent material of the other adsorption heat pump (adsorption heat pump B) is carried out.

The control device 1190 is a control unit that is in charge of the overall control of the adsorption heat pumps A and B, and is configured to be electrically connected with valves V1 to V4 and V1 to V14, pump P1, external heat sources and the like, so that the control device can control heat utilization by controlling the valves and pump, the heat sources, and the heat exchange.

Next, the control routine by means of a control device 1190 which is a flow control unit for controlling the adsorption heat pump of the present exemplary embodiment will be explained with reference to FIG. 15, primarily on the basis of a heat pump cycle for heating control routine by which the same heat pump cycle for heating as that of Exemplary Embodiment 5 is continued by causing the adsorbers 1020A and 1020B to alternately carry out adsorption and desorption of steam, and recovering heat energy.

When the electric power supply of the control device 1190 is turned on by turning on the startup switch of the adsorption heat pump of the present exemplary embodiment, the system is started, and the heat pump cycle for heating control routine is carried out. Meanwhile, the startup of the system may be carried out automatically, or may also be carried out manually.

When the present routine is carried out, first, steam is adsorbed with any one of the adsorbers 1020A and 1020B, and in order to determine whether steam should be desorbed, the amounts of adsorption of steam at the fluid retaining chamber 1022 of the adsorber 1020A and the fluid retaining chamber 1122 of the adsorber 1020B are measured in Step 1300.

Subsequently, in Step 1320, the magnitude of the amount of adsorption is examined from the amounts of adsorption thus measured. If it is determined that the amount of adsorption at the fluid retaining chamber 1022 of the adsorber 1020A is smaller than the amount of adsorption at the fluid retaining chamber 1122 of the adsorber 1020B, since more steam can be adsorbed in the fluid retaining chamber 1022 than in the fluid retaining chamber 1122, the process is moved to Step 1400 in which steam is adsorbed at the adsorber 1020A and steam is desorbed at the adsorber 1020B.

On the contrary, in Step 1320, if it is determined that the amount of adsorption at the fluid retaining chamber 1122 of the adsorber 1020B is smaller than the amount of adsorption at the fluid retaining chamber 1022 of the adsorber 1020A, since more steam can be adsorbed in the fluid retaining chamber 1122 than in the fluid retaining chamber 1022, the process is moved to Step 1500 in which steam is adsorbed at the adsorber 1020B and steam is desorbed at the adsorber 1020A.

In Step 1400, the fluid retaining chambers 1022 and 1122 are distinguished. Thus, in the fluid retaining chamber 1022, the valve V4 is opened, and adsorption of steam by means of the adsorbent material 1026 is initiated in the next Step 1410. At this time, the heat of adsorption is generated by the adsorption of steam, and the fluid retaining chamber 1024 that is capable of heat exchange is heated. Furthermore, the valve V3 installed in the flow piping 1028 is in a closed state. In the fluid retaining chamber 1024 that has been heated by heat exchange of the heat of adsorption from the fluid retaining chamber 1022, water is vaporized and is desorbed as steam. Accordingly, in the next Step 1430, the valve V1 that is provided in the flow piping 1029 is opened, and steam is sent to the fluid collecting chamber 1050A through the flow piping 1029. At this time, the valve V2 installed in the flow piping 1032 is in a closed state.

Furthermore, in the fluid retaining chamber 1122, in order to desorb steam from the adsorbent material 1026, the valve V12 is opened, and heated steam is supplied from the second evaporator 1030 in the next Step 1420. When heated steam is sent to the fluid retaining chamber 1124 of the adsorber 1020B through the flow piping 1132, steam is condensed in the fluid retaining chamber 1124, and is retained by being subjected to phase change to water, while at the same time, releasing the heat of condensation. At this time, the heat of the steam supplied to the fluid retaining chamber 1124 is subjected to heat exchange between the fluid retaining chamber 1124 and the fluid retaining chamber 1122, and the heat of condensation released is also subjected to heat exchange between the fluid retaining chamber 1124 and the fluid retaining chamber 1122. Thereby, the adsorbent material 1026 of the fluid retaining chamber 1122 is heated. In this manner, the steam adsorbed to the adsorbent material 1026 of the fluid retaining chamber 1122 is desorbed again. Accordingly, in the next Step 1440, the valve V13 installed in the flow piping 1128 is opened, and steam is sent to the fluid collecting chamber 1050B through the flow piping 1128. At this time, the valve V14 installed in the flow piping 1112 is in a closed state.

Next, in Step 1500, the fluid retaining chambers 1022 and 1122 are distinguished, and in the fluid retaining chamber 1122, the valve V14 is opened, and adsorption of steam by means of the adsorbent material 1026 is initiated in the next Step 1520. At this time, the heat of adsorption is generated as a result of the adsorption of steam, and the fluid retaining chamber 1124 that is capable of heat exchange is heated. Furthermore, the valve V13 installed in the flow piping 1128 is in a closed state. In the fluid retaining chamber 1124 that has been heated by heat exchange of the heat of adsorption from the fluid retaining chamber 1122, water is vaporized and is desorbed as steam. Accordingly, in the next Step 1540, the valve V1 provided in the flow piping 1129 is opened, and steam is sent to the fluid collecting chamber 1050B through the flow piping 1129. At this time, the valve V12 installed in the flow piping 1132 is in a closed state.

Furthermore, in the fluid retaining chamber 1022, in order to desorb steam from the adsorbent material 1026, the valve V2 is opened, and heated steam is supplied from the second evaporator 1030 in the next Step 1510. When heated steam is sent to the fluid retaining chamber 1124 of the adsorber 1020A through the flow piping 1032, steam is condensed in the fluid retaining chamber 1024, and is retained by being subjected to phase change to water, while at the same time, releasing the heat of condensation. At this time, the heat of the steam supplied to the fluid retaining chamber 1024 is subjected to heat exchange between the fluid retaining chamber 1024 and the fluid retaining chamber 1022, and the heat of condensation thus released is also subjected to heat exchange between the fluid retaining chamber 1024 and the fluid retaining chamber 1022. Thereby, the adsorbent material 1026 of the fluid retaining chamber 1022 is heated. In this manner, the steam adsorbed to the adsorbent material 1026 of the fluid retaining chamber 1022 is desorbed again. Accordingly, in the next Step 1530, the valve V3 installed in the flow piping 1028 is opened, and steam is sent to the fluid collecting chamber 1050A through the flow piping 1028. At this time, the valve V4 installed in the flow piping 1012 is in a closed state.

Subsequently, in Step 1600, the presence or absence of the request for a stop of the system is determined, and if it is determined that there is no request for a stop of the system, the process is brought back to Step 1300 in order to continue the heat pump cycle for heating, and the steps such as described above are repeated. On the contrary, in Step 1600, if it is determined that there is a request for a stop of the system, the subject routine is terminated in order to stop the system.

In Exemplary Embodiment 6, an example of utilizing steam as the first fluid and the second fluid has been explained; however, the fluid is not limited to steam, and the same effect is also provided in the case of using a fluid having a relatively large latent heat of evaporation, such as ammonia, in addition to steam.

Furthermore, in the exemplary embodiment described above, the case in which silica gel is used as the adsorbent material has been described; however, the adsorbent material is not limited to silica gel, and the same effect can be provided by using an adsorbent material other than silica gel as described above.

Exemplary Embodiment 7

Exemplary Embodiment 7 of the adsorption heat pump of the invention will be described with reference to FIG. 16 to FIG. 20. In the present exemplary embodiment, an adsorption heat pump which uses silica gel as the adsorbent material of the adsorber, calcium oxide (CaO) as the chemical heat storage material of the chemical thermal storage reactor, and steam (water) as the two fluids (heat medium and operating fluid) that are supplied to the adsorber or the chemical thermal storage reactor, will be described in detail as an example.

Figure 16:
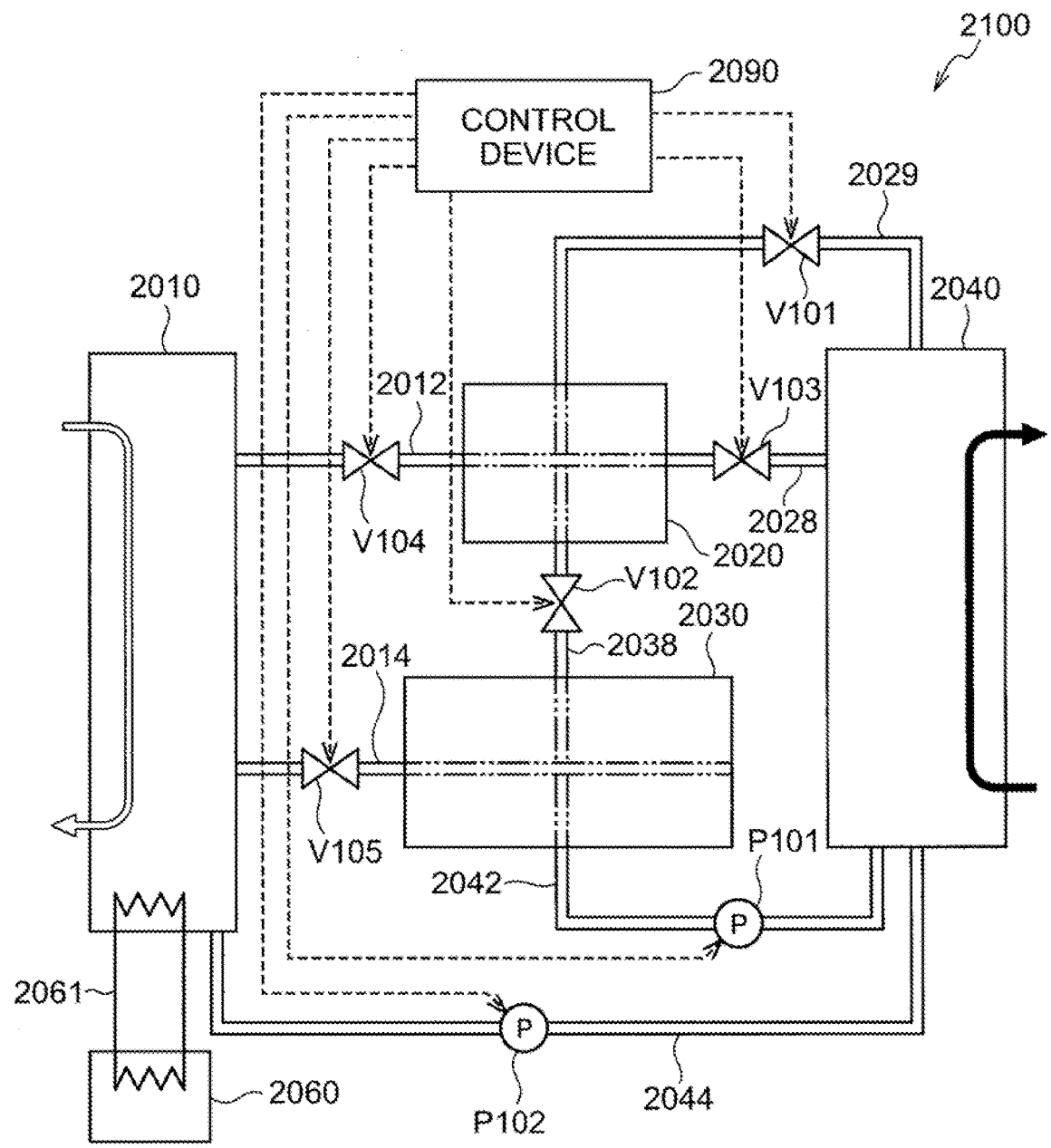
FIG. 16 is a schematic diagram illustrating a configuration example of the adsorption heat pump system of Exemplary Embodiment 1 of the invention.

The heat pump 2100 of the present exemplary embodiment includes, as illustrated in FIG. 16, an evaporator 2010, an adsorber 2020 having an adsorbent material, a chemical thermal storage reactor 2030 that has a chemical heat storage material and is in charge of the function of a heater which heats the adsorber with steam, and a condenser 2040 that condenses the fluid (steam) discharged from the adsorber 2020.

Steam means to include water that is in a gas state, and this water in the form of fine water droplets formed as a result of condensation in air.

The heat pump 2100 of the present exemplary embodiment has two features described below:
(1) the heat medium used for the heat exchange with the adsorber or the like, and the operating fluid which is an adsorbate to be adsorbed to the chemical thermal storage reactor or the like are identical fluids (steam); and
(2) transfer of the heat of condensation and transfer of the heat of evaporation are utilized for the heating and cooling in the adsorber.

The evaporator 2010 is connected respectively to the adsorber 2020 and the chemical thermal storage reactor 2030 such that water is vaporized therein, and the steam produced by the vaporization, which is a first fluid, can be supplied. Specifically, the evaporator 2010 is connected respectively with one end of a flow piping 2012 having a valve V104, which is a flow rate regulating valve, and one end of a flow piping 2014 having a valve V105, which is a flow rate regulating valve. The evaporator 2010 is in communication with the adsorber 2020 through the flow piping 2012, and is also in communication with the chemical thermal storage reactor 2030 through the flow piping 2014.

It is preferable that the evaporator have a structure in which when the amount of adsorption of water in the chemical heat storage material disposed in the heat storage reaction unit of the chemical thermal storage reactor 2030 is less than the saturation amount, or when the amount of adsorption of steam in the adsorbent material of the first fluid retaining unit provided in the adsorber as will be described below is decreased, vaporization of water in the evaporator proceeds, and water is supplied as steam to the flow piping 2012. Furthermore, an evaporator having a function by which water can be heated by heat supplied from an external source and can be discharged as steam to the flow pipings 2012 and 2014, is suitable.

Since the first evaporator 2010 takes away the heat of vaporization as a result of the vaporization of water as described above, in the evaporator 2010, cooling power corresponding to the heat of vaporization of the steam supplied to the adsorber 2020 is generated. Accordingly, effective utilization of cooling power is made possible by thermally connecting a cooling power utilizing apparatus 2060 such as an air conditioner outdoor unit, which is an example of the demand for cooling power energy, through a heat exchange pipe 2061 for example.

The heat exchange pipe described above is configured to include an endless piping and a fluid for heat exchange that is circulated in this piping. As the fluid for heat exchange (for example, water, or a mixed solvent of water and a water-soluble solvent) is circulated to flow through the piping by a circulation pump (not illustrated in the diagram) installed in the piping, cooling power can be supplied to a cooling power utilizing apparatus 50.

The adsorber 2020 includes a fluid retaining chamber 2022 which is a first fluid retaining unit to which steam (first fluid) is supplied from the evaporator 2010, and in which steam is retained by being adsorbed and the adsorbed steam is released by being desorbed; and a fluid retaining chamber 2024 which is a second fluid retaining unit to which steam (second fluid) is supplied from the chemical thermal storage reactor 2030, and in which steam is retained by being condensed and the condensed steam is released by being desorbed as steam again.

The adsorber 2020 is provided with plural fluid retaining chambers 2022 and plural fluid retaining chambers 2024. The respective fluid retaining chambers 2022 and fluid retaining chambers 2024 are alternately disposed in the casing of the adsorber 2020 as illustrated in FIG. 11, and adjoining chambers are thermally connected with one another. That is, it is arranged such that when heat release or heat absorption occurs in the fluid retaining chambers 2022 and thereby a temperature change occurs, heat exchange occurs between the fluid retaining chambers 2022 and the fluid retaining chambers 2024, and the fluid retaining chambers 2024 are heated or cooled.

The fluid retaining chambers 2022 are connected with the other end of the flow piping 2012, and steam is supplied thereto from the evaporator 2010. In these fluid retaining chambers 2022, as illustrated in FIG. 11, a plate-shaped adsorbent material 2026 is provided on the top surface and the bottom surface of each chamber so that supplied steam can be retained therein by being adsorbed.

The adsorbent material 2026 is a plate-shaped molded product produced using silica gel (physical adsorbent material), and as illustrated in FIG. 12, the adsorbent material 2026 is composed of silica gel plates 2026A and 2026B. The surfaces S of the silica gel plates 2026A and 2026B that face the fluid retaining fluid chambers 2024, that is, the surfaces that are in contact with the top surface and the bottom surface of each chamber, are heat transferable surfaces, and the fluid retaining chambers can achieve heat exchange with adjoining chambers through these surfaces.

For example, when steam is condensed in the fluid retaining chamber 2024 and the heat of condensation is generated, heat exchange occurs at the heat transferable surfaces S of the silica gel plates 2026A and 2026B. When the silica gel plates 2026A and 2026B (adsorbent materials) are heated, the steam that has been adsorbed to the silica gel is desorbed, and steam in an amount equivalent to the amount of heat supplied at the time of heating can be supplied to the condenser 2040.

Since an adsorbent material is used, the amount of heat required for the adsorption (immobilization) and desorption of steam can be suppressed to a low level, and adsorption and desorption of steam can be easily carried out even with a small amount of energy. In the present exemplary embodiment, steam is used as the first fluid, but in addition to steam, any material having a large latent heat of evaporation, such as ammonia, can be suitably used. The details of the adsorbent material are as described above in Exemplary Embodiment 5.

In the fluid retaining chambers 2024, one end of a flow piping 2038 is connected thereto, and heat is supplied thereto together with steam from the chemical thermal storage reactor 2030 that will be described below. When heat is supplied, heat exchange occurs between the fluid retaining chambers 2024 and the fluid retaining chambers 2022, and in the fluid retaining chambers 2024, steam is condensed and water is produced. The heat of condensation at this time is also subject to the heat exchange between the fluid retaining chambers 2024 and the fluid retaining chambers 2022. Thereby, in the fluid retaining chambers 2022, the adsorbent material is heated, and the steam adsorbed to the adsorbent material is desorbed.

The top surface and the bottom surface of the fluid retaining chambers 2024, where heat exchange is carried out between the fluid retaining chambers 2024 and the fluid retaining chambers 2022, are provided with grooves or wicks (furrows). The surfaces having a groove structure or a wick structure are provided with concave furrows, and a liquid (water in the present exemplary embodiment) is retained in these furrows by means of the surface tension of water, so that a liquid film can be formed. Water can be made to exist uniformly on the surface where heat exchange occurs, and the distribution of vaporization can be made uniform within the surfaces where heat exchange occurs.

The details of the groove structure are as described above in Exemplary Embodiment 5.

In the present exemplary embodiment, a configuration in which only a furrow structure is provided in the fluid retaining chambers 2024 and an adsorbent material is not provided, is adopted. However, a structure in which a porous layer is provided on the top surface or the bottom surface of the fluid retaining chambers 2024 that face the fluid retaining chambers 2022 may also be employed.

Regarding the porous layer, in addition to the use of the porous body described above, a porous structure may be provided by using a material that is capable of forming a porous structure. The details of the material that is capable of forming a porous structure are as described above in Exemplary Embodiment 5.

The chemical thermal storage reactor 2030 includes a reaction chamber 2032 which is a heat storage reaction unit to which steam (first fluid) is supplied from the evaporator 2010, and which has a chemical heat storage material that releases the reaction heat when steam is immobilized as a result of a hydration reaction, and stores heat when steam is desorbed; and a vaporization chamber 2034 which is a fluid vaporization unit to which water (second fluid) is supplied from the condenser 2040, and in which water is vaporized by the heat from the reaction chamber 2032.

Figure 17:
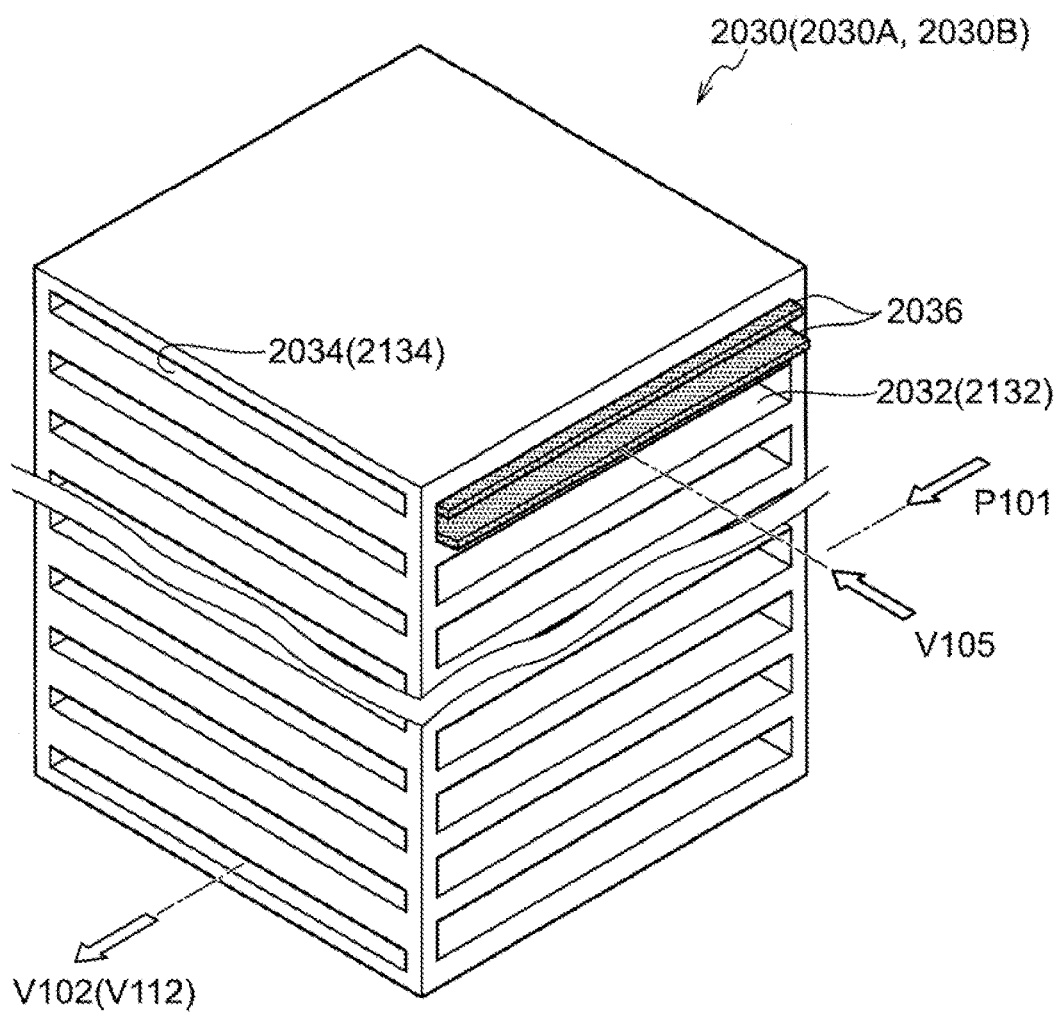
FIG. 17 is a perspective view diagram illustrating a specific configuration example of a chemical thermal storage reactor.

The chemical thermal storage reactor 2030 is provided with plural reaction chambers 2032 and plural vaporization chambers 2034. The respective reaction chambers 2032 and vaporization chambers 2034 are alternately disposed in the casing of the chemical thermal storage reactor 2030 as illustrated in FIG. 17, and adjoining chambers are thermally connected with one another. That is, it is arranged such that when heat release or heat absorption occurs in the reaction chambers 2032 and thereby a temperature change occurs, heat exchange occurs between the reaction chambers 2032 and the vaporization chambers 2034, and the vaporization chambers 2034 are heated or cooled.

The reaction chambers 2032 are connected with the other end of the flow piping 2014, and steam is supplied thereto from the evaporator 2010. In these reaction chambers 2032, as illustrated in FIG. 17, a plate-shaped heat storage material 2036 is provided on the top surface and the bottom surface of each chamber so that supplied steam reacts with the heat storage material and is retained therein.

The plate-shaped heat storage material 2036 is a plate-shaped molded product produced by pressing a powder of calcium oxide (CaO) which is a chemical heat storage material. As illustrated in FIG. 12, this heat storage material 2036 is composed of CaO plate-shaped bodies (chemical heat storage material structures) 2036A and 2036B, similarly to the adsorbent material 2026 described above. The surfaces S of the CaO plate-shaped bodies 2036A and 2036B that face the reaction chambers 2034, that is, the surfaces that are in contact with the top surface and the bottom surface of each chamber, are heat transferable surfaces, and the fluid retaining chambers can achieve heat exchange with adjoining chambers through these surfaces.

Calcium oxide, which is one of chemical heat storage materials, causes a reaction as described below and causes the reaction heat. A chemical heat storage material is a material which is capable of implementing absorption and release of heat by utilizing a chemical reaction. For example, absorption and release of heat by CaO is configured such that heat release (heat energy generation) is induced by hydration, and heat storage (heat absorption) is induced by dehydration. That is, CaO can reversibly repeat heat storage and heat release by the reaction described below:

$$CaO + H_2O \Leftrightarrow Ca(OH)_2 \quad (a)$$

Furthermore, when this is indicated together with the amount of heat storage and the amount of heat release Q, the reaction occurs as follows:

$$CaO + H_2O \rightarrow Ca(OH)_2 + Q \quad (b)$$

$$Ca(OH)_2 + Q \rightarrow CaO + H_2O \quad (c)$$

For example, when steam is condensed in the vaporization chamber 2034 and the heat of condensation is generated, heat exchange occurs at the heat transferable surfaces S of the CaO plate-shaped bodies 2036A and 2036B of the heat storage material 2036. When the CaO plate-shaped bodies 2036A and 2036B are heated, the reaction of the above-described formula (c) proceeds, and dehydration occurs. Thus, steam in an amount equivalent to the amount of heat supplied at the time of heating can be supplied to the condenser 2040.

Since a chemical heat storage material is used, the amount of heat required for the immobilization and desorption of steam can be suppressed to a low level, and adsorption and desorption of steam can be easily carried out even with a small amount of energy. Examples of the chemical heat storage material include, in addition to CaO that is used in the present exemplary embodiment, inorganic oxides of alkaline earth metals such as magnesium oxide (MgO) and barium oxide (BaO); inorganic oxides of alkali metals such as lithium oxide; and inorganic oxides such as aluminum oxide ($Al_2O_3$). The metal oxides may be used singly, or may be used in combination of two or more kinds.

In the present exemplary embodiment, water (steam) is used as the first fluid; however, in addition to water, a material having a large latent heat of evaporation, such as ammonia, can be suitably used. In the case of using ammonia as the first fluid, metal chlorides that are different from the materials described above are suitably used as the chemical heat storage material. When a metal chloride is used, the heat storage density can be further increased.

Regarding the metal chloride, a compound which causes a heat energy generation reaction at the time of the adsorption of ammonia is applicable. A metal chloride releases heat when ammonia is immobilized (adsorbed) onto the heat storage material, and stores heat when ammonia is desorbed from the heat storage material. For example, in the case of magnesium chloride ($MgCl_2$), in the reversible reaction described below, heat is released at the time of the reaction that proceeds in the right-hand side direction, and heat is stored at the time of the reaction that proceeds in the left-hand side direction.

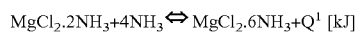

The details of the metal chlorides are as described above in Exemplary Embodiment 2. The kind of the metal chloride can be appropriately selected in accordance with the ammonia pressure or temperature. Therefore, there is a broad range of selection in which the ammonia pressure or temperature can be selected in accordance with the object of heat utilization.

In the above description, in a system that uses water as a fluid, a hydration reactive heat storage material which releases heat as a result of a hydration reaction and absorbs heat as a result of a dehydration reaction is preferred, and particularly, calcium oxide (CaO) is preferred.

Furthermore, in a system that uses ammonia as a fluid, operation below the freezing point is made possible. In this case, when the adsorption temperature of ammonia is low, $BaCl_2$, $CaCl_2$ or $SrCl_2$ can be selected, and when the adsorption temperature of ammonia is relatively high, $MgCl_2$, $MnCl_2$, $CoCl_2$ or $NiCl_2$ can be selected.

The chemical heat storage material can be prepared as a molded product which is obtained by, for example, press molding a particulate material such as CaO. There are no particular limitations on the molding method, and for example, a heat storage material (or a slurry containing a heat storage material) containing a chemical heat storage material and optionally other components such as a binder, can be subjected to a known molding method such as pressurized molding or extrusion molding. The pressure at the time of molding can be adjusted to, for example, 20 MPa to 100 MPa, and a pressure of 20 MPa to 40 MPa is preferred.

In the vaporization chambers 2034, the other end of the flow piping 2038 that is connected to the fluid retaining chambers 2024 of the adsorber and one end of a supply piping 42 are connected thereto. In the vaporization chambers 2034, when the water of condensation exists in the chamber, this water of condensation is subjected to heat exchange with the reaction chambers 2032, and when water is supplied from the condenser 2040 that will be described below, the supplied water is subjected to heat exchange with the reaction chambers 2032. Thereby, steam is generated.

The top surfaces and the bottom surfaces of the vaporization chambers 2034, where heat exchange is carried out between the vaporization chambers 2034 and the reaction chambers 2032, are provided with grooves or wicks (furrows). The surfaces having a groove structure or a wick structure are provided with concave furrows, and a liquid (water in the present exemplary embodiment) is retained in these furrows by means of the surface tension of water, so that a liquid film can be formed. Water can be made to exist uniformly on the surface where heat exchange occurs, and the distribution of vaporization can be made uniform within the surfaces where heat exchange occurs.

The details of the groove structure and the wick structure are as described above.

In the present exemplary embodiment, a configuration in which only a furrow structure is provided in the vaporization chambers 2034 and an adsorbent material is not provided, is adopted. However, a structure in which a porous layer is provided on the top surfaces or the bottom surfaces of the vaporization chambers 2034 that face the reaction chambers 2032, may also be employed. Regarding the porous layer, in addition to the use of the porous body described above, a porous structure may be provided by using a material that is capable of forming a porous structure. The details of the material that can form a porous structure are as described above.

It is preferable that the chemical thermal storage reactor 2030 further include a heater that can heat the chemical heat storage material from an external source. When it becomes difficult to carry out the hydration reaction with the steam supplied from the evaporator, the chemical heat storage material can be regenerated by heating the material by means of a heater to carry out, for example, a dehydration reaction (desorption of water). The steam generated at the time of regeneration can be supplied to recycling by returning the steam to the evaporator through the flow piping 2014.

The condenser 2040 is connected with the adsorber 2020 such that steam can be supplied from the adsorber 2020, and the condenser 2040 condenses the steam supplied from the adsorber 2020. Specifically, the condenser 2040 is connected respectively with one end of a flow piping 2028 having a valve V103, which is a flow rate regulating valve, and an end of a flow piping 2029 having a valve V101, which is a flow rate regulating valve. The condenser 2040 is in communication with the fluid retaining chamber 2022 of the adsorber 2020 through the flow piping 2028, and is in communication with the fluid retaining chamber 2024 of the adsorber 2020 through the flow piping 2029. Thus, it is arranged such that steam discharged from the fluid retaining chambers 2022 and 2024 through the respective flow pipings is collected at one site of the condenser.

Furthermore, the condenser 2040 is connected with one end of the flow piping 2042 having a pump P101, and the condenser is in communication with the vaporization chambers 2034 of the chemical thermal storage reactor 2030 through the flow piping 2042. Water produced by condensation and liquefaction of water in the condenser 2040 is sent to the vaporization chambers 2034 of the chemical thermal storage reactor 2030 through the flow piping 2042 by driving the pump P101, and steam is generated in the vaporization chambers. Steam generated herein is used to heat the adsorber 2020 with steam.

Furthermore, the condenser 2040 is connected with one end of a flow piping 2044 having a pump P102, and the condenser 2040 is in communication with the evaporator 2010 through the flow piping 2044. Water condensed at the condenser 2040 is also supplied to the evaporator 2010 through the flow piping 2044 by driving the pump P102. Water supplied to the evaporator is sent to the reaction chambers 2032 of the chemical thermal storage reactor as steam, and steam thus sent is adsorbed to the chemical heat storage material and is used for the generation of heat that accelerates vaporization of water at the vaporization chambers.

Figure 18:
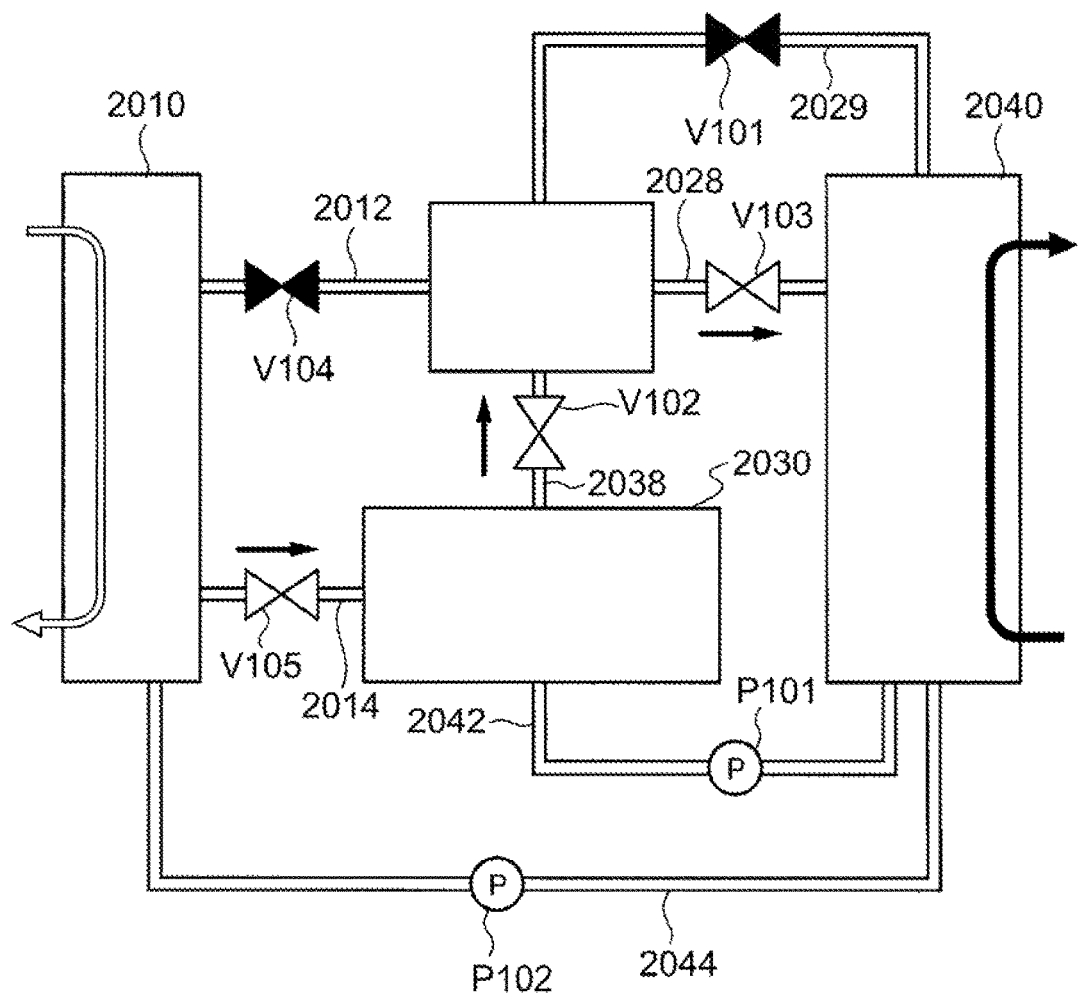
FIG. 18 is a diagram illustrating the circulation form when heat is utilized in the adsorber regeneration mode.
Figure 19:
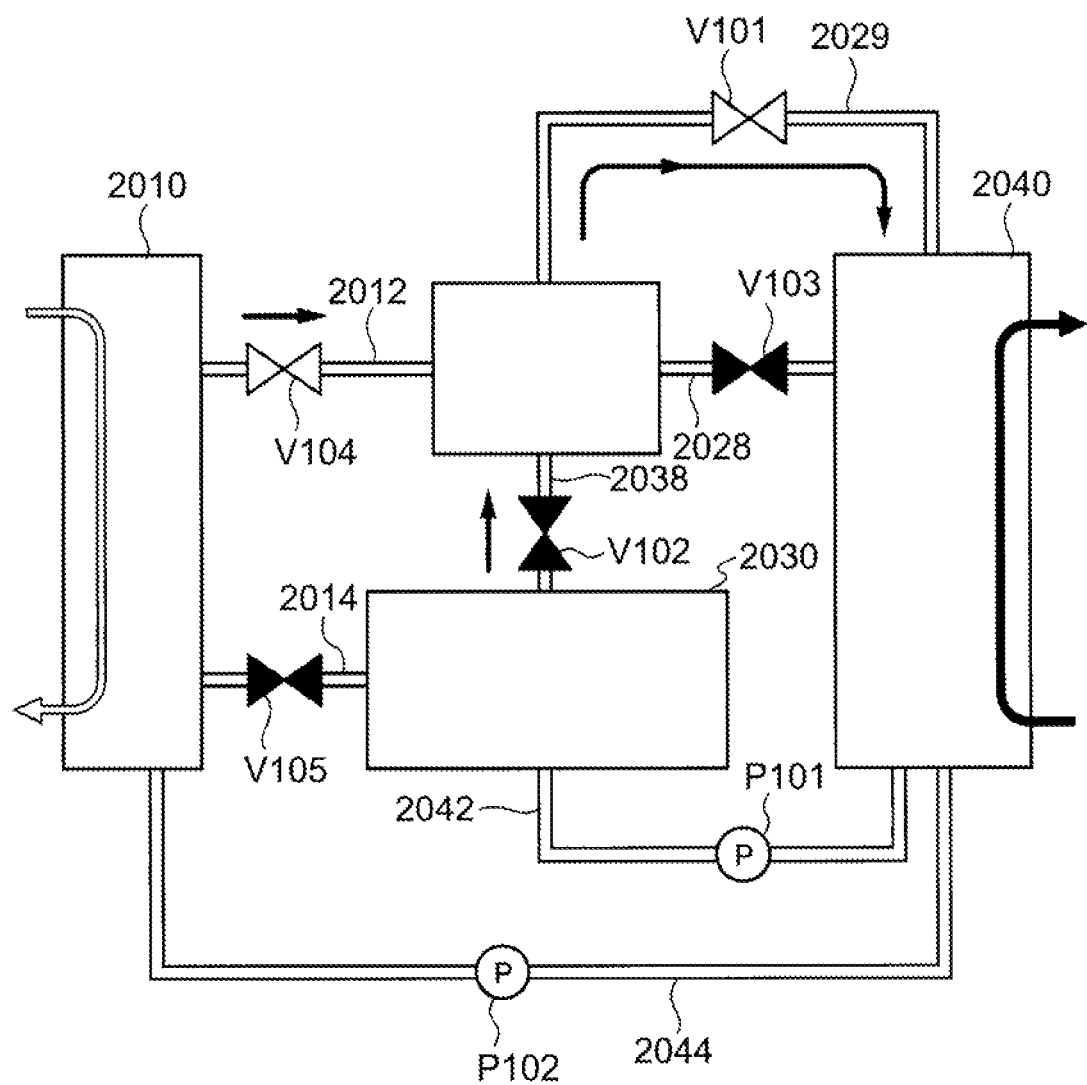
FIG. 19 is a diagram illustrating the circulation form when heat is utilized in the adsorber adsorption mode.

Next, an operation example of the adsorption heat pump of the present exemplary embodiment will be explained with reference to FIG. 18 and FIG. 19. FIG. 18 is a diagram illustrating the flow form at the time of utilizing heat in the adsorber regeneration mode, and FIG. 19 is a diagram illustrating the flow form at the time of utilizing heat in the adsorber adsorption mode.

In the evaporator 2010, water is supplied from the condenser 2040, and evaporation proceeds to generate steam. At this time, for example, generation of cooling power at about 15° C. can be carried out, and effective utilization of cooling power is made possible by thermally connecting a cooling power utilizing apparatus 2060 such as an air conditioner outdoor unit, which is an example of the demand for cooling power energy, for example, through a heat exchange pipe 2061.

Subsequently, as illustrated in FIG. 18, steam generated at the evaporator 2010 is sent to the reaction chambers 2032 of the chemical thermal storage reactor 2030 through the flow piping 2014. The steam thus sent is subjected to a hydration reaction with the chemical heat storage material and induces the reaction heat. At this time, for example, generation of heat at a temperature higher than 100° C. can be achieved. This reaction heat is subjected to heat exchange between the reaction chambers 2032 and the vaporization chambers 2034, and water in the vaporization chambers is vaporized by the heat, thereby generating, for example, high temperature vapor at 100° C. When this high temperature vapor is sent to the fluid retaining chamber 2024 of the adsorber 2020 through the flow piping 2038, the heat of vapor is subjected to heat exchange so that the adsorbent material 2026 of the fluid retaining chamber 2022 is heated. Also, the vapor is condensed at the fluid retaining chamber 2024 and is retained therein by undergoing phase change into a liquid phase, and the heat of condensation is released. At this time, for example, generation of heat at about 90° C. can be achieved. Therefore, the adsorbent material 2026 of the fluid retaining chamber 2022 is heated also by heat exchange of the heat of condensation thus released. Thereby, the water adsorbed to the adsorbent material 2026 of the fluid retaining chamber 2022 is desorbed as, for example, steam at 40° C. Steam thus desorbed is sent to the condenser 2040 through the flow piping 2028, and for example, heat at 40° C. is generated.

At this time, in the fluid retaining chamber 2024, water generated by condensation increases, and in the fluid retaining chamber 2022, steam adsorbed to the adsorbent material 2026 is gradually decreased.

As the amount of steam adsorbed at the fluid retaining chamber 2022 decreases as such, the adsorbent material 2026 is in a state of being capable of easily adsorbing steam. Therefore, water supplied from the condenser 2040 to the evaporator 2010 is easily vaporized, and steam thus generated is supplied to the fluid retaining chamber 2022 of the adsorber 2020 as illustrated in FIG. 19. At this time, the flow pipings 2014, 2028 and 2038 are closed by valves.

When steam from the evaporator is sent to the fluid retaining chamber 2022 through the flow piping 2012 as illustrated in FIG. 19, steam is retained by being adsorbed to the adsorbent material of the fluid retaining chamber 2022, and also releases the heat of adsorption. At this time, for example, generation of heat at 40° C. can be achieved. The heat of adsorption thus released is subjected to heat exchange between the fluid retaining chamber 2022 and the fluid retaining chamber 2024, and thereby the fluid retaining chamber 2024 is heated. Then, water collected at the fluid retaining chamber 2024 by condensation is vaporized, and is desorbed as steam. At this time, the steam (second fluid) thus desorbed is sent to the condenser 2040 through the flow piping 2029.

At this time, in the fluid retaining chamber 2022, the amount of adsorption of steam in the adsorbent material 2026 increases, while in the fluid retaining chamber 2024, collected water is vaporized and is gradually decreased.

As described above, used heat energy can be continuously recovered in the condenser by repeating the adsorber regeneration mode illustrated in FIG. 18 and the adsorber adsorption mode illustrated in FIG. 19, until the heat storage energy at the chemical thermal storage reactor 2030 reaches zero. Thereby, continuous generation of cooling power and heat can be achieved.

When a hydration reaction of the chemical heat storage material of the chemical thermal storage reactor no longer proceeds, only the flow piping 2014 is opened by a valve, and the chemical heat storage material is heated (for example, 400° C.) by an external heat source that is not illustrated in the diagram. Thereby, a dehydration reaction for the chemical heat storage material is carried out, and steam is generated. Steam thus generated is returned to the evaporator through the flow piping 2014. At this time, the evaporator is used as a condenser, and the steam sent thereto is accumulated by being condensed. At this time, as the heat of condensation, for example, generation of heat at 40° C. can be achieved.

A control device 2090 is a control unit that is in charge of the overall control of the adsorption heat pump, and is configured to be electrically connected with valves V101 to V105, pumps P101 and P102, external heat sources and the like, so that the control device can control heat utilization by controlling the valves and pumps, the heat sources, and the heat exchange.

Figure 20:
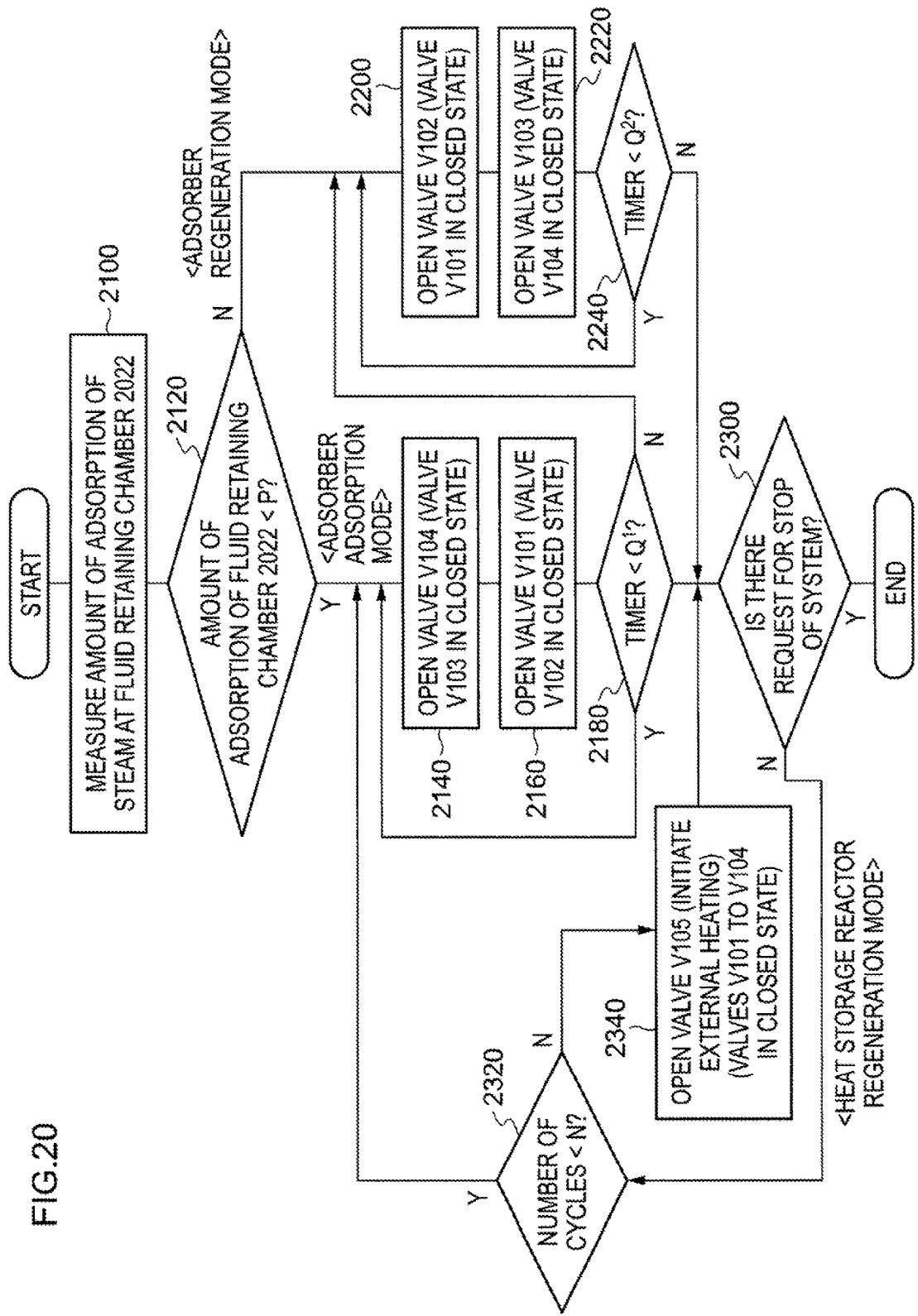
FIG. 20 is a flow diagram illustrating the heat pump cycle for heating control routine of Exemplary Embodiment 1 of the invention.

Next, the control routine by means of a control device 2090 which is a flow control unit for controlling the adsorption heat pump of the present exemplary embodiment will be explained with reference to FIG. 20, primarily on the basis of a heat pump cycle for heating control routine by which a heat pump cycle for heating is continued by alternately supplying steam to the two fluid retaining chambers of the adsorber 2020, and thereby recovering heat energy.

When the electric power supply of the control device 2090 is turned on by turning on the startup switch of the adsorption heat pump of the present exemplary embodiment, the system is started, and the heat pump cycle for heating control routine is implemented. Meanwhile, the startup of the system may be carried out automatically, and may also be carried out manually.

When the present routine is carried out, first, in order to determine the amount of adsorption of the adsorbate (steam) to the adsorbent material 2026 at the fluid retaining chamber 2022, the amount of adsorption is measured in Step 2100. Then, in the next Step 2120, it is determined whether the amount of adsorption is less than a predetermined threshold value P.

In Step 2120, if it is determined that the amount of adsorption of steam is less than the threshold value P, the system is in a state that the adsorbent material 2026 can continuously adsorb the steam from the evaporator 2010, and therefore, the process is moved to Step 2140 (adsorber adsorption mode). In Step 2140, the valve V104 is opened, and adsorption of steam by the adsorbent material 2026 is initiated. At this time, the heat of adsorption occurs as a result of the adsorption of steam, and the fluid retaining chamber 2024 that is capable of heat exchange is heated. Furthermore, the valve V103 installed in the flow piping 2028 is closed. In the fluid retaining chamber 2024 that has been heated by heat exchange of the heat of adsorption from the fluid retaining chamber 2022, water is vaporized and is desorbed as steam. Therefore, in the next Step 2160, the valve V101 provided in the flow piping 2029 is opened, and steam is sent to the fluid collecting chamber 2050 through the flow piping 2029. At this time, the valve V102 installed in the flow piping 2029 is in a closed state.

In the next Step 2180, it is determined whether the time passed after the transition to Step 2140 is less than a predetermined time (timer) $Q^1$, and if it is determined that the time $Q^1$ has not yet passed, since the adsorbent material of the adsorber is in a state of being capable of adsorbing steam, Step 2140 is continued. On the other hand, if it is determined that the time $Q^1$ has passed, the process is moved to Step 2200 for a shift to the adsorber regeneration mode.

In Step 2200, the valve V102 is opened so as to desorb steam from the adsorbent material 2026, and heated steam is supplied from the chemical thermal storage reactor 2030. When heated steam is sent to the fluid retaining chamber 2024 of the adsorber 2020 through the flow piping 2038, steam is condensed at the fluid retaining chamber 2024 and is retained by being subjected to phase change to water, while releasing the heat of condensation at the same time. At this time, the heat of the steam supplied to the fluid retaining chamber 2024 is subjected to heat exchange between the fluid retaining chamber 2024 and the fluid retaining chamber 2022, and the heat of condensation released is also subjected to heat exchange between the fluid retaining chamber 2024 and the fluid retaining chamber 2022. Thereby, the adsorbent material 2026 of the fluid retaining chamber 2022 is heated. In this manner, the steam adsorbed to the adsorbent material 2026 of the fluid retaining chamber 2022 is desorbed again. Therefore, in the next Step 2200, the valve V103 installed in the flow piping 2028 is opened, and steam is sent to the condenser 2040 through the flow piping 2028. At this time, the valve V104 installed in the flow piping 2012 is in a closed state.

In the next Step 2240, it is determined whether the time passed after the transition to Step 2200 is less than a predetermined time (timer) Q, and if it is determined that the time $Q^2$ has not yet passed, Steps 2200 and 2220 are continued in order to further desorb water that is adsorbed to the adsorbent material of the adsorber and to regenerate the adsorbent material. On the other hand, if it is determined that the time $Q^2$ has passed, the process is moved to the next Step 2300, and the presence or absence of a request for a stop of the system is first determined.

Furthermore, in Step 2120, if it is determined that the amount of adsorption of steam has reached a value higher than or equal to a threshold value P, the process is first moved to Step 2200 (adsorber regeneration mode). Thereafter, Steps 2220 and 2240 are carried out as described above, and then the process is moved to Step 2140 as described above so that the process can be shifted to the adsorber adsorption mode.

In Step 2300, if it is determined that there is no request for a stop of the system, on the occasion of continuing the heat pump cycle for heating, it is determined whether the number of cycles counted in Step 2320 by defining the processes of "adsorber adsorption mode+adsorber regeneration mode" as one cycle has reached a predetermined number N, in order to secure the reaction heat at the chemical heat storage material of the chemical thermal storage reactor. On the other hand, in Step 2300, if it is determined that there is a request for a stop of the system, this routine is terminated in order to stop the system.

In the next Step 2320, if it is determined that the number of cycles has not reached a predetermined number N, since the process is in a state in which a hydration reaction at the chemical heat storage material can be continuously carried out (a state of being capable of obtaining the reaction heat), the process is returned directly to Step 2140, and the steps such as described above are repeated. On the other hand, if it is determined that the number of cycles has reached a predetermined number N in Step 2320, since the process is in a state in which a hydration reaction of the chemical heat storage material does not proceed and the reaction heat is not obtained, the valve V105 is opened in Step 2340, heat is applied to the chemical thermal storage reactor by means of an external heat source, and the chemical heat storage material is regenerated. At this time, a dehydration reaction of the chemical heat storage material proceeds, and the steam generated by dehydration is returned to the evaporator 2010 through the flow piping 2014 and condensed. Furthermore, the number of cycles is reset.

Thereafter, in Step 2300, the presence or absence of the request for a stop of the system is determined again. If it is determined that there is no request for a stop of the system in Step 2300, the number of cycles is determined again in Step 2320, and the steps such as described above are repeated. Meanwhile, in Step 2300, if it is determined that there is a request for a stop of the system, this routine is terminated in order to stop the system.

In Exemplary Embodiment 7, CaO is used as the chemical heat storage material, but the same effect is provided even if other chemical heat storage materials are used. Furthermore, an example of using steam as the first fluid and the second fluid has been described; however, the fluids are not limited to steam, the same effect is provided even in the case of using a fluid having a relatively large latent heat of evaporation, such as ammonia, in addition to steam. In the case of using ammonia, a metal chloride such as magnesium chloride ($MgCl_2$) is suitable as the chemical heat storage material.

Exemplary Embodiment 8

Exemplary Embodiment 8 of the adsorption heat pump of the invention will be described with reference to FIG. 21 and FIG. 22. The present exemplary embodiment has the configuration of a system in which two units of the adsorber 2020 of Exemplary Embodiment 7 described above are disposed, and the two adsorbers alternately operate adsorption heat pumps A2 and B2 which share an evaporator, a chemical thermal storage reactor, and a condenser.

Meanwhile, constituent elements that are the same as those used in Exemplary Embodiment 7 will be assigned with the same reference symbol, and detailed descriptions thereof will not be repeated here.

Figure 21:
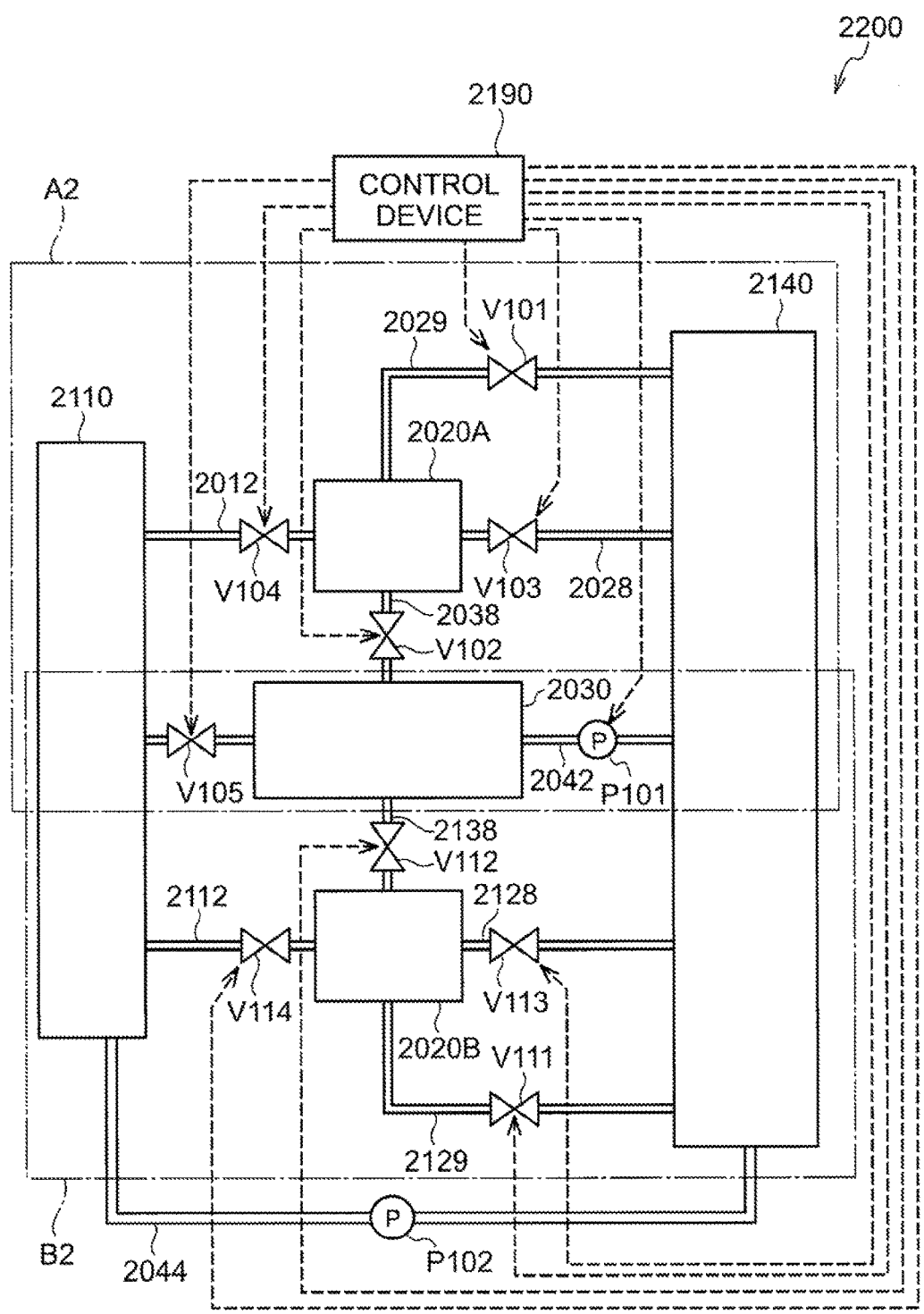
FIG. 21 is a schematic diagram illustrating a configuration example of the adsorption heat pump system of Exemplary Embodiment 2 of the invention.
Figure 22:
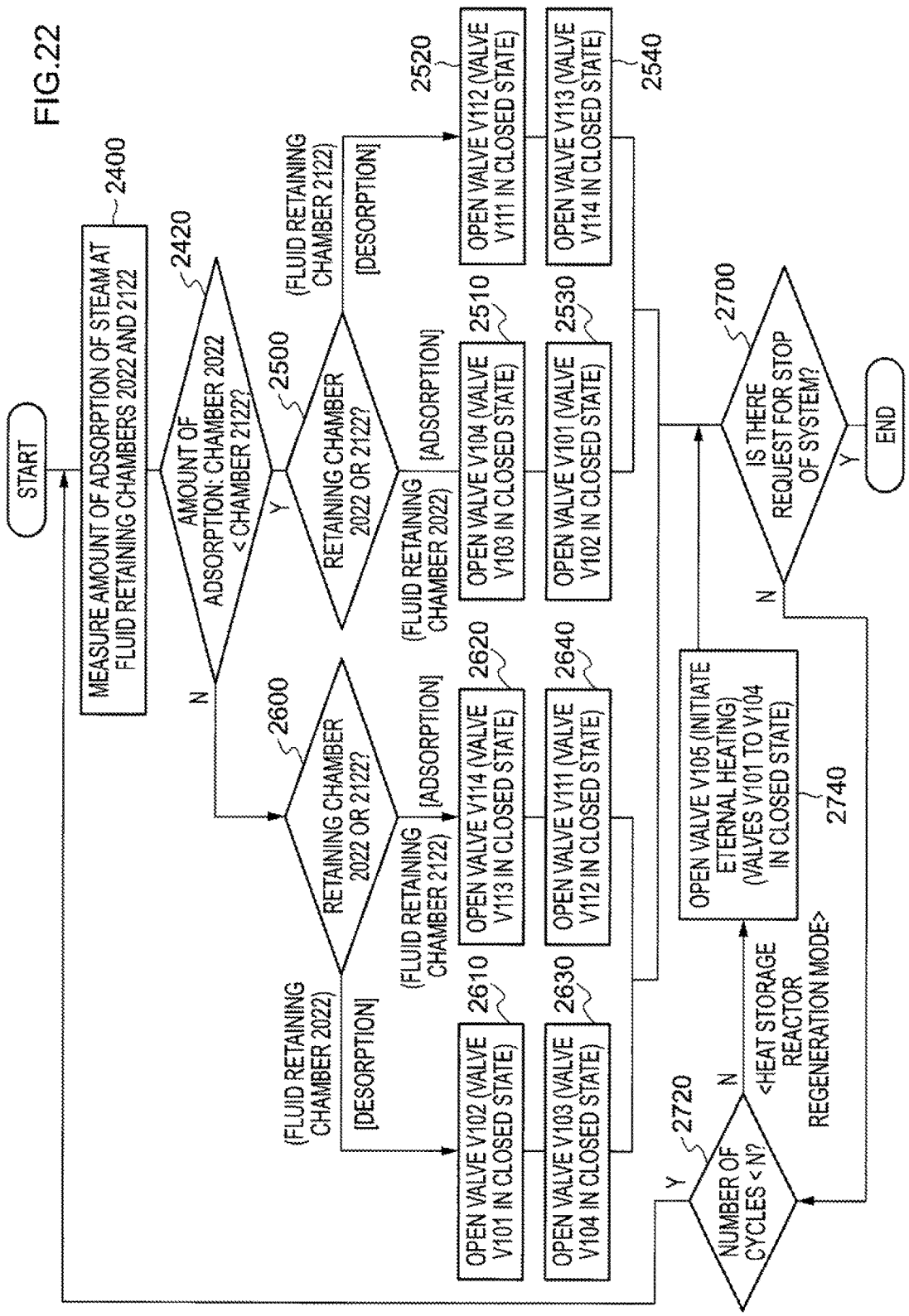
FIG. 22 is a flow diagram illustrating the heat pump cycle for heating control routine of Exemplary Embodiment 2 of the invention.

The adsorption heat pump 2200 of the present exemplary embodiment is configured to operate such that, as illustrated in FIG. 21, adsorption heat pumps that are configured to be the same as those used in Exemplary Embodiment 7 share a single chemical thermal storage reactor 2030, a single evaporator 2110, and a single condenser 2140. Regarding the evaporator 2110 and the condenser 2140, an evaporator and a condenser that are configured to be the same as the evaporator 2010 and the condenser 2040 of Exemplary Embodiment 7 can be used; however, it is preferable that the condenser from which the steam coming from two adsorbers is discharged be configured to have a capability that is at least twice the capability of the evaporator that supplies steam alternately to the two adsorbers.

The evaporator 2110 is configured to be the same as the evaporator 2010 of Exemplary Embodiment 7, and is connected respectively to the adsorbers 2020A and 2020B such that water is vaporized, and steam produced by the vaporization, which is the first fluid, can be supplied to the adsorbers. Specifically, the evaporator 2110 is connected respectively with one end of a flow piping 2012 having a valve V104, which is a flow rate regulating valve, and one end of a flow piping 2112 having a valve V114. Further, the evaporator 2110 is in communication with the adsorber 2020A through the flow piping 2012, and is in communication with the adsorber 2020B through the flow piping 2112.

The adsorber 2020A is configured to be the same as the adsorber 2020 of Exemplary Embodiment 7, and includes a fluid retaining chamber 2022 and a fluid retaining chamber 2024. Furthermore, the adsorber 2020B is also configured to be basically the same as the adsorber 2020 of Exemplary Embodiment 7. Specifically, the adsorber 2020B includes a fluid retaining chamber 2122 which is a first fluid retaining unit to which steam (first fluid) is supplied from the evaporator 2110, and in which steam is retained by being adsorbed, and the adsorbed steam is released by being desorbed; and a fluid retaining chamber 2124 which is a second fluid retaining unit to which steam (second fluid) is supplied from the chemical thermal storage reactor 2030, and in which steam is retained by being condensed, and the condensed steam is released by being desorbed.

The details of the adsorber 2020A are as described with regard to the adsorber 2020 in Exemplary Embodiment 7.

The adsorber 2020B is provided with plural fluid retaining units 2122 and plural fluid retaining units 2124, and the respective fluid retaining units 2122 and fluid retaining units 2124 are alternately disposed in the casing of the adsorber 2020B as illustrated in FIG. 11, and adjoining chambers are thermally connected with one another. That is, it is arranged such that when heat release or heat absorption occurs in the fluid retaining units 2122 and thereby a temperature change occurs, heat exchange occurs between the fluid retaining units 2122 and the fluid retaining units 2124, and the fluid retaining units 2124 are heated or cooled.

In the fluid retaining chambers 2122, the other end of the flow piping 2112 is connected thereto, and steam is supplied from the evaporator 2110. In these fluid retaining chambers 2122, as illustrated in FIG. 11, a plate-shaped adsorbent material 2026 is provided on the top surface and the bottom surface of each chamber so that supplied steam can be retained therein by being adsorbed.

In the fluid retaining chambers 2124, one end of the flow piping 2138 is connected thereto, and heat is supplied together with steam from the chemical thermal storage reactor 2030 which is a heater. The fluid retaining chambers 2124 are connected with the chemical thermal storage reactor 2030 by the flow piping 2138 having a valve V112, which is a flow rate regulating valve. When heat is supplied from the evaporator 2110, heat exchange occurs between the fluid retaining chambers 2124 and the fluid retaining chambers 2122, and in the fluid retaining chambers 2124, steam is condensed so that water is generated. At this time, in the fluid retaining chambers 2122, the steam adsorbed to the adsorbent material is desorbed.

The condenser 2140 is connected respectively with the adsorbers 2020A and 2020B such that steam can be supplied from both the adsorbers 2020A and 2020B, and condenses steam supplied from the adsorbers 2020A and 2020B.

Here, the relationship of connection between the condenser 2140 and the adsorber 2020B is as follows. That is, the adsorber 2020B is connected respectively with one end of the flow piping 2128 having a valve V113, which is a flow rate regulating valve, and one end of the flow piping 2129 having a valve V11, which is a flow rate regulating valve. The condenser 2140 is in communication with the fluid retaining chambers 2122 of the adsorber 2020B through the flow piping 2128, and is in communication with the fluid retaining chambers 2124 of the adsorber 2020B through the flow piping 2129.

Meanwhile, the relationship of connection between the condenser 2140 and the adsorber 2020A is as described in Exemplary Embodiment 7.

Furthermore, in, the adsorption heat pump A2, the other ends of the flow piping 2028 and the flow piping 2029 are respectively connected with the condenser 2140. In the condenser, steam discharged from the fluid retaining chambers 2022 and 2024 on the side of the adsorption heat pump A2 through the respective flow pipings is collected. Furthermore, in the adsorption heat pump B2, the other ends of the flow piping 2128 and the flow piping 2129 are respectively connected with the condenser 2140. In the condenser, steam discharged from the fluid retaining chambers 2122 and 2124 on the side of the adsorption heat pump B2 through the respective flow pipings is collected.

As such, steam is all collected and coagulated at the condenser. Thereby, the overall heat energy of the system is to be recovered at the condenser.

Next, an operation example of the adsorption heat pump of the present exemplary embodiment will be explained.

The operation of the adsorption heat pumps A2 and B2 is all as described in the "operation example of the adsorption heat pump" in Exemplary Embodiment 7. In the present exemplary embodiment, since two units of the adsorption heat pump are employed, an operation is enabled in which when adsorption of steam with the adsorbent material of one of the adsorption heat pumps (for example, adsorption heat pump A2) is carried out, desorption of steam with the adsorbent material of the other adsorption heat pump (for example, adsorption heat pump B2) is carried out, and on the contrary, when desorption of steam with the adsorbent material of the one adsorption heat pump (adsorption heat pump A2) is carried out, adsorption of steam with the adsorbent material of the other adsorption heat pump (adsorption heat pump B2) is carried out.

The control device 2190 is a control unit that is in charge of the overall control of the adsorption heat pumps A2 and B2, and is configured to be electrically connected with valves V101 to V104 and V111 to V114, pumps P101 and P102, external heat sources and the like, so that the control device can control heat utilization by controlling the valves and pumps, the heat sources, and the heat exchange.

Next, the control routine by means of a control device 2190 which is a flow control unit for controlling the adsorption heat pump of the present exemplary embodiment will be explained with reference to FIG. 22, primarily on the basis of a heat pump cycle for heating control routine by which the same heat pump cycle for heating as that of Exemplary Embodiment 7 is continued by causing the adsorbers 2020A and 2020B to alternately carry out adsorption and desorption of steam, and recovering heat energy.

When the electric power supply of the control device 2190 is turned on by turning on the startup switch of the adsorption heat pump of the present exemplary embodiment, the system is started, and the heat pump cycle for heating control routine is carried out. Meanwhile, the startup of the system may be carried out automatically, or may also be carried out manually.

When the present routine is carried out, first, steam is adsorbed with any one of the adsorbers 2020A and 2020B, and in order to determine whether steam should be desorbed, the amounts of adsorption of steam at the fluid retaining chamber 2022 of the adsorber 2020A and the fluid retaining chamber 2122 of the adsorber 2020B are measured in Step 2400.

Subsequently, in Step 2420, the magnitude of the amount of adsorption is examined from the amounts of adsorption thus measured. If it is determined that the amount of adsorption at the fluid retaining chamber 2022 of the adsorber 2020A is smaller than the amount of adsorption at the fluid retaining chamber 2122 of the adsorber 2020B, since more steam can be adsorbed in the fluid retaining chamber 2022 than in the fluid retaining chamber 2122, the process is moved to Step 2500 in which steam is adsorbed at the adsorber 2020A and steam is desorbed at the adsorber 2020B.

On the contrary, in Step 2420, if it is determined that the amount of adsorption at the fluid retaining chamber 2122 of the adsorber 2020B is smaller than the amount of adsorption at the fluid retaining chamber 2022 of the adsorber 2020A, since more steam can be adsorbed in the fluid retaining chamber 2122 than in the fluid retaining chamber 2022, the process is moved to Step 2600 in which steam is adsorbed at the adsorber 2020B and steam is desorbed at the adsorber 2020A.

In Step 2500, the fluid retaining chambers 2022 and 2122 are distinguished. Thus, in the fluid retaining chamber 2022, the valve V104 is opened, and adsorption of steam by means of the adsorbent material 2026 is initiated in the next Step 2510. At this time, the heat of adsorption is generated by the adsorption of steam, and the fluid retaining chamber 2024 that is capable of heat exchange is heated. Furthermore, the valve V103 installed in the flow piping 2028 is in a closed state. In the fluid retaining chamber 2024 that has been heated by heat exchange of the heat of adsorption from the fluid retaining chamber 2022, water is vaporized and is desorbed as steam. Accordingly, in the next Step 2530, the valve V101 that is provided in the flow piping 2029 is opened, and steam is sent to the fluid collecting chamber 50A through the flow piping 2029. At this time, the valve V102 installed in the flow piping 2038 is in a closed state.

Furthermore, in the fluid retaining chamber 2122, in order to desorb steam from the adsorbent material 2026, the valve V112 is opened, and heated steam is supplied from the chemical thermal storage reactor 2030 in the next Step 2520. When heated steam is sent to the fluid retaining chamber 2124 of the adsorber 2020B through the flow piping 2138, steam is condensed in the fluid retaining chamber 2124, and is retained by being subjected to phase change to water, while at the same time, releasing the heat of condensation. At this time, the heat of the steam supplied to the fluid retaining chamber 2124 is subjected to heat exchange between the fluid retaining chamber 2124 and the fluid retaining chamber 2122, and the heat of condensation released is also subjected to heat exchange between the fluid retaining chamber 2124 and the fluid retaining chamber 2122. Thereby, the adsorbent material 2026 of the fluid retaining chamber 2122 is heated. In this manner, the steam adsorbed to the adsorbent material 2026 of the fluid retaining chamber 2122 is desorbed again. Accordingly, in the next Step 2540, the valve V113 installed in the flow piping 2128 is opened, and steam is sent to the fluid collecting chamber 50B through the flow piping 2128. At this time, the valve V114 installed in the flow piping 2112 is in a closed state.

Next, in Step 2600, the fluid retaining chambers 2022 and 2122 are distinguished, and in the fluid retaining chamber 2122, the valve V114 is opened, and adsorption of steam by means of the adsorbent material 2026 is initiated in the next Step 2620. At this time, the heat of adsorption is generated as a result of the adsorption of steam, and the fluid retaining chamber 2124 that is capable of heat exchange is heated. Furthermore, the valve V113 installed in the flow piping 2128 is in a closed state. In the fluid retaining chamber 2124 that has been heated by heat exchange of the heat of adsorption from the fluid retaining chamber 2122, water is vaporized and is desorbed as steam. Accordingly, in the next Step 2640, the valve V111 provided in the flow piping 2129 is opened, and steam is sent to the fluid collecting chamber 50B through the flow piping 2129. At this time, the valve V112 installed in the flow piping 2138 is in a closed state.

Furthermore, in the fluid retaining chamber 2022, in order to desorb steam from the adsorbent material 2026, the valve V102 is opened, and heated steam is supplied from the chemical thermal storage reactor 2030 in the next Step 2610. When heated steam is sent to the fluid retaining chamber 2124 of the adsorber 2020A through the flow piping 2038, steam is condensed in the fluid retaining chamber 2024, and is retained by being subjected to phase change to water, while at the same time, releasing the heat of condensation. At this time, the heat of the steam supplied to the fluid retaining chamber 2024 is subjected to heat exchange between the fluid retaining chamber 2024 and the fluid retaining chamber 2022, and the heat of condensation thus released is also subjected to heat exchange between the fluid retaining chamber 2024 and the fluid retaining chamber 2022. Thereby, the adsorbent material 2026 of the fluid retaining chamber 2022 is heated. In this manner, the steam adsorbed to the adsorbent material 2026 of the fluid retaining chamber 2022 is desorbed again. Accordingly, in the next Step 2630, the valve V103 installed in the flow piping 2028 is opened, and steam is sent to the fluid collecting chamber 50A through the flow piping 2028. At this time, the valve V104 installed in the flow piping 2012 is in a closed state.

Subsequently, in Step 2700, the presence or absence of the request for a stop of the system is determined. In Step 2700, if it is determined that there is no request for a stop of the system, on the occasion of continuing the heat pump cycle for heating, it is determined whether the total number of cycles of the two heat pumps counted in Step 2720 by defining each of the processes of "adsorber adsorption mode+adsorber regeneration mode" of the adsorption heat pumps A2 and B2 as one cycle, has reached a predetermined number N, in order to secure the reaction heat at the chemical heat storage material of the chemical thermal storage reactor. On the other hand, in Step 2700, if it is determined that there is a request for a stop of the system, this routine is terminated in order to stop the system.

In the next Step 2720, if it is determined that the total number of cycles of the two heat pumps has not reached a predetermined number N, since the process is in a state in which a hydration reaction at the chemical heat storage material can be continuously carried out (a state of being capable of obtaining the reaction heat), the process is returned directly to Step 2400, and the steps such as described above are repeated. On the other hand, if it is determined that the total number of cycles has reached a predetermined number N in Step 2720, since the process is in a state in which a hydration reaction of the chemical heat storage material does not proceed and the reaction heat is not obtained, the valve V105 is opened in Step 2740, heat is applied to the chemical thermal storage reactor 2030 by means of an external heat source, and the chemical heat storage material is regenerated. At this time, a dehydration reaction of the chemical heat storage material proceeds, and the steam generated by dehydration is returned to the evaporator 2110 through the flow piping 2014 and condensed. Furthermore, the number of cycles is reset.

Thereafter, in Step 2700, the presence or absence of the request for a stop of the system is determined again. If it is determined that there is no request for a stop of the system in Step 2700, the number of cycles is determined again in Step 2720, and the steps such as described above are repeated. Meanwhile, in Step 2700, if it is determined that there is a request for a stop of the system, this routine is terminated right away in order to stop the system.

In Exemplary Embodiment 8, an example of utilizing water as the first fluid and the second fluid has been explained; however, the fluid is not limited to water, and the same effect is also provided in the case of using a fluid having a relatively large latent heat of evaporation, such as ammonia, in addition to water.

Furthermore, in the exemplary embodiment described above, the case in which silica gel is used as the adsorbent material has been described; however, the adsorbent material is not limited to silica gel, and the same effect can be provided by using an adsorbent material other than silica gel as described above.

Hereinafter, exemplary embodiments of the invention related to the first aspect will be described. However, the invention is not intended to be limited to the following embodiments.

<1> The adsorption heat pump system related to the first aspect of the invention includes an evaporator that evaporates a heat medium, and an adsorber that is connected with the evaporator, adsorbs the heat medium therefrom, and is regenerated by receiving thermal energy at a temperature higher than or equal to the regeneration temperature for evaporating the heat medium, or, the adsorption heat pump system related to the first aspect of the invention includes an evaporator that evaporates a heat medium, and an adsorber that is connected with the evaporator, adsorbs the heat medium therefrom, and is regenerated by receiving thermal energy at a temperature higher than or equal to the regeneration temperature for evaporating the heat medium.

In this adsorption heat pump system, since the system includes an evaporator, cooling power is generated by the evaporation of a heat medium in this evaporator. Furthermore, in this adsorption heat pump system, since the system includes an adsorber connected with the evaporator, cooling power is generated in the evaporator as the adsorber adsorbs the heat medium of the evaporator. The adsorber is at least partially regenerated by receiving thermal energy at a temperature higher than or equal to the regeneration temperature for evaporating the heat medium. The adsorber can adsorb the heat medium of the evaporator again as a result of regeneration.

Further, as the generation of cooling power in the evaporator is carried out in two processes, cooling power can be generated efficiently and continuously.

<2> In regard to the invention described in the above item <1>, the adsorption heat pump system includes a heat accumulator is capable of releasing, to the adsorber, thermal energy (or thermal energy of a temperature higher than or equal to a latent heat of evaporation of the heat medium) at a temperature higher than or equal to a temperature to regenerate the adsorber.

That is, heat can be released from the heat accumulator to the adsorber, in an amount greater than or equal to the latent heat of evaporation of the heat medium at a temperature higher than or equal to a temperature to regenerate the adsorber. As such, by utilizing the heat of the heat accumulator, regeneration of the adsorber can be carried out in a more stable manner.

<3> In regard to the invention described in the above item <2>, the heat accumulator is a chemical thermal storage reactor that is connected to the evaporator, and that is capable of generating reaction heat (preferably, at a temperature higher than or equal to the latent heat of evaporation of the heat medium) by reacting with the heat medium from the evaporator, and releasing the reaction heat to the adsorber at a temperature higher than or equal to a temperature to regenerate the adsorber.

This adsorption heat pump system includes a chemical thermal storage reactor connected with an evaporator. In the chemical thermal storage reactor, as the chemical thermal storage reactor reacts with a heat medium from the evaporator, the reaction heat is generated in an amount greater than the latent heat of evaporation of the heat medium, and in the evaporator, cooling power in an amount equivalent to the latent heat of evaporation of the heat medium is generated.

The reaction heat generated in the chemical thermal storage reactor is stored in the chemical thermal storage reactor. Further, as the chemical thermal storage reactor releases this reaction heat to the adsorber at a temperature higher than or equal to a temperature to regenerate the adsorber, the heat medium adsorbed to the adsorber is desorbed, and thus the adsorber can be regenerated.

When the adsorber is regenerated, as the adsorber adsorbs the heat medium from the evaporator, cooling power is generated at the evaporator.

As such, by utilizing the reaction with a heat medium at the chemical thermal storage reactor, efficient regeneration of the adsorber is made possible.

<4> In regard to the invention described in the above item <2> or <3>, the adsorption heat pump system includes plural chemical thermal storage reactors.

Therefore, heat from some of the chemical thermal storage reactors can be applied to the adsorber in an amount required for the regeneration of the adsorber. Furthermore, in the chemical thermal storage reactors where heat release to the adsorber is not carried out, the chemical thermal storage reactors may be regenerated during the period, or the like. Thus, different treatments can be carried out in parallel in plural chemical thermal storage reactors.

<5> In regard to the invention described in the above item <4>, when some of the plural chemical thermal storage reactors are absorbing heat, other of the chemical thermal storage reactors are in a state of being capable of releasing heat. Therefore, regeneration by heat absorption can be carried out in some of the chemical thermal storage reactors, while releasing heat to the adsorber or the like from the other chemical thermal storage reactors.

<7> In regard to the invention described in any one of the above items <3> to <5>, the chemical thermal storage reactor includes a chemical heat storage material. Therefore, the adsorbent material can be regenerated by utilizing the reaction heat generated by a chemical reaction of the chemical heat storage material, and releasing the heat to the adsorber.

In regard to the invention described in any one of the above items <3> to <5>, the chemical thermal storage reactor includes an adsorbent material causing the heat of adsorption reaction at a temperature higher than or equal to the desorption temperature of the adsorbent material of the adsorber.

Therefore, the adsorbent material can be regenerated by utilizing the heat of adsorption generated by adsorption of the heat medium by means of the adsorbent material and releasing the heat to the adsorber.

<8> In regard to the invention described in any one of the above items <3> to <7>, the heat medium of the chemical thermal storage reactor is the same as the heat medium of the adsorber.

As the heat medium of the chemical thermal storage reactor and the heat medium of the adsorber are identical, there is obtained a simpler structure as compared with the configuration of using different heat media.

<9> In regard to the invention described in any one of the above items <1> to <8>, the adsorption heat pump system includes a condenser that is connected with the adsorber and condenses the heat medium.

Therefore, the heat medium desorbed from the adsorbent material can be condensed and sent to the evaporator by using the condenser.

Furthermore, heat can be generated by recovering the sensible heat of the chemical thermal storage reactor at the adsorber, and condensing the heat medium at the condenser.

In the invention described in the above item <9>, the condenser is connected with the evaporator.

Therefore, heat can be generated by condensing the heat medium at the condenser by means of the energy applied to the chemical thermal storage reactor for the regeneration of the chemical thermal storage reactor.

<11> In regard to the invention described in the above item <9> or <10>, the condenser is connected with the chemical thermal storage reactor.

Therefore, the heat medium can be sent from the chemical thermal storage reactor to the condenser, and can be condensed at the condenser.

Hereinafter, exemplary embodiments of the invention related to the second aspect will be described. However, the invention is not limited to the following embodiments.

<12> The method of generating cooling power related to the second aspect of the invention includes a first cooling power generation process of generating cooling power by the evaporation of a heat medium under the effect of pressure reduction by a heat storage material; a second cooling power generation process of generating cooling power by the evaporation of the heat medium under the effect of pressure reduction by the adsorbent material; and a regeneration process of desorbing the adsorbed heat medium by applying the heat stored in the heat storage material to the adsorbent material, and thus regenerating the adsorbent material.

In this method of generating cooling power, cooling power is generated in the first cooling power generation process by the evaporation of a refrigerant under the effect of pressure reduction by a heat storage material. Furthermore, in this method of generating cooling power, cooling power is generated in the second cooling power generation process by the evaporation of a heat medium under the effect of pressure reduction by an adsorbent material. In the regeneration process, the heat medium adsorbed to the adsorbent material is desorbed by applying the heat stored in the heat storage material to the adsorbent material, and thus the adsorbent material is regenerated.

As such, when cooling power generation is carried out in two processes, namely, the first cooling power generation process and the second cooling power generation process, and also the adsorbent material is regenerated in the regeneration process, cooling power generation can be carried out efficiently and continuously. Particularly, in the regeneration process, since the heat of the heat storage material is utilized, the adsorbent material can be regenerated in a stable manner.

<13> In regard to the invention described in the above item <12>, there is provided a method of generating cooling power by allowing the heat storage material to react with the heat medium to induce the reaction heat in amount greater than or equal to the latent heat of evaporation of the heat medium, and releasing this reaction heat to the adsorbent material at a temperature higher than or equal to a temperature to regenerate the adsorbent material.

The reaction heat generated by causing the heat storage material to react with the heat medium is released to the adsorbent material, and thus the adsorbent material can be regenerated. As a result of regeneration of the adsorbent material, the heat medium can be adsorbed again to the adsorbent material.

As such, efficient regeneration of the adsorber is made possible by utilizing the reaction between the heat storage material and the heat medium.

Hereinafter, exemplary embodiments of the invention related to the third aspect will be described. However, the invention is not limited to the following embodiments.

<14> The adsorption heat pump system related to the third aspect of the invention is configured to include a first fluid; a second fluid which is the same in type as the first fluid; a first evaporator that evaporates a first fluid; a second evaporator that evaporates a second fluid; an adsorber that comprises a first fluid retaining unit which is capable of retaining and releasing the first fluid, and the second fluid retaining unit which is capable of retaining and releasing the second fluid, the first fluid retaining unit and the second fluid retaining unit being in a thermally connected state, and at least one of the first fluid retaining unit or the second fluid retaining unit comprising an adsorbent material that releases reaction heat when the adsorbent material retains a supplied fluid; a condenser that is connected with the first fluid retaining unit and the second fluid retaining unit of the adsorber, and that condenses the first fluid and the second fluid released from the first fluid retaining unit and the second fluid retaining unit, or the adsorption heat pump system is configured to include a first evaporator that evaporates a first fluid;

an adsorber that comprises a first fluid retaining unit to which the first fluid is supplied from the first evaporator, and in which the first fluid is retained and the retained fluid is desorbed; and a second fluid retaining unit to which a second fluid is supplied, and in which the second fluid is retained and the retained fluid is desorbed, the first fluid retaining unit and the second fluid retaining unit being in a thermally connected state, and at least one of the first fluid retaining unit or the second fluid retaining unit comprising an adsorbent material that releases reaction heat when the adsorbent material retains a supplied fluid;

a heater that heats the second fluid, and heats at least the adsorbent material by supplying the heated second fluid to the adsorber; and a condenser that is connected with the first fluid retaining unit and the second fluid retaining unit of the adsorber so as to enable flow of fluid therethrough, and that condenses the first fluid and the second fluid released from the first fluid retaining unit and the second fluid retaining unit.

<15> In the adsorption heat pump system described in the above item <14>, the adsorber can be configured such that between the first fluid retaining unit and the second fluid retaining unit, at least the first fluid retaining unit has an adsorbent material, and when the first fluid is supplied from the first evaporator to the first fluid retaining unit, the second fluid retained in the second fluid retaining unit is desorbed by the reaction heat released from the adsorbent material (heat of adsorption).

At this time, since the first fluid retaining unit and the second fluid retaining unit that constitute the adsorber are thermally connected, the second fluid retaining unit on one side is heated with the heat of adsorption released from the first fluid retaining unit on the other side.

Therefore, in the first fluid retaining unit, the amount of retention of the fluid increases, and in the second fluid retaining unit, the second fluid is desorbed so that the amount of fluid retention is decreased.

<16> In regard to the adsorption heat pump system described in the above item <14> or <15>, it is preferable that the second evaporator be a heater that produces steam as a second fluid and supplies steam to the adsorber. In this case, heated steam is supplied to the second fluid retaining unit of the adsorber. Therefore, when heated steam is supplied from the second evaporator, the heat carried by steam is given to the first fluid retaining unit, and also steam is condensed at the second fluid retaining unit and releases the heat of condensation by undergoing phase change to a liquid state. Thus, the heat of condensation can also be given to the first fluid retaining unit. Since steam has a large latent heat of evaporation, heating of the first fluid retaining unit is carried out satisfactory with the heat of condensation thus released, and it is suitable to accelerate desorption of the first fluid that is retained in the first fluid retaining unit.

<17> In regard to the adsorption heat pump system described in any one of the above items <14> to <16>, it can be configured that one of the first fluid retaining unit or the second fluid retaining unit has an adsorbent material (preferably, a physical adsorbent material), and the other of the first fluid retaining unit or the second fluid retaining unit has a porous layer and/or a groove (for example, a furrow-shaped or pit-shaped groove structure, or a wick structure having, for example, a mesh shape that exhibits the capillary phenomenon). For example, since an adsorbent material is disposed in the first fluid retaining unit, and furrows are provided at least at the heat exchange site of the second fluid retaining unit that is thermally connected, where heat exchange occurs between the first fluid retaining unit and the second fluid retaining unit, when the second fluid sent to the second fluid retaining unit is condensed and liquefied, the second fluid stays in the furrows, and the second fluid in the liquid state can be made to uniformly exist in the fluid retaining unit. That is, for example, the second fluid can be made to exist in the form of a uniform liquid film.

Thereby, the uniformity of heat exchange and the heat exchange efficiency are enhanced. On the contrary, when the first fluid is adsorbed to the adsorbent material, and the heat of adsorption is transferred to the second fluid retaining unit, desorption of the second fluid in the liquid state can be accelerated.

<18> In the adsorption heat pump system described in the above item <16>, the adsorber can be configured such that in addition to the first fluid retaining unit having an adsorbent material, the second fluid retaining unit also has an adsorbent material, and when the second fluid is supplied from the second evaporator to the second fluid retaining unit, the first fluid retained in the first fluid retaining unit is desorbed by the reaction heat released from the adsorbent material (heat of adsorption).

In this case, since both the first fluid retaining unit and the second fluid retaining unit have adsorbent materials, recovery of a stable amount of heat can be carried out in a stable manner by alternately repeating the adsorption of a fluid to the adsorbent material and desorption of a fluid from the adsorbent material between the two fluid retaining units.

<19> In the adsorption heat pump system described in any one of the above items <14> to <17>, it can be configured such that at least the first fluid retaining unit of the adsorber is provided with an adsorbent material, and is provided with a first flow rate regulating valve that regulates the amount of flow of the first fluid between the first evaporator and the first fluid retaining unit; a second flow rate regulating valve that regulates the amount of flow of the second fluid between the heater and the second fluid retaining unit; and a flow control unit that switches the flow of the first fluid and the second fluid by increasing the degree of opening (for example, opens) of the first flow rate regulating valve so that the first fluid will be adsorbed to the adsorbent material while decreasing the degree of opening (for example, closing) of the second flow rate regulating valve when the second fluid retained in the second fluid retaining unit is desorbed, and increasing the degree of opening (for example, opens) of the second flow rate regulating valve while decreasing the degree of opening (for example, closing) of the first flow rate regulating valve when the first fluid adsorbed at the first fluid retaining unit is desorbed.

When the first flow rate regulating valve and the second flow rate regulating valve are disposed, and the degrees of opening of the valves are respectively automatically controlled by the flow control unit in accordance with, for example, the amount of adsorption of steam, recovery of a stable amount of heat can be carried out in a stable manner.

Furthermore, the flow control unit can regulate the degrees of opening of the first flow rate regulating valve and the second flow rate regulating valve on the basis of the amount of adsorption of a fluid to the adsorbent material. Specifically, <20> in the adsorption heat pump system described in the above item <19>, it is preferable that when the amount of adsorption of the first fluid at the adsorbent material is less than a predetermined threshold value, the degree of opening of the first flow rate regulating valve be increased (for example, opening) while the degree of opening of the second flow rate regulating valve is decreased (for example, closing), and when the amount of adsorption is greater than or equal to a predetermined threshold value, the degree of opening of the first flow rate regulating valve be decreased (for example, closing) while the degree of opening of the second flow rate regulating valve (for example, opening).

In regard to the adsorption heat pump system described in any one of the above items <14> to <20>, it is preferable that at least one of the first fluid and the second fluid that is retained or desorbed (preferably, adsorption or desorption) at the fluid retaining units, be ammonia or water.

Since ammonia or steam is a material having a large latent heat of evaporation, the amount of heat generated when the material is retained or desorbed at the fluid retaining unit is large, and a large amount of heat can be recovered in one process of retaining or desorbing the material.

<22> In regard to the adsorption heat pump system described in any one of the above items <14> to <21>, it is preferable that identical fluids be used as the first fluid and the second fluid. Identical fluids mean fluids of the same kind of material.

In conventional adsorption heat pumps, fluids of different kinds, such as a fluid for heat exchange that is referred to as a so-called heat medium and an operating fluid which is an adsorbate involved in the adsorption or desorption to the adsorber, are utilized. In regard to such a system, in order to repeatedly perform adsorption and desorption (regeneration) at the adsorber, it is necessary to switch the flow channels of the respective fluids in accordance with the switching of adsorption and desorption, and the control of valves and the like for the switching becomes complicated. Furthermore, since the fluids remaining in the flow channels at different temperatures are intermixed as a result of the switching of flow channels, a sensible heat loss (heat energy loss) occurs, and the heat utilization efficiency is likely to decrease.

On the contrary, when identical fluids are used as the heat medium and the operating fluid that are in charge of adsorption and desorption at the adsorber, the valve control can be carried out simply and easily, and recovery of heat can be carried out at a specific site (particularly, condenser).

<23> In regard to the adsorption heat pump system described in any one of the above items <14> to <22>, the adsorbent material disposed in the adsorber is preferably selected from the group consisting of activated carbon, mesoporous silica, zeolite, silica gel, and clay mineral.

Particularly, in the case of performing desorption of a substance (for example, ammonia or steam) or readsorption of a desorbed substance, activated carbon, mesoporous silica, zeolite, silica gel, and clay mineral, which are physical adsorbent materials, require a small amount of heat for the desorption or adsorption of 1 mole of the substance as compared with chemical adsorbent materials, and transfer of the substance can be carried out with a small amount of heat.

<24> In regard to the adsorption heat pump system described in any one of the above items <14> to <23>, it can be configured such that two units of the adsorber described above are disposed, and the two adsorbers are each connected to a heater and are connected to the first evaporator and the condenser, such that when one of the two adsorbers has an adsorbent material in the first fluid retaining unit, and the first fluid is retained in the adsorbent material of one of the adsorbers (that is, heat of adsorption is generated), the other adsorber has an adsorbent material in the first fluid retaining unit, and the first fluid is desorbed from the adsorbent material (that is, the adsorbent material is regenerated).

That is, when two adsorbers are disposed, and the two adsorbers are alternately operated such that the adsorbent material of one of the adsorbers (for example, adsorbent material of the first fluid retaining unit) is made to adsorb a fluid, while the adsorbent material of the other adsorber (for example, adsorbent material of the first fluid retaining unit) is made to desorb, a large amount of heat energy can be extracted more efficiently.

Hereinafter, exemplary embodiments of the invention related to the fourth aspect will be described. However, the invention is not limited to the following embodiments.

<25> The adsorption heat pump system related to the fourth aspect of the invention is configured to include a first fluid; a second fluid which is the same in type as the first fluid; an evaporator that evaporates the first fluid; a second evaporator that evaporates the second fluid; an adsorber that comprises a first fluid retaining unit and a second fluid retaining unit, and at least one of the first fluid retaining unit or the second fluid retaining unit comprising an adsorbent material that releases reaction heat when the adsorbent material retains a supplied fluid; a chemical thermal storage reactor that comprises a first fluid retaining unit which is capable of generating reaction heat by reacting with the first fluid from the first evaporator, and releasing the reaction heat to adsorber through the latent heat of the second fluid generated by the second evaporator which is thermally connected with the first fluid retaining unit of the chemical thermal storage reactor; and a condenser that is connected with the first fluid retaining unit and the second fluid retaining unit of the adsorber and that condenses the first fluid and the second fluid released from the first fluid retaining unit and the second fluid retaining unit. In this case, at the adsorber, preferably, at least the first fluid retaining unit comprises the adsorbent material, and when the first fluid is supplied from the first evaporator to the first fluid retaining unit, the second fluid retained in the second fluid retaining unit is released by the reaction heat released from the adsorbent material.

In the adsorption heat pump described in the above item <25>, preferably, one of the first fluid retaining unit or the second fluid retaining unit comprises the adsorbent material, and the other of the first fluid retaining unit or the second fluid retaining unit comprises at least one of a porous layer or a groove.

In addition, in the adsorption heat pump described in the above item <25>, preferably, the second fluid retaining unit comprises the adsorbent material, and when the second fluid is supplied from the second evaporator to the second fluid retaining unit, the first fluid retained in the first fluid retaining unit is released by the reaction heat released from the adsorbent material at the second fluid retaining unit.

In addition, the adsorption heat pump system is configured to include an evaporator that evaporates a first fluid; an adsorber that includes a first fluid retaining unit to which the first fluid is supplied from the evaporator and in which the first fluid is retained and the retained fluid is desorbed, and a second fluid retaining unit to which a second fluid is supplied and in which the second fluid is retained and the retained fluid is desorbed, with the first fluid retaining unit and the second fluid retaining unit being in a thermally connected state, at least one of the first fluid retaining unit and the second fluid retaining unit having an adsorbent material that releases the reaction heat when the adsorbent material stores a supplied fluid; a chemical thermal storage reactor that includes a heat storage reaction unit to which the first fluid is supplied from the evaporator, and which has a chemical heat storage material that releases the reaction heat in an amount greater than or equal to the latent heat of evaporation of the first fluid when the first fluid is immobilized therein, and stores heat when the first fluid is desorbed, and a fluid vaporization unit to which the second fluid is supplied, and which vaporizes the second fluid, with the heat storage reaction unit and the fluid vaporization unit being in a thermally connected state, the chemical thermal storage reactor heating at least the adsorbent material by supplying the vaporized second fluid to the adsorber; and a condenser that is in communication with the first fluid retaining unit and the second fluid retaining unit of the adsorber so as to enable flow of the fluids therethrough, and that condenses the first fluid and the second fluid discharged from the first fluid retaining unit and the second fluid retaining unit, supplies at least the condensed first fluid to the evaporator, and supplies at least the condensed second fluid to the chemical thermal storage reactor.

Furthermore, in the adsorber, one or both of the first fluid retaining unit and the second fluid retaining unit has an adsorbent material that releases the reaction heat when a supplied fluid is retained therein. Thereby, in at least one of the fluid retaining units, retention by adsorption of a fluid by the adsorbent material is carried out, and thereby the heat of adsorption is obtained.

<26> In the adsorption heat pump described in the above item <25>, it is configured such that one of the first fluid retaining unit and the second fluid retaining unit has an adsorbent material (preferably, physical adsorbent material), and the other has a porous layer and/or furrows (for example, a furrow-shaped or pit-shaped groove structure, or a wick structure having, for example, a mesh shape that exhibits the capillary phenomenon). In this case, the configuration in which when a fluid (for example, a first fluid) is supplied to the one fluid retaining unit provided with an adsorbent material, the fluid (for example, second fluid) retained in the other fluid retaining unit is desorbed by the reaction heat released from the adsorbent material, is employed.

For example, since an adsorbent material is disposed in the first fluid retaining unit, and furrows are provided at the heat exchange site of the thermally connected second fluid retaining unit, where heat exchange occurs at least between the second fluid retaining unit and the first fluid retaining unit, when the second fluid sent to the second fluid retaining unit is condensed and liquefied, the liquid stays in the furrows, and the second fluid in the liquid state can be made to exist uniformly in the fluid retaining unit. That is, for example, the second fluid can be made to exist in the form of a uniform liquid film.

Thereby, the uniformity of heat exchange and the heat exchange efficiency are enhanced. When the first fluid is adsorbed to the adsorbent material, and the heat of adsorption is transferred to the second fluid retaining unit, desorption of the second fluid in the liquid state can be accelerated.

<27> In regard to the adsorption heat pump described in the above item <25> or <26>, the adsorber can be configured to be formed such that both the first fluid retaining unit and the second fluid retaining unit have an adsorbent material. In this case, it is configured such that when the first fluid is supplied from the evaporator to the first fluid retaining unit of the adsorber, the second fluid retained in the second fluid retaining unit is desorbed by the reaction heat released from the adsorbent material of the first fluid retaining unit, and when the second fluid is supplied from the chemical thermal storage reactor to the second fluid retaining unit of the adsorber, the first fluid retained in the first fluid retaining unit is desorbed by the reaction heat released from the adsorbent material of the second fluid retaining unit.

<28> It is preferable that the adsorption heat pump described in any one of the above items <25> to <27> further include a heat source that heats the chemical heat storage material of the chemical thermal storage reactor. Since the chemical thermal storage reactor is in charge of the function of heating and vaporizing the second fluid supplied from the condenser, the first fluid supplied from the evaporator to the chemical thermal storage reactor is immobilized, and the reaction heat is obtained. However, if the amount of the immobilized fluid is larger than the predetermined threshold value, the reaction heat to be exchanged with the fluid vaporizing unit may not be obtained. Therefore, the function of regenerating the chemical heat storage material of the heat storage reaction unit by providing a heat source which is capable of applying heat from the outside, and heating and vaporizing the second fluid, can be recovered.

<29> In regard to the adsorption heat pump described in any one of the above items <25> to <28>, it is configured such that at least the first fluid retaining unit of the adsorber is provided with an adsorbent material, and is provided with a first flow rate regulating valve that regulates the amount of flow of the first fluid between the evaporator and the first fluid retaining unit, a second flow rate regulating valve that regulates the amount of flow of the first fluid between the evaporator and the heat storage reaction unit, and a third flow rate regulating valve that regulates the amount of flow of the second fluid between the chemical thermal storage reactor and the second fluid retaining unit; and a flow control unit that shifts the flow of the first fluid and the second fluid (that is, shift between the adsorber adsorption mode and the adsorber regeneration mode) by increasing the degree of opening (for example, opens) of the first flow rate regulating valve so that the first fluid will be adsorbed to the adsorbent material while decreasing the degrees of opening (for example, closing) of the second flow rate regulating valve and the third flow rate regulating valve when the second fluid retained in the second fluid retaining unit is desorbed ("adsorber adsorption mode" in which the adsorbent material adsorbs the first fluid), and increasing the degrees of opening (for example, opens) of the second flow rate regulating valve and the third flow rate regulating valve while decreasing the degree of opening (for example, closing) of the first flow rate regulating valve when the first fluid adsorbed at the first fluid retaining unit is desorbed ("adsorber regeneration mode" in which the adsorbent material desorbs the first fluid).

When the first flow rate regulating valve, second flow rate regulating valve, and third flow rate regulating valve are disposed, and the respective degrees of opening of the valves are automatically controlled by the flow control unit in accordance with the amount of adsorption of steam, recovery of a stable amount of heat can be carried out in a stable manner. When the second fluid retained in the second fluid retaining unit is desorbed, this corresponds to the case in which the amount of adsorption of the first fluid adsorbed to the adsorbent material of the adsorber is less than a predetermined threshold value (maximum amount of adsorption at which the adsorbent material can adsorb the fluid; hereinafter, the same), and in such a case, in order to generate the heat of adsorption by adsorbing the first fluid to the adsorbent material, the degree of opening of the first flow rate regulating valve is increased (for example, opened). In contrast, when the first fluid adsorbed at the first fluid retaining unit is desorbed, this corresponds to the case in which the amount of adsorption of the first fluid adsorbed to the adsorbent material of the adsorber is greater than or equal to the predetermined threshold value, and in such a case, in order to increase the amount of the second fluid supplied from the chemical thermal storage reactor and to accelerate regeneration of the adsorbent material, the degrees of opening of the second flow rate regulating valve and the third flow rate regulating valve are increased (for example, opened).

Furthermore, the flow control unit can control adsorption and desorption of a fluid at the adsorber by regulating the degrees of opening of the first flow rate regulating valve, second flow rate regulating valve and third flow rate regulating valve based on the amount of fluid immobilized to the chemical heat storage material of the chemical thermal storage reactor. Specifically, <30> In regard to the adsorption heat pump described in the above item <29>, when the amount of the first fluid immobilized in the chemical heat storage material of the chemical thermal storage reactor is less than a predetermined threshold value (for example, in the case of a metal oxide, the maximum amount of steam (fluid) to which the metal oxide can bind by a hydration reaction), the first fluid adsorbed to the first fluid retaining unit is desorbed by increasing the degrees of opening (for example, opening) of the second flow rate regulating valve and the third flow rate regulating valve, and also decreasing the degree of opening (for example, closing) of the first flow rate regulating valve. Furthermore, when the amount of the first fluid immobilized in the chemical heat storage material of the chemical thermal storage reactor is greater than a predetermined threshold value, since hydration or the like is not easily achieved, and the reaction heat is not obtained, it is preferable to regenerate the chemical heat storage material by increasing the degree of opening of the second flow rate regulating valve, and also desorbing the first fluid immobilized in the chemical heat storage material of the chemical thermal storage reactor (for example, heating by means of a heat source).

Furthermore, the flow control unit may integrate the time taken by adsorption and desorption of a fluid, and may switch, based on the integral value, the adsorber adsorption mode in which the heat of adsorption in the adsorption of the fluid to the adsorbent material is obtained, and the adsorber regeneration mode in which the adsorbent material is heated to cause the fluid to desorb. Specifically, <31> in regard to the adsorption heat pump described in the above item <29> or <30>, when the second fluid retained in the second fluid retaining unit is desorbed (that is, when the amount of adsorption of the first fluid is less than a predetermined threshold value), after a predetermined time has passed from the initiation of driving of the first flow rate regulating valve, the degree of opening of the first flow rate regulating valve can be decreased, and at the same time, the degrees of opening of the second flow rate regulating valve and the third flow rate regulating valve can be increased. When the first fluid adsorbed in the first fluid retaining unit is desorbed (when the amount of adsorption of the first fluid is greater than or equal to the predetermined threshold value), after a predetermined time has passed from the initiation of driving of the second flow rate regulating valve and the third flow rate regulating valve, the degrees of opening of the second flow rate regulating valve and the third flow rate regulating valve can be decreased, and at the same time, the degree of opening of the first flow rate regulating valve can be increased.

<32> In regard to the adsorption heat pump described in any one of the above items <25> to <31>, at least one of the first fluid and the second fluid that are retained or desorbed (preferably, adsorbed or desorbed) at the fluid retaining units is preferably ammonia or water. Since ammonia or steam is a substance having a large latent heat of evaporation, a large amount of heat is generated when ammonia or steam is retained or desorbed at the fluid retaining unit, and a large amount of heat can be recovered in a single process of retention or desorption.

<33> In regard to the adsorption heat pump described in any one of the above items <25> to <32>, it is preferable to use identical fluids for the first fluid and the second fluid. Identical fluids mean fluids of the same kind of material.

In conventional adsorption heat pumps, fluids of different kinds, such as a fluid for heat exchange that is referred to as a so-called heat medium and an operating fluid which is an adsorbate involved in the adsorption or desorption to the adsorber, are utilized. In regard to such a system, in order to repeatedly perform adsorption and desorption (regeneration) at the adsorber, it is necessary to switch the flow channels of the respective fluids in accordance with the switching of adsorption and desorption, and the control of valves and the like for the switching becomes complicated. Furthermore, since the fluids remaining in the flow channels at different temperatures are intermixed as a result of the switching of flow channels, a sensible heat loss (heat energy loss) occurs, and the heat utilization efficiency is likely to decrease.

On the contrary, when identical fluids are used as the heat medium and the operating fluid that are in charge of adsorption and desorption at the adsorber, the valve control can be carried out simply and easily, and recovery of heat can be carried out at a specific site (particularly, condenser).

<34> In regard to the adsorption heat pump described in any one of the above items <25> to <33>, the adsorbent material that is disposed in the adsorber is preferably selected from the group consisting of activated carbon, mesoporous silica, zeolite, silica gel, and clay mineral.

Particularly, in the case of performing desorption of a substance (for example, ammonia or steam) or readsorption of a desorbed substance, activated carbon, mesoporous silica, zeolite, silica gel, and clay mineral, which are physical adsorbent materials, require a small amount of heat for the desorption or adsorption of 1 mole of the substance as compared with chemical adsorbent materials, and transfer of the substance can be carried out with a small amount of heat.

In regard to the adsorption heat pump described in any one of the above items <25> to <34>, an embodiment in which the chemical thermal storage reactor is configured to use, as at least one of the chemical heat storage material, a compound selected from metal oxides and metal chlorides, is preferred; and an embodiment in which the chemical thermal storage reactor includes a compound selected from the group consisting of hydroxides and chlorides of alkali metals, hydroxides and chlorides of alkaline earth metals, and hydroxides and chlorides of transition metals, is more preferred.

Metal oxides and metal chlorides are suitable from the viewpoint that a high heat storage density (kJ/kg) is obtained, and are appropriate for effective utilization of heat. Hydroxides and chlorides of alkali metals, hydroxides and chlorides of alkaline earth metals, and hydroxides and chlorides of transition metals are useful in view of further increasing the generation efficiency of heat and cooling power.

Meanwhile, the heat storage density represents the amount of heat (kJ) stored per 1 kg of a metal hydroxide or metal chloride as a result of desorption of a heat medium such as water or ammonia.

<36> In regard to the adsorption heat pump described in any one of the above items <25> to <35:>, when water is used as the first fluid and/or the second fluid, and heat storage and heat release is carried out by transfer of water, the chemical heat storage material is preferably selected from calcium oxide (CaO), magnesium oxide (MgO), and barium oxide (BaO).

<37> In regard to the adsorption heat pump described in any one of the above items <25> to <36>, when ammonia is used as the first fluid and/or the second fluid, and heat storage and heat release is carried out by transfer of ammonia, the chemical heat storage material is preferably selected from lithium chloride (LiCl), magnesium chloride ($MgCl_2$), calcium chloride ($CaCl_2$), strontium chloride ($SrCl_2$), barium chloride ($BaCl_2$), manganese chloride ($MnCl_2$), cobalt chloride ($CoCl_2$), and nickel chloride ($NiCl_2$).

<38> In regard to the adsorption heat pump described in any one of the above items <25> to <37>, it can be configured such that two units of the adsorber described above are disposed, and the two adsorbers are each connected with a heater and are connected with the evaporator and the condenser, such that when one of the two adsorbers has an adsorbent material in the first fluid retaining unit, and the first fluid is retained in the adsorbent material of one of the adsorbers (that is, heat of adsorption is generated), the other adsorber has an adsorbent material in the first fluid retaining unit, and the first fluid is desorbed from the adsorbent material (that is, the adsorbent material is regenerated).

That is, when two adsorbers are disposed, and the two adsorbers are alternately operated such that the adsorbent material of one of the adsorbers (for example, adsorbent material of the first fluid retaining unit) is made to adsorb a fluid, while the adsorbent material of the other adsorber (for example, adsorbent material of the first fluid retaining unit) is made to desorb, a large amount of heat energy can be extracted more efficiently.

EXAMPLES

Hereinbelow, the heat pump of the present invention will be described in detail by way of Examples. However, the invention is not limited to specific constitution of following Examples.

In the present Example, the overall configuration employed was the same as the configuration of the heat pump of Exemplary Embodiment 1, while water was used as the heat medium, calcium oxide (CaO) was used as the heat storage material at the chemical thermal storage reactor 18, and silica gel was used as the adsorbent material at the adsorber 16. In this case, the following reaction occurs in the chemical thermal storage reactor 18, and calcium hydroxide is produced.

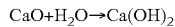

$$CaO+H_2O\rightarrow Ca(OH)_2$$

First, the cooling power generation mold of generating cooling power from this heat pump 12 will be described.

[Cooling Power Generation Mode]

At the time of cooling power generation, the following operations are carried out.

<Cooling Power Generation Operation 1>

Figures 6A, 6B, 6C, 6D:
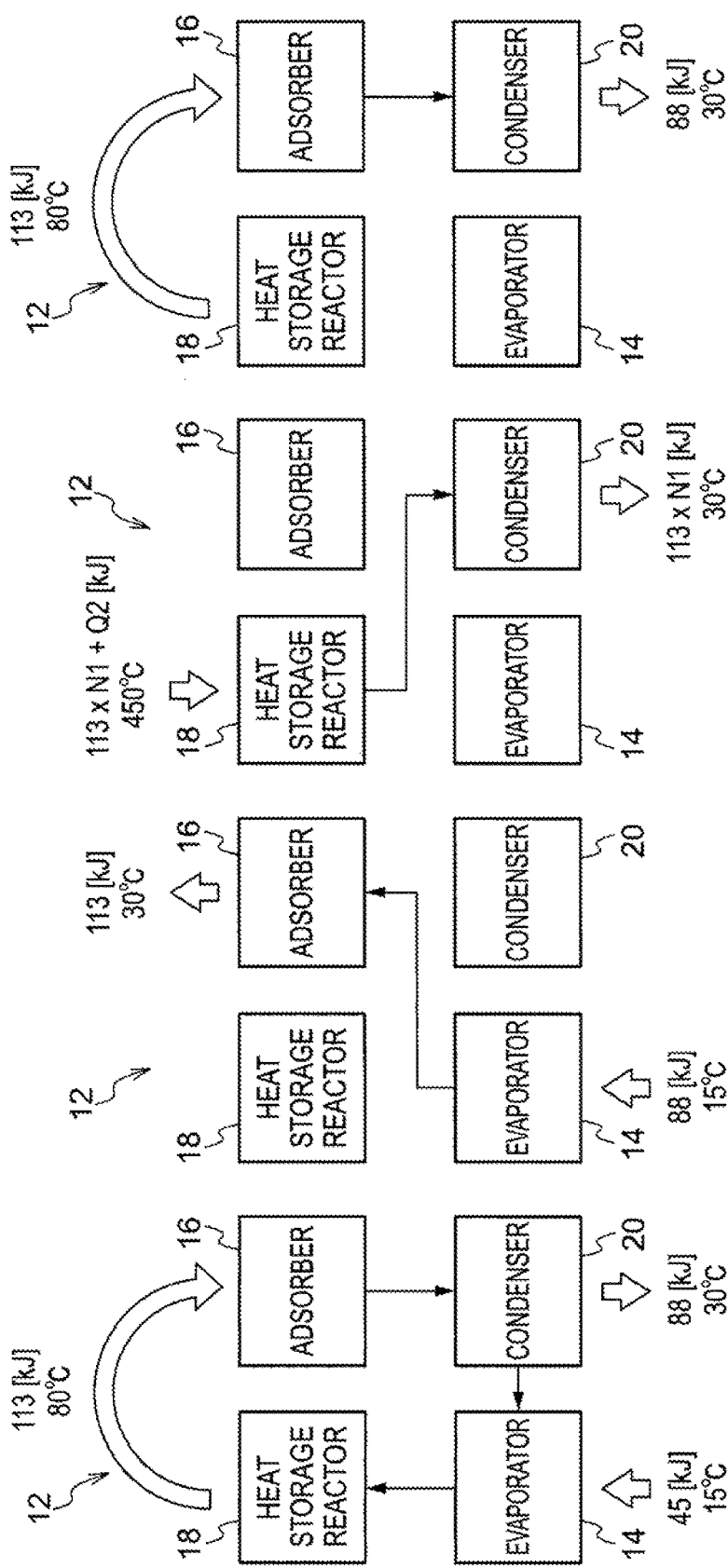
FIGS. 6A to 6D are explanatory diagrams illustrating the state in the case of generating cooling power in the adsorption heat pump system in the Examples of the invention.

As illustrated in FIG. 6A, an evaporator 14 and a chemical thermal storage reactor 18 are connected, and calcium oxide and water are caused to react with each other. Here, for the convenience, it is assumed that 1 [mol] of water has reacted. When the reaction heat ΔH1 of calcium oxide is assumed to be 113 [kJ/mol], and the latent heat of evaporation of water is assumed to be 45 [kJ/mol], the following energy (cooling power Q3 and heat Q5) is generated at the evaporator 14 and the chemical thermal storage reactor 18:

Evaporator (cooling power): 45 [kJ]
Chemical thermal storage reactor (heat): 113 [kJ]

At this time, since the temperature of water at the chemical thermal storage reactor 18 rises close to 100[° C.], it is assumed that energy is extracted at 95[° C.] as a result of heat exchange by means of this water. Furthermore, the temperature of cooling power at the evaporator 14 is defined to be 15[° C.].

Here, the condenser 20 and the adsorber 16 are connected, and also, 113 [kJ] of heat generated at the chemical thermal storage reactor 18, and water at a temperature of 80[° C.] are introduced into the adsorber 16. When the ambient temperature is assumed to be 30[° C.], the adsorber 16 undergoes a temperature rise from 30[° C.] to 80[° C.]. At the condenser 20, water is cooled to an ambient temperature of 30[° C.], and generates heat.

The adsorber 16 is subjected to 113 [kJ] of heat Q5 as the heat of adsorption. When the heat capacity at the adsorber 16 is assumed to be 0.5 [kJ], in the heat of adsorption at the adsorber 16, the portion of (80−30)×0.5=25 [kJ] is equivalent to the sensible heat Q4. Therefore, an amount of heat smaller by this fraction is applied to the condenser 20. As a result, exchange of the amount of heat at the adsorber 16 and the condenser 20 is such that:

Adsorber (heat of desorption+sensible heat): 113 [kJ]
Condenser (heat of condensation):88 [kJ]

Furthermore, when the heat of adsorption of water at the condenser 20 is assumed to be 45 [kJ/mol], the amount of water desorbed at the adsorber 16 is 88 [kJ]/45 [kJ/mol] =1.95 μmol).

<Cooling Power Generation Operation 2>

Next, as illustrated in FIG. 6B, the evaporator 14 and the adsorber 16 are connected, and the adsorber 16 is cooled to an ambient temperature of 30 [° C.]. At the evaporator 14, cooling power Q6 is generated. Specifically, an amount of heat of:

Evaporator(cooling power):88 [kJ]

is generated. On the contrary, at the adsorber 16, 45 [kJ] of the sensible heat Q4 is generated in addition to the heat of adsorption Q6. Therefore, at the evaporator 14, an amount of heat of:

Adsorber(heat of adsorption+sensible heat):113 [kJ]

is generated.

When the cooling power generation operation 1 and the cooling power generation operation 2 described above are each carried out N1 times, the consumed energy and the generated cooling power are:

Consumed energy: 113×*N*1 [kJ]
Generated cooling power:133×*N*1 [kJ]

Thus, it is understood that cooling power can be generated at high efficiency.

Next, regarding the cooling power generation mode, the regeneration/sensible heat recovery mode in which regeneration of the chemical thermal storage reactor 18 and the recovery of the sensible heat in the heat pump 12 are carried out, will be explained.

<Regeneration Operation>

As illustrated in FIG. 6C, the chemical thermal storage reactor 18 and the condenser 20 are connected. The chemical thermal storage reactor 18 is required to be heated up to about 450[° C.] for regeneration. Exchange of the amount of heat at the chemical thermal storage reactor 18 and the condenser 20 at this time is achieved as follows, using the sensible heat Q2 [kJ] of the chemical thermal storage reactor 18:

Chemical thermal storage reactor:113×*N*1+*Q*2 [kJ]

Condenser:113×*N*1 [kJ]

<Sensible Heat Recovery Operation>

First, as illustrated in FIG. 6D, the condenser 20 and the adsorber 16 are connected. Next, water is heated to a temperature of 80[° C.] using the sensible heat Q2 [kJ] of the chemical thermal storage reactor 18, and this hot water is introduced into the adsorber 16. The temperature of the adsorber 16 is raised from 30[° C.], which is the ambient temperature, to 80[° C.]. The condenser 20 is cooled to an ambient temperature of 30[° C.].

Since the heat capacity at the adsorber 16 is 0.5 [kJ], regarding the heat of adsorption at the adsorber 16, an amount of heat smaller by (80−30)×0.5=25 [kJ] is applied to the condenser 20. As a result, exchange of the amount of heat at the adsorber 16 and the condenser 20 is achieved as follows:

Adsorber (heat of desorption):113 [kJ]
Condenser (heat of condensation):88 [kJ]

Furthermore, since the heat of adsorption of water at the condenser 20 is 45 [kJ/mol], the amount of water desorbed at the adsorber 16 is 88 [kJ]/45 [kJ/mol]=1.95 [mol].

Next, as illustrated in FIG. 6(B), the evaporator 14 and the adsorber 16 are connected, and the adsorber 16 is cooled to an ambient temperature of 30[° C.]. In this case, at the evaporator 14, an amount of heat of:

Evaporator(cooling power): 88 [kJ]

is generated, while in the adsorber 16, the sensible heat is generated in addition to the heat of adsorption. Therefore, at the evaporator 14, an amount of heat of Adsorber(heat of adsorption+sensible heat): 113 [kJ]

is generated.

When it is assumed that the recovery of the sensible heat has been completed after the sensible heat recovery operation was carried out N2 times, Amount of heat recovered: 113×$N$2 [kJ]

Amount of cooling power generated: 88×$N$2 [kJ]

When the overall balance of the amounts of heat in the cooling power generation mode described above is summarized, Amount of heat introduced:113×($N$1+$N$2) [kJ]

Amount of cooling power generated:133×$N$1+88×$N$2 [kJ]

Since the coefficient of performance COP is:

COP=(133×$N$1+88×$N$2)/(113×($N$1+$N$2)), then

113×($N$1+$N$2)<133×$N$1+88×$N$2, that is, if the condition of N2<0.8×N1 is satisfied, cooling power generation is enabled with a COP value of 1 or greater.

Next, the heat energy generation mode in which heat is generated by carburetion from this heat pump 12 will be described.

[Carburetion Generation Mode]

At the time of heat energy generation, carburetion is achieved by carrying out the following operations, and heat can be generated.

<Heat Energy Generation Operation 1>

As illustrated in FIG. 7A, the evaporator 14 and the chemical thermal storage reactor 18 are connected, and calcium oxide and water are allowed to react with each other. For the convenience, it is assumed that 1 [mol] of water has reacted. When the reaction heat ΔH1 of calcium oxide is assumed to be 113 [kJ/mol], and the latent heat of evaporation of water is assumed to be 45 [kJ/mol], the following energy (cooling power Q3 and heat Q5) is generated at the evaporator 14 and the chemical thermal storage reactor 18:

Evaporator(cooling power):45 [kJ]

Chemical thermal storage reactor(heat):113 [kJ]

At this time, since the temperature of water at the chemical thermal storage reactor 18 rises close to 100[° C.], it is assumed that energy is extracted at 95[° C.] as a result of heat exchange by means of this water. Furthermore, the temperature of cooling power at the evaporator 14 is defined to be 15[° C.].

Here, the condenser 20 and the adsorber 16 are connected, and also, 113 [kJ] of heat generated at the chemical thermal storage reactor 18, and water at a temperature of 80[° C.] are introduced into the adsorber 16. When the ambient temperature is assumed to be 30[° C.], the adsorber 16 undergoes a temperature rise from 30[° C.] to 80[° C.]. The condenser 20 is cooled to an ambient temperature of 30[° C.], and generates heat.

The adsorber 16 is subjected to 113 [kJ] of heat Q5 as the heat of adsorption. When the heat capacity at the adsorber 16 is assumed to be 0.5 [k], in the heat of adsorption at the adsorber 16, the portion of (80−30)×0.5=25 [kJ] is equivalent to the sensible heat Q4. Therefore, an amount of heat smaller by this fraction is applied to the condenser 20. As a result, exchange of the amount of heat at the adsorber 16 and the condenser 20 is such that:

Adsorber(heat of desorption+sensible heat):113 [kJ]

Condenser(heat of condensation):88 [kJ]

Furthermore, when the heat of adsorption of water at the condenser 20 is assumed to be 45 [kJ/mol], the amount of water desorbed at the adsorber 16 is 88 [kJ]/45 [kJ/mol] =1.95 [mol].

<Heat Energy Generation Operation 2>

Next, as illustrated in FIG. 7B, the evaporator 14 and the adsorber 16 are connected, and the adsorber 16 is cooled to an ambient temperature of 30[° C.]. At the evaporator 14, cooling power Q6 is generated. Specifically, an amount of heat of:

Evaporator(cooling power):88 [kJ]

is generated. On the contrary, at the adsorber 16, 45 [kJ] of the sensible heat Q4 is generated in addition to the heat of adsorption Q6. Therefore, at the evaporator 14, an amount of heat of:

Adsorber(heat of adsorption+sensible heat):113 [kJ]

is generated.

When the heat energy generation operation 1 and the heat energy generation operation 2 described above are each carried out N1 times, the consumed energy and the generated heat are:

Consumed energy:113×$N$1 [kJ]

Generated heat:201×$N$1 [kJ]

Thus, it is understood that heat can be generated at high efficiency.

Next, regarding the heat energy generation mode, the regeneration/sensible heat recovery mode in which regeneration of the chemical thermal storage reactor 18 and the recovery of the sensible heat in the heat pump 12 are carried out, will be explained.

<Regeneration Operation>

As illustrated in FIG. 7C, the chemical thermal storage reactor 18 and the condenser 20 are connected. The chemical thermal storage reactor 18 is required to be heated up to about 450[° C.] for regeneration. Exchange of the amount of heat at the chemical thermal storage reactor 18 and the condenser 20 at this time is achieved as follows, using the sensible heat Q2 [kJ] of the chemical thermal storage reactor 18:

Chemical thermal storage reactor: 113×$N$1+$Q$2 [kJ]

Condenser:113×$N$1 [kJ]

<Sensible Heat Recovery Operation>

First, as illustrated in FIG. 7D, the condenser 20 and the adsorber 16 are connected. Next, water is heated to a temperature of 80[° C.] using the sensible heat Q2 [kJ] of the chemical thermal storage reactor 18, and this hot water is introduced into the adsorber 16. The temperature of the adsorber 16 is raised from 30[° C.], which is the ambient temperature, to 80[° C.]. At the condenser 20, water is cooled to an ambient temperature of 30[° C.].

Since the heat capacity at the adsorber 16 is 0.5 [kJ], regarding the heat of adsorption at the adsorber 16, an amount of heat smaller by (80−30)×0.5=25 [kJ] is applied to the condenser 20. As a result, exchange of the amount of heat at the adsorber 16 and the condenser 20 is achieved as follows:

Adsorber(heat of desorption):113 [kJ]

Condenser(heat of condensation):88 [kJ]

Furthermore, since the heat of adsorption of water at the condenser 20 is 45 [kJ/mol], the amount of water desorbed at the adsorber 16 is 88 [kJ]/45 [kJ/mol]=1.95 [mol].

Next, as illustrated in FIG. 7(B), the evaporator 14 and the adsorber 16 are connected, and the adsorber 16 is cooled to an ambient temperature of 30[° C.]. In this case, at the evaporator 14, an amount of heat of:

Evaporator(cooling power):88 [kJ]

is generated, while in the adsorber 16, the sensible heat is generated in addition to the heat of adsorption. Therefore, at the evaporator 14, an amount of heat of Adsorber(heat of adsorption+sensible heat):113 [kJ]

is generated.

When it is assumed that the recovery of the sensible heat has been completed after the sensible heat recovery operation was carried out N2 times, Amount of heat recovered: 113×$N$2 [kJ]

Amount of heat generated: 45×$N$1+201×$N$2 [kJ]

When the overall balance of the amounts of heat in the heat energy generation mode described above is summarized, Amount of heat introduced: 113×($N$1+$N$2) [kJ]

Amount of heat generated: 246×$N$1+201×$N$2 [kJ]

Since the coefficient of performance COP is:

COP=(246×$N$1+201×$N$2)/(113×($N$1+$N$2)), then

113×($N$1+$N$2)<246×$N$1+201×$N$2, that is, if the condition of N2<<N1 is satisfied, heat can be generated at an efficiency of two or more times.

As can be seen from the above descriptions, heat at 450° C. is applied to the chemical thermal storage reactor 18, and at the same time, the temperature of water (heat medium) is set to about 100° C. In this regard, when heat is actually extracted from the heat pump 12, heat at about 30° C., which is sufficient to be used for house heating or the like, is extracted in divided portions from two sites of the adsorb 16 and the condenser 20. Even if the heat capacity of the chemical thermal storage reactor 18 is decreased, heat can be generated efficiently. Also, by decreasing the heat capacity of the chemical thermal storage reactor 18, the amount of heat required to raise the temperature of the chemical thermal storage reactor 18 to a desired temperature may also be adjusted to a low level.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An adsorption heat pump system comprising:
a condenser that condenses a heat medium;
an evaporator that evaporates the heat medium;
an adsorber that is connected with the evaporator and adsorbs the heat medium, and is regenerated by receiving thermal energy at a temperature higher than or equal to a regeneration temperature for evaporating the heat medium;
a heat accumulator that is a chemical thermal storage reactor connected to the evaporator; and
a controller programmed to:
simultaneously connect: (i) the heat accumulator to the evaporator, and (ii) the adsorber to the condenser, such that pressure in the heat accumulator is reduced to cause evaporation of the heat medium in the evaporator,
to generate reaction heat in the heat accumulator in an amount more than or equal to that of the latent heat of evaporation of the heat medium by reacting with the heat medium from the evaporator, and
to release the reaction heat from the heat accumulator to the adsorber at a temperature higher than or equal to the regeneration temperature to regenerate the adsorber.

2. The adsorption heat pump system according to claim 1, comprising a plurality of the heat accumulators.

3. The adsorption heat pump system according to claim 2, wherein when some of the plurality of the chemical thermal storage reactors absorb heat, other of the chemical thermal storage reactors are able to release heat.

4. A method of generating cooling power by using the adsorption heat pump system of claim 1, the method comprising:
generating cooling power by evaporation of the heat medium resulting from an effect of pressure reduction by the chemical thermal storage reactor through simultaneously connecting: (i) the heat accumulator to the evaporator, and (ii) the adsorber to the condenser;
generating cooling power by evaporation of the heat medium resulting from an effect of pressure reduction by the adsorber;
storing thermal energy in the chemical thermal storage reactor by generating reaction heat that is in an amount more than or equal to that of the latent heat of evaporation of the heat medium by reacting a heat storage material in the chemical thermal storage reactor with the heat medium from the evaporator; and regenerating the adsorber by applying thermal energy stored in the chemical thermal storage reactor to the adsorber to desorb the adsorbed heat medium.

* * * * *